United States Patent
Yang et al.

(10) Patent No.: US 9,575,591 B2
(45) Date of Patent: Feb. 21, 2017

(54) REDUCED-SIZE INTERFACES FOR MANAGING ALERTS

(71) Applicant: Apple Inc., Cupertino, CA (US)

(72) Inventors: Lawrence Y. Yang, San Francisco, CA (US); Stephen O. Lemay, Palo Alto, CA (US); Alan C. Dye, San Francisco, CA (US); Christopher Patrick Foss, San Francisco, CA (US); Jonathan R. Dascola, San Francisco, CA (US); Imran Chaudhri, San Francisco, CA (US); Gary Ian Butcher, San Jose, CA (US); David Chance Graham, Campbell, CA (US); Jonathan P. Ive, San Francisco, CA (US); Kevin Lynch, Woodside, CA (US); Natalia Maric, San Francisco, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 14/838,235

(22) Filed: Aug. 27, 2015

(65) Prior Publication Data
US 2016/0062540 A1    Mar. 3, 2016

Related U.S. Application Data

(60) Provisional application No. 62/044,894, filed on Sep. 2, 2014, provisional application No. 62/129,818, filed on Mar. 7, 2015.

(51) Int. Cl.
*G06F 3/14* (2006.01)
*G06F 3/041* (2006.01)
(Continued)

(52) U.S. Cl.
CPC ............ *G06F 3/0416* (2013.01); *G06F 3/016* (2013.01); *G06F 3/0481* (2013.01); *G06F 3/0488* (2013.01); *G06F 3/04883* (2013.01)

(58) Field of Classification Search
CPC .... G06F 3/0481; G06F 3/0482; G06F 3/0488; G06F 3/04883
(Continued)

(56) References Cited

U.S. PATENT DOCUMENTS 5,475,653 A   12/1995  Yamada et al.
5,801,700 A    9/1998  Ferguson
(Continued)

FOREIGN PATENT DOCUMENTS

EP   1052566 A1   11/2000
EP   2551784 A1    1/2013
(Continued)

OTHER PUBLICATIONS

"Samsung Gear2 User Manual", 2014, 98 pages, "GEN_SM-R380_Samsung_Gear2_English_User_Manual_BN66_F2_AC.pdf".*
(Continued)

*Primary Examiner* — Haoshian Shih
(74) *Attorney, Agent, or Firm* — Morrison & Foerster LLP

(57) ABSTRACT

An electronic device with a display can receive an alert comprising information, and in response to receiving the alert, issue a perceptual output. The device can detect a user input and determine whether the user input was detected within a predetermined time interval after the perceptual output. In accordance with a determination that the user input was detected within the predetermined time interval, the device can display a notification on the display, wherein the notification comprises a first portion of the information.

(Continued)

If the device continues to detect the user input after a second predetermined time period, the device can display a second portion of the information, where the second portion is different from the first portion.

29 Claims, 41 Drawing Sheets

(51) Int. Cl.
  *G06F 3/0481* (2013.01)
  *G06F 3/0488* (2013.01)
  *G06F 3/01* (2006.01)
(58) Field of Classification Search
  USPC ............... 715/771, 779, 864; 709/206, 260; 345/173
  See application file for complete search history.

(56) References Cited

U.S. PATENT DOCUMENTS

| | | | |
|---|---|---|---|
| 6,002,402 A | 12/1999 | Schacher | |
| 6,191,807 B1 | 2/2001 | Hamada et al. | |
| 6,266,098 B1 | 7/2001 | Cove et al. | |
| 6,323,846 B1 | 11/2001 | Westerman et al. | |
| 6,362,842 B1 | 3/2002 | Tahara et al. | |
| 6,570,557 B1 | 5/2003 | Westerman et al. | |
| 6,661,438 B1 | 12/2003 | Shiraishi et al. | |
| 6,662,023 B1 | 12/2003 | Helle | |
| 6,677,932 B1 | 1/2004 | Westerman | |
| 6,809,724 B1 | 10/2004 | Shiraishi et al. | |
| 7,081,905 B1 | 7/2006 | Raghunath | |
| 7,130,664 B1 | 10/2006 | Williams | |
| 7,365,736 B2 | 4/2008 | Marvit et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,789,225 B2 | 9/2010 | Whiteis | |
| 7,834,861 B2 | 11/2010 | Lee | |
| 7,844,914 B2 | 11/2010 | Andre et al. | |
| 7,908,219 B2 | 3/2011 | Abanami et al. | |
| 7,957,762 B2 | 6/2011 | Herz et al. | |
| 8,006,002 B2 | 8/2011 | Kalayjian et al. | |
| 8,050,997 B1 | 11/2011 | Nosek et al. | |
| 8,121,586 B2 | 2/2012 | Araradian et al. | |
| 8,239,784 B2 | 8/2012 | Hotelling et al. | |
| 8,255,830 B2 | 8/2012 | Ording et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,543,081 B2 | 9/2013 | Scott et al. | |
| 8,572,493 B2 | 10/2013 | Qureshi | |
| 8,613,070 B1 | 12/2013 | Borzycki et al. | |
| 8,666,361 B2 | 3/2014 | Chu et al. | |
| 8,675,084 B2 | 3/2014 | Bolton et al. | |
| 8,811,951 B1 | 8/2014 | Faaborg et al. | |
| 8,922,485 B1 | 12/2014 | Lloyd | |
| 2002/0015024 A1 | 2/2002 | Westerman et al. | |
| 2002/0037715 A1 | 3/2002 | Mauney et al. | |
| 2005/0187873 A1 | 8/2005 | Labrou et al. | |
| 2005/0190059 A1 | 9/2005 | Wehrenberg | |
| 2005/0268237 A1 | 12/2005 | Crane et al. | |
| 2006/0017692 A1 | 1/2006 | Wehrenberg et al. | |
| 2006/0026245 A1* | 2/2006 | Cunningham ........ H04L 12/581 709/206 |
| 2006/0026536 A1 | 2/2006 | Hotelling et al. | |
| 2006/0033724 A1 | 2/2006 | Chaudhri et al. | |
| 2006/0195787 A1 | 8/2006 | Topiwala et al. | |
| 2006/0197753 A1 | 9/2006 | Hotelling | |
| 2006/0294025 A1 | 12/2006 | Mengerink | |
| 2007/0036300 A1 | 2/2007 | Brown et al. | |
| 2007/0085157 A1 | 4/2007 | Fadell et al. | |
| 2007/0135043 A1 | 6/2007 | Hayes et al. | |
| 2007/0150834 A1 | 6/2007 | Muller et al. | |
| 2007/0150836 A1 | 6/2007 | Deggelmann et al. | |
| 2007/0150842 A1 | 6/2007 | Chaudhri et al. | |
| 2007/0216659 A1 | 9/2007 | Amineh | |
| 2007/0236475 A1 | 10/2007 | Wherry | |
| 2008/0014989 A1 | 1/2008 | Sandegard et al. | |
| 2008/0057926 A1 | 3/2008 | Forstall et al. | |
| 2008/0079589 A1 | 4/2008 | Blackadar | |
| 2008/0165136 A1 | 7/2008 | Christie et al. | |
| 2008/0320391 A1 | 12/2008 | Lemay et al. | |
| 2009/0005011 A1 | 1/2009 | Christie et al. | |
| 2009/0036165 A1 | 2/2009 | Brede | |
| 2009/0037536 A1 | 2/2009 | Braam | |
| 2009/0049502 A1 | 2/2009 | Levien et al. | |
| 2009/0051648 A1 | 2/2009 | Shamaie et al. | |
| 2009/0055494 A1* | 2/2009 | Fukumoto ............ G06Q 10/107 709/206 |
| 2009/0164219 A1 | 6/2009 | Yeung et al. | |
| 2009/0181726 A1 | 7/2009 | Vargas et al. | |
| 2009/0187842 A1 | 7/2009 | Collins et al. | |
| 2009/0199130 A1 | 8/2009 | Tsern et al. | |
| 2009/0205041 A1 | 8/2009 | Michalske | |
| 2009/0244015 A1 | 10/2009 | Sengupta et al. | |
| 2009/0298444 A1 | 12/2009 | Shigeta | |
| 2010/0082481 A1 | 4/2010 | Lin et al. | |
| 2010/0124906 A1 | 5/2010 | Hautala | |
| 2010/0223145 A1 | 9/2010 | Dragt | |
| 2010/0267362 A1 | 10/2010 | Smith et al. | |
| 2011/0022472 A1 | 1/2011 | Zon et al. | |
| 2011/0080356 A1 | 4/2011 | Kang et al. | |
| 2011/0088086 A1 | 4/2011 | Swink et al. | |
| 2011/0151418 A1 | 6/2011 | Delespaul et al. | |
| 2011/0157046 A1 | 6/2011 | Lee et al. | |
| 2011/0164058 A1 | 7/2011 | Lemay | |
| 2011/0183650 A1 | 7/2011 | McKee | |
| 2011/0251892 A1 | 10/2011 | Laracey | |
| 2011/0254684 A1 | 10/2011 | Antoci | |
| 2011/0265041 A1* | 10/2011 | Ganetakos ............ A63F 13/12 715/834 |
| 2011/0306393 A1 | 12/2011 | Goldman et al. | |
| 2012/0022872 A1 | 1/2012 | Gruber et al. | |
| 2012/0089507 A1 | 4/2012 | Zhang et al. | |
| 2012/0102437 A1 | 4/2012 | Worley et al. | |
| 2012/0108215 A1 | 5/2012 | Kameli | |
| 2012/0117507 A1 | 5/2012 | Tseng et al. | |
| 2012/0131458 A1 | 5/2012 | Hayes | |
| 2012/0150970 A1 | 6/2012 | Peterson et al. | |
| 2012/0159380 A1 | 6/2012 | Kocienda et al. | |
| 2012/0172088 A1 | 7/2012 | Kirch et al. | |
| 2012/0197743 A1 | 8/2012 | Grigg et al. | |
| 2012/0258684 A1 | 10/2012 | Franz et al. | |
| 2012/0290449 A1 | 11/2012 | Mullen et al. | |
| 2012/0304084 A1 | 11/2012 | Kim et al. | |
| 2012/0306770 A1 | 12/2012 | Moore et al. | |
| 2012/0310760 A1 | 12/2012 | Phillips et al. | |
| 2012/0322370 A1 | 12/2012 | Lee | |
| 2012/0322371 A1 | 12/2012 | Lee | |
| 2013/0063364 A1 | 3/2013 | Moore | |
| 2013/0065566 A1 | 3/2013 | Gisby et al. | |
| 2013/0085931 A1 | 4/2013 | Runyan | |
| 2013/0091298 A1 | 4/2013 | Ozzie et al. | |
| 2013/0097566 A1 | 4/2013 | Berglund | |
| 2013/0103519 A1 | 4/2013 | Kountotsis et al. | |
| 2013/0110719 A1 | 5/2013 | Carter et al. | |
| 2013/0143512 A1 | 6/2013 | Hernandez et al. | |
| 2013/0159941 A1 | 6/2013 | Langlois et al. | |
| 2013/0212470 A1 | 8/2013 | Karunamuni et al. | |
| 2013/0222236 A1 | 8/2013 | Gardenfors et al. | |
| 2013/0225118 A1 | 8/2013 | Jang et al. | |
| 2013/0244615 A1 | 9/2013 | Miller et al. | |
| 2013/0254714 A1 | 9/2013 | Shin et al. | |
| 2013/0262298 A1 | 10/2013 | Morley | |
| 2013/0295872 A1 | 11/2013 | Guday et al. | |
| 2013/0304651 A1 | 11/2013 | Smith et al. | |
| 2013/0310089 A1 | 11/2013 | Gianoukos et al. | |
| 2013/0322634 A1 | 12/2013 | Bennett et al. | |
| 2013/0332358 A1 | 12/2013 | Zhao | |
| 2013/0332364 A1 | 12/2013 | Templeton et al. | |

(56) References Cited

U.S. PATENT DOCUMENTS

| | | | |
|---|---|---|---|
| 2014/0028735 | A1 | 1/2014 | Williams et al. |
| 2014/0055552 | A1 | 2/2014 | Song et al. |
| 2014/0058935 | A1 | 2/2014 | Mijares |
| 2014/0068751 | A1 | 3/2014 | Last et al. |
| 2014/0073256 | A1 | 3/2014 | Newham et al. |
| 2014/0074716 | A1 | 3/2014 | Ni |
| 2014/0085487 | A1 | 3/2014 | Park et al. |
| 2014/0101056 | A1 | 4/2014 | Wendling |
| 2014/0122331 | A1 | 5/2014 | Vaish et al. |
| 2014/0129441 | A1 | 5/2014 | Blanco et al. |
| 2014/0136990 | A1 | 5/2014 | Gonnen et al. |
| 2014/0143145 | A1 | 5/2014 | Kortina et al. |
| 2014/0155031 | A1 | 6/2014 | Lee et al. |
| 2014/0181183 | A1 | 6/2014 | Houjou et al. |
| 2014/0240122 | A1* | 8/2014 | Roberts .............. G08B 21/182 340/539.11 |
| 2014/0279442 | A1 | 9/2014 | Luoma et al. |
| 2014/0279556 | A1 | 9/2014 | Priebatsch et al. |
| 2015/0007049 | A1* | 1/2015 | Langlois ................ H04L 51/24 715/752 |
| 2015/0040029 | A1 | 2/2015 | Koum et al. |
| 2015/0248389 | A1* | 9/2015 | Kahn .................... G06F 17/241 715/230 |
| 2015/0286387 | A1* | 10/2015 | Gu ........................ G06F 3/017 715/779 |
| 2015/0286391 | A1* | 10/2015 | Jacobs ............... G06F 3/04883 715/771 |
| 2015/0350141 | A1 | 12/2015 | Yang et al. |
| 2016/0041597 | A1 | 2/2016 | Graham et al. |
| 2016/0054841 | A1 | 2/2016 | Yang et al. |
| 2016/0065707 | A1 | 3/2016 | Yang et al. |
| 2016/0065708 | A1 | 3/2016 | Yang et al. |
| 2016/0066277 | A1 | 3/2016 | Yang et al. |

FOREIGN PATENT DOCUMENTS

| | | |
|---|---|---|
| EP | 2610701 A1 | 7/2013 |
| EP | 2610701 A9 | 4/2014 |
| EP | 2725537 A1 | 4/2014 |
| EP | 2733598 A2 | 5/2014 |
| JP | 55-80084 A | 6/1980 |
| WO | 2005/109829 A1 | 11/2005 |
| WO | 2006/037545 A2 | 4/2006 |
| WO | 2010/039337 A2 | 4/2010 |
| WO | 2012/128824 A1 | 9/2012 |
| WO | 2013/023224 A2 | 2/2013 |
| WO | 2013/093558 A1 | 6/2013 |
| WO | 2013/097895 A1 | 7/2013 |
| WO | 2013/135270 A1 | 9/2013 |
| WO | 2013/169842 A2 | 11/2013 |
| WO | 2013/169875 A2 | 11/2013 |
| WO | 2014/078965 A1 | 5/2014 |
| WO | 2014/105276 A1 | 7/2014 |
| WO | 2015/038684 A1 | 3/2015 |
| WO | 2015/120358 A1 | 8/2015 |

OTHER PUBLICATIONS

Samsung SM-R380 User Manual, Apr. 2014, 78pages. "SM-R380_UM_EU_Eng_D13_140411.pdf".*

Final Office Action received for U.S. Appl. No. 14/503,072, mailed on Sep. 1, 2015, 16 pages.

Non Final Office Action received for U.S. Appl. No. 14/503,072, mailed on Jan. 26, 2015, 12 pages.

Non Final Office Action received for U.S. Appl. No. 14/503,296, mailed on Jan. 30, 2015, 16 pages.

Non-Final Office Action received for U.S. Appl. No. 14/503,372, mailed on Dec. 5, 2014, 11 pages.

Non-Final Office Action received for U.S. Appl. No. 14/503,381, mailed on May 13, 2015, 13 pages.

Non-Final Office Action received for U.S. Appl. No. 14/599,425, mailed on Mar. 17, 2015, 16 pages.

Office Action received for Australian Patent Application No. 2015100734, issued on Jul. 29, 2015, 5 pages.

Kamijo, Noboru, "Next Generation Mobile System—WatchPad1. 5", Available at "http://researcher.ibm.com/researcher/view_group_subpage.php?id=5617", retrieved on Jul. 4, 2015, 2 pages.

Lemay et al., U.S. Appl. No. 60/936,562, filed Jun. 20, 2007, titled "Portable Multifunction Device, Method, and Graphical User Interface for Playing Online Videos", 61 pages.

NDTV, "Sony SmartWatch 2 Launched in India for Rs. 14,990", available at "http://gadgets.ndtv.com/others/news/sony-smartwatch-2-launched-in-india-for-rs-14990-420319", Sep. 18, 2013, 4 pages.

International Search Report and Written Opinion received for PCT Patent Application No. PCT/US2014/053951, mailed on Dec. 8, 2014, 11 pages.

International Search Report and Written Opinion received for PCT Patent Application No. PCT/US2014/053957, mailed on Feb. 19, 2015, 11 pages.

International Search Report and Written Opinion received for PCT Patent Application No. PCT/US2014/053958, mailed on Feb. 19, 2015, 10 pages.

International Search Report and Written Opinion received for PCT Patent Application No. PCT/US2015/019321, mailed on Jun. 3, 2015, 11 pages.

Apple, "iPhone User's Guide", 2007, 137 pages.

"i Phone User Guide for iOS 7.1 Software", available online at <https://manuals.info.apple.com/MANUALS/1000/MA1681/en_US/iphone_ios7_user_guide.pdf> retrived on Aug. 10, 2015, 162 pages.

Headset Button Controller v7.3 APK Full APP Download for Andriod, Blackberry, iPhone, Jan. 27, 2014, 11 pages.

Colt, Sam, "Here's One Way Apple's Smartwatch Could Be Better Than Anything Else", Business Insider, Aug. 21, 2014, pp. 1-4.

International Search Report and Written Opinion received for PCT Patent Application No. PCT/US2015/019322, mailed on Jun. 18, 2015, 16 pages.

Final Office Action received for U.S. Appl. No. 14/503,296, mailed on Jul. 2, 2015, 7 pages.

Yang et al., U.S Appl. No. 62/006,211, filed Jun. 1, 2014, titled "Displaying Options, Assigning Notification, Ignoring Messages, and Simultaneous User Interface Displays in a Messaging Application", 254 pages.

International Search Report and Written Opinion received for PCT Patent Application No. PCT/US2015/019320, mailed on Jul. 2, 2015, 14 pages.

International Search Report and Written Opinion received for PCT Patent Application No. PCT/US2015/025188, mailed on Jun. 23, 2015, 11 pages.

International Search Report and Written Opinion received for PCT Patent Application No. PCT/US2015/019298, mailed on Jul. 13, 2015, 17 pages.

International Search Report and Written Opinion received for PCT Patent Application No. PCT/US2015/033380, mailed on Aug. 10, 2015, 13 pages.

International Search Report and Written Opinion received for PCT Patent Application No. PCT/US2015/032474, mailed on Aug. 19, 2015, 8 pages.

International Search Report and Written Opinion received for PCT Patent Application No. PCT/US2015/019317, mailed on Aug. 25, 2015, 24 pages.

FUJI FILM, "Taking Pictures Remotely : Free iPhone/Android App FUJI FILM Camera Remote", Available at <http://app.fujifilm-dsc.com/en/camera_remote/guide05.html>, Apr. 22, 2014, 3 pages.

Playmemories Camera Apps, "PlayMemories Camera Apps Help Guide", Available at <https://www.playmemoriescameraapps.com/portal/manual/IS9104-NPIA09014_00-F00002/en/index.html>, 2012, 3 pages.

Techsmith, "Snagit 11-Snagit 11.4 Help", Available at <http://assets.techsmith.com/Downloads/ua-tutorials-snagit-11/Snagit_11.pdf>, Jan. 2014, 146 pages.

Xperia Blog, "Action Camera Extension Gives Smartwatch/Smartband Owners Ability to Control Sony Wireless Cameras", Available at <http://www.xperiablog.net/2014/06/13/action-cam-

(56) References Cited

OTHER PUBLICATIONS era-extension-gives-smartwatchsmartband-owners-ability-to-control-sony-wireless-cameras/>, Jun. 13, 2014, 10 pages.
"Kinect Gesture Commands—Kinect Voice Commands", Xbox Wire, 2 pages.
Chan, Christine, "Handoff Your Browser to Your iPhone or iPad! Plus a Chance to Win a Copy!", Appadvice, 2 pages.
Frakes, Dan, "How to Get Started with Airplay", Macworld, May 2013, 8 pages.
Shankland, Stephen, "Chrome OS Gets 'OK Google' Voice Search Control", available online at http://www.cnet.com/news/chrome-os-gets-ok-google-voice-search-control/, May 21, 2014, 4 page.
Office Action received for Australian Patent Application No. 2015101188, issued on Apr. 14, 2016, 3 pages.
Notice of Allowance received for Chinese Patent Application No. 201520365843.1, mailed on Feb. 15, 2016, 5 pages. (3 pages of English Translation and 2 pages of official copy).
Office Action received for Chinese Patent Application No. 201520669842.6, mailed on Dec. 4, 2015, 7 pages (4 pages of English Translation and 3 pages of Official Copy).
International Search Report and Written Opinion received for PCT Patent Application No. PCT/US2015/043487, mailed on Jan. 29, 2016, 19 pages.
International Search Report and Written Opinion received for PCT Patent Application No. PCT/US2015/044083, mailed on Feb. 4, 2016, 33 pages.
International Search Report and Written Opinion received for PCT Patent Application No. PCT/US2015/046787, mailed on Apr. 1, 2016, 26 pages.
"WeChat TVC—Hold to Talk", Available online at YouTube video: https://www.youtube.com/watch?v=E_UxteOWVSo, May 11, 2013, 1 page.
Non-Final Office Action received for U.S. Appl. No. 14/503,376, mailed on Dec. 22, 2014, 21 pages.
Notice of Allowance received for U.S. Appl. No. 14/503,376, mailed on Jul. 29, 2015, 13 pages.
Notice of Allowance received for U.S. Appl. No. 14/503,376, mailed on Sep. 2, 2015, 2 pages.
Notice of Allowance received for U.S. Appl. No. 14/503,376, mailed on Sep. 24, 2015, 5 pages.
Non Final Office Action received for U.S. Appl. No. 14/503,386, mailed on Jan. 7, 2015, 19 pages.
Notice of Allowance received for U.S. Appl. No. 14/503,386, mailed on Jul. 30, 2015, 12 pages.
Notice of Allowance received for U.S. Appl. No. 14/503,386, mailed on Sep. 24, 2015, 5 pages.
Office Action received for Australian Patent Application No. 2015100711, issued on Jul. 27, 2015, 7 pages.
Office Action Received for Australian Patent Application No. 2015100711, mailed on Nov. 19, 2015, 6 pages.
Notice of Allowance received for Chinese Patent Application No. 201520365358.4, mailed on Nov. 20, 2015, 4 pages (2 pages of English Translation and 2 pages of Official Copy).
Office Action received for Chinese Patent Application No. 201520365358.4, mailed on Aug. 11, 2015, 4 pages (2 pages of English Translation and 2 pages of Official Copy).
Office Action received for Chinese Patent Application No. 201520365843.1, mailed on Aug. 25, 2015, 4 pages (2 pages of English Translation and 2 pages of Official Copy).
Office Action Received for Chinese Patent Application No. 201520365843.1, mailed on Nov. 16, 2015, 2 pages (2 pages of English Translation).
"WeChat for Android", CNET Download.com, Available at http://download.cnet.com/WeChat/3000-2150_4-75739423.html, Jan. 7, 2013, 6 pages.
"Why WeChat might kill Whatsapp's future", Digitalstreetsa.com, Available at http://digitalstreetsa.com/why-wechatmight- kill-whatsapps-future/, Jul. 3, 2013, 10 pages.
Grothaus, Michael, "WhatsApp Introduces Major New Audio Features", Available at http://www.engadget.com/2013/08/07/whatsapp-introduces-major-new-audio-features/, Aug. 7, 2013, 4 pages.
Norman, Don, "Affordances and Design", Jng.org, Available at http://jnd.org/dn.mss/affordances_and.html., 5 pages.
International Search Report and Written Opinion received for PCT Patent Application No. PCT/US2015/032305, mailed on Sep. 10, 2015, 10 pages.
International Search Report and Written Opinion received for PCT Patent Application No. PCT/US2015/032309, mailed on Sep. 2, 2015, 10 pages.
Invitation to Pay Additional Fees and Partial Search Report received for PCT Patent Application No. PCT/US2015/043487, mailed on Nov. 9, 2015, 4 pages.
Invitation to Pay Additional Fees received for PCT Patent Application No. PCT/US2015/046787, mailed on Dec. 15, 2015, 8 pages.
S. Rohan, "WeChat Review—Communication Application with Screenshots", Absolute Blogger, Available at <http://www.absoluteblogger.com/2012/10/wechat-review-communication-application.html>, Oct. 19, 2010, 5 pages.
WeChat Wiki, "WeChat Wik", Available on http://web.archive.org/web/20130514131044/http://wechat.wikia.com/wiki/WeChat_Wiki (Last Accessed on Jan. 4, 2014), May 14, 2013, 12 pages.
Notice of Allowance received for Chinese Patent Application No. 201520669842.6, mailed on May 18, 2016, 4 pages (2 pages of English Translation and 2 pages of Official copy).
Office Action received for Danish Patent Application No. PA201570550, mailed on Oct. 19, 2016, 3 pages.
Intention to Grant received for Denmark Patent Application No. PA201570550, mailed on Dec. 22, 2016, 2 pages.
Office Action received for Taiwanese Patent Application No. 104128704, mailed on Nov. 2, 2016, 12 pages. (5 pages of English Translation and 7 pages of Official Copy).
"Samsung Gear 2 User manual", Available at http://www.slideshare.net/badaindonesia/samsung-gear-2-user-manual, Apr. 2014, 5 pages.

\* cited by examiner

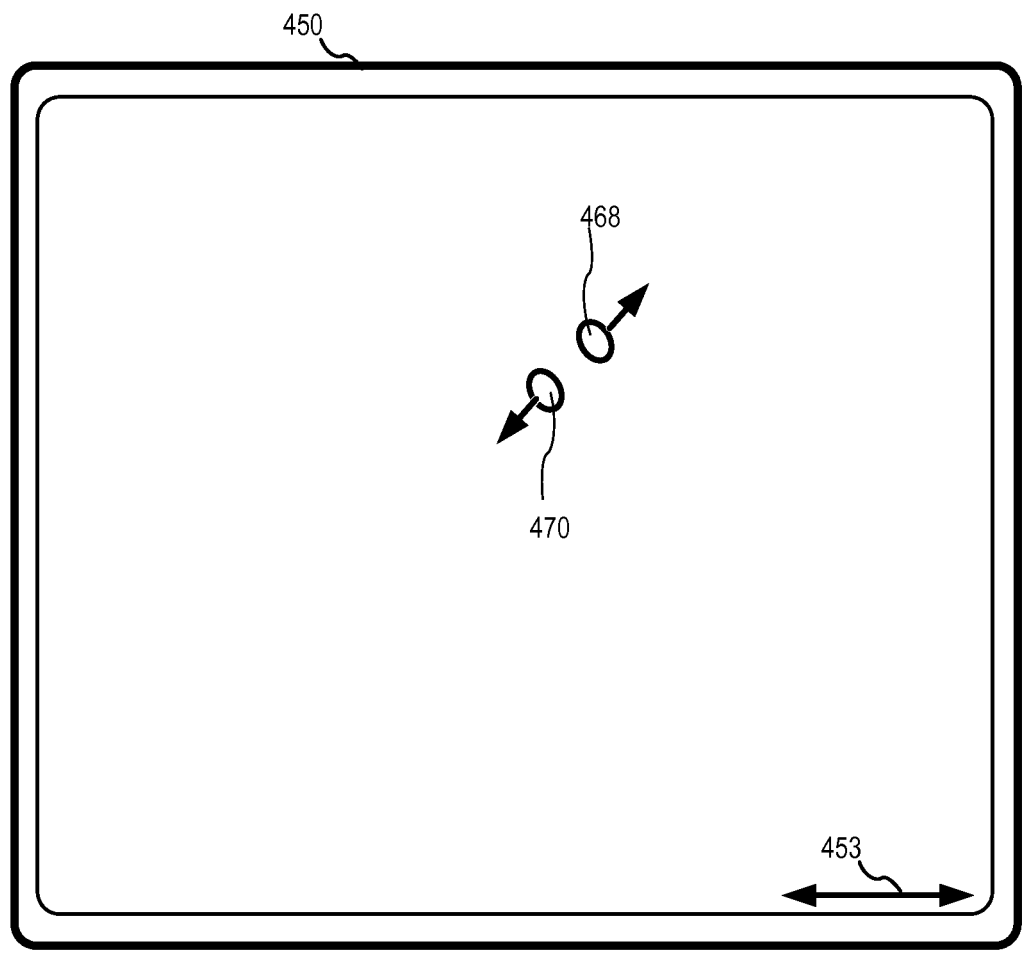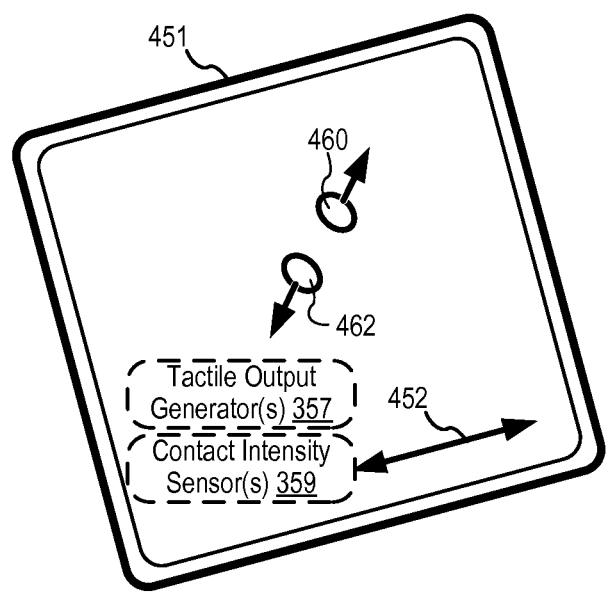
FIG. 4B

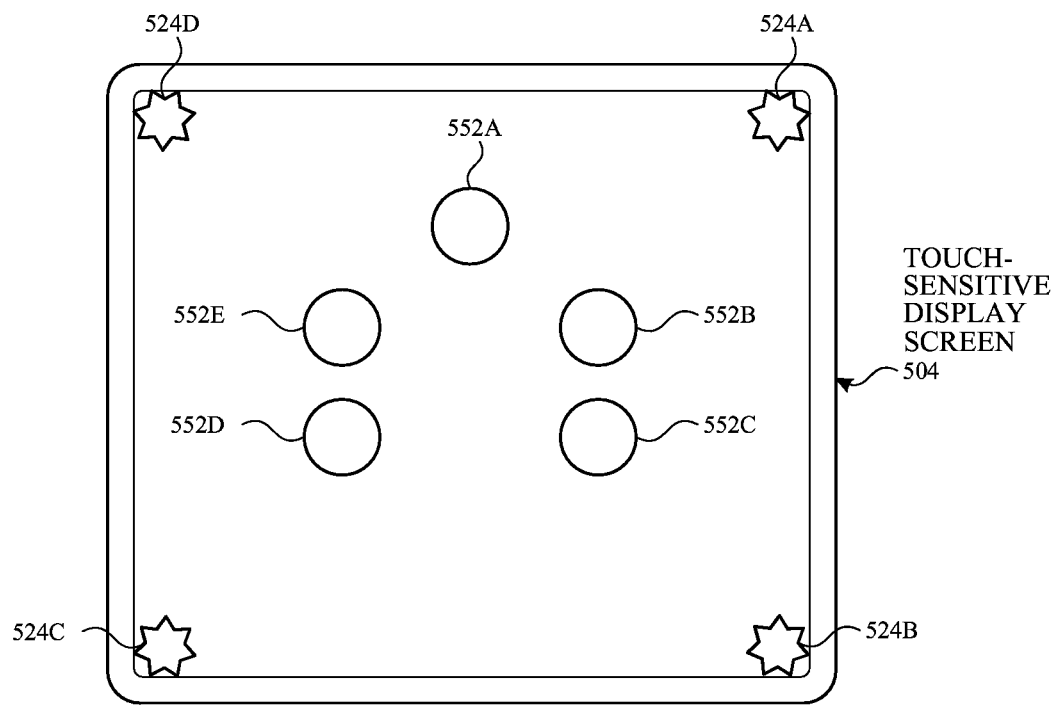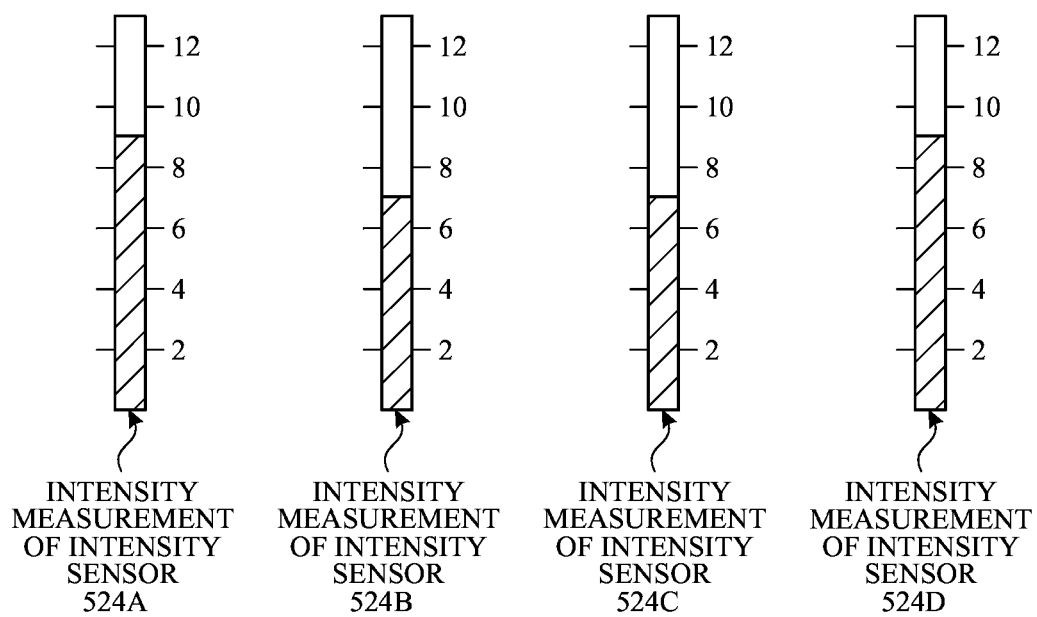
*FIG. 5C*

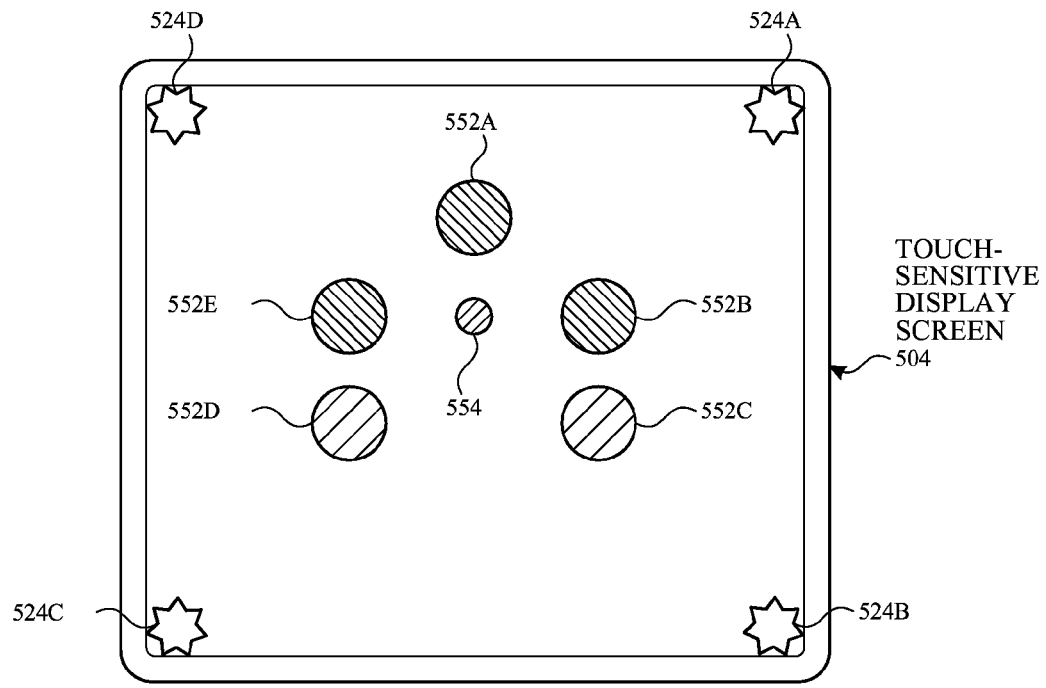
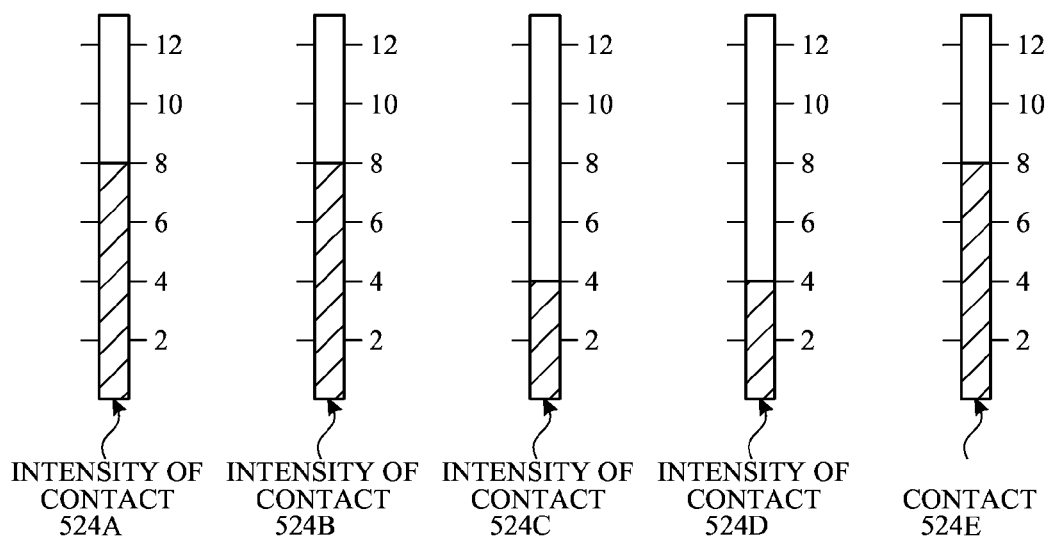
*FIG. 5D*

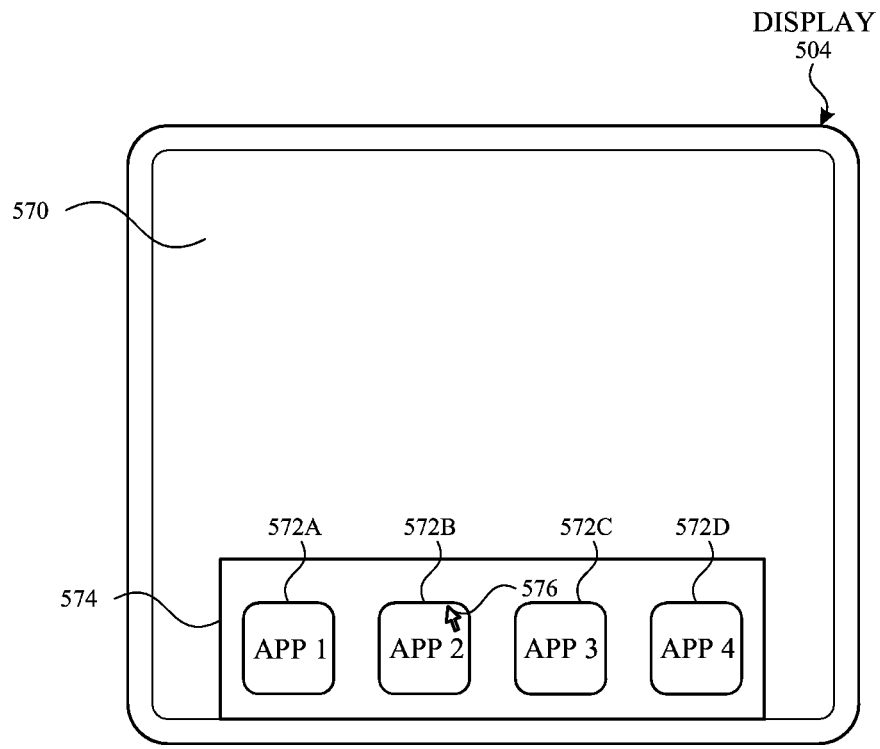
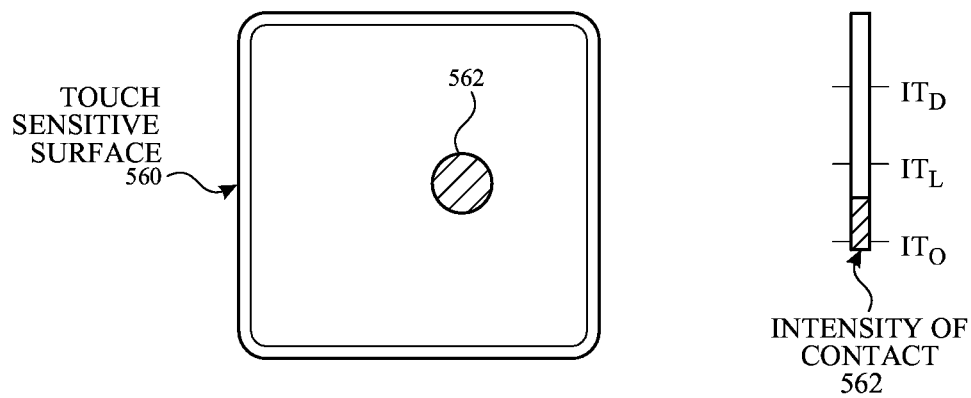
FIG. 5E

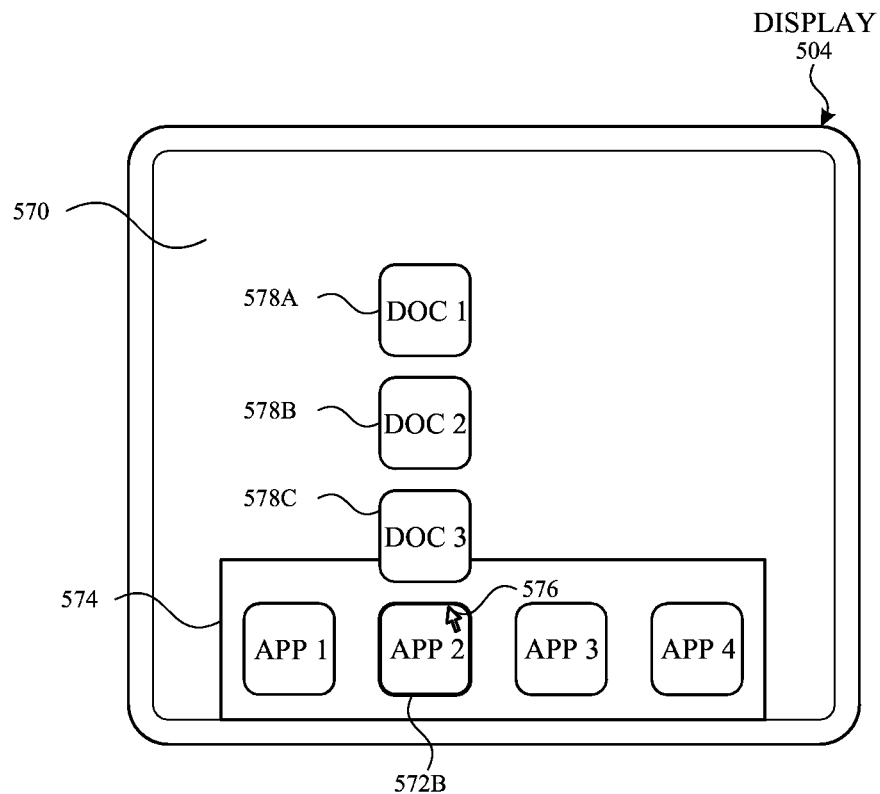
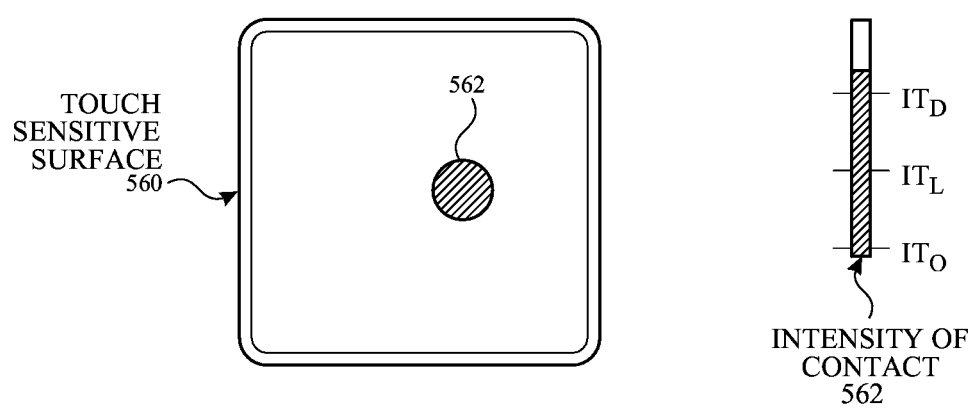
FIG. 5H

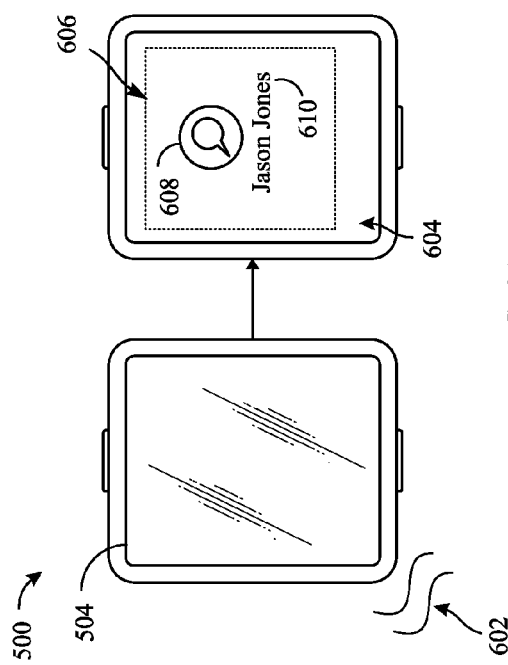
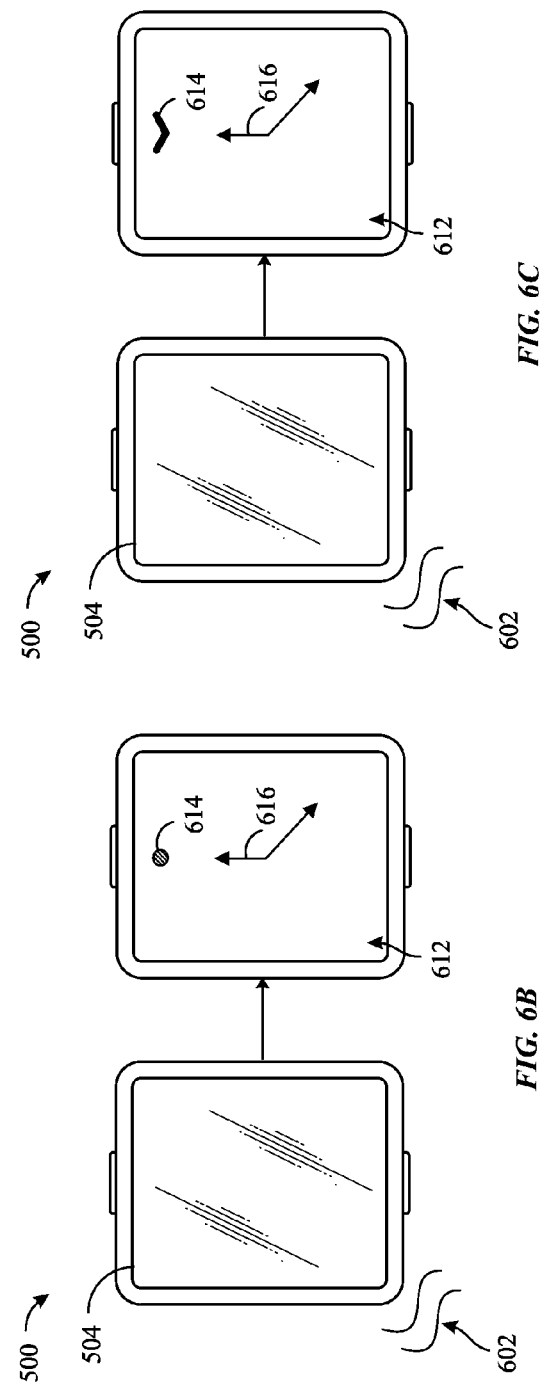

2700

```
┌─────────────────────────────────────────────────────────────┐
│                          2702                                │
│  While displaying content, receive an alert comprising information │
└─────────────────────────────────────────────────────────────┘
                              │
                              ▼
┌─────────────────────────────────────────────────────────────┐
│                          2704                                │
│ Display a notification banner across the display, where the banner comprises a │
│ portion of the information, and at least a portion of the content continues to be │
│                         displayed                            │
└─────────────────────────────────────────────────────────────┘
                              │
                              ▼
┌─────────────────────────────────────────────────────────────┐
│                          2706                                │
│           Detect a contact on the notification banner        │
└─────────────────────────────────────────────────────────────┘
                              │
                              ▼
┌─────────────────────────────────────────────────────────────┐
│                          2708                                │
│ In response to detecting a contact, displaying a second portion of the │
│ information, where the second portion is different from the first portion. │
└─────────────────────────────────────────────────────────────┘
```

*FIG. 27*

REDUCED-SIZE INTERFACES FOR MANAGING ALERTS

CROSS-REFERENCE TO RELATED APPLICATIONS

This application claims priority to U.S. Provisional Patent Application Ser. No. 62/044,894, "Reduced-Size Interfaces For Managing Alerts," filed on Sep. 2, 2014, and to U.S. Provisional Application Ser. No. 62/129,818, "Reduced-Size Interfaces For Managing Alerts," filed on Mar. 7, 2015. The content of these applications is hereby incorporated by reference for all purposes.

This application relates to U.S. Provisional Patent Application Ser. No. 62/129,924 titled "Reduced-Size Notification Interface," filed Mar. 8, 2015; U.S. Provisional Patent Application Ser. No. 62/044,953 titled "Reduced-Size Notification Interface," filed Sep. 2, 2014; U.S. Provisional Patent Application Ser. No. 62/129,903 entitled "User Interface For Receiving User Input," filed Mar. 8, 2015; U.S. Provisional Patent Application Ser. No. 62/127,800 titled "User Interface For Receiving User Input," filed Mar. 3, 2015; U.S. Provisional Patent Application Ser. No. 62/044,923 entitled "User Interface For Receiving User Input," filed Sep. 2, 2014; U.S. Provisional Patent Application Ser. No. 62/026,532, "Raise Gesture Detection in a Device," filed Jul. 18, 2014; International Patent Application Serial No. PCT/US2013/040061, "Device, Method, and Graphical User Interface for Displaying User Interface Objects Corresponding to an Application," filed May 8, 2013; International Patent Application Serial No. PCT/US2013/069483, titled "Device, Method, and Graphical User Interface for Transitioning Between Touch Input to Display Output Relationships," filed Nov. 11, 2013; and U.S. Provisional Patent Application Ser. No. 62/044,894, filed Sep. 2, 2014. The contents of these applications are hereby incorporated by reference in their entirety.

FIELD

The disclosed examples relate generally to user interfaces of electronic devices.

BACKGROUND

Reduced-size electronic devices (e.g., devices that are smaller than typical cellular phones) that are configured to be worn by a user can allow a user to view and respond to various types of alerts, such as text messages, emails, voicemails, and calendar alerts. User interfaces that enable a reduced-size electronic device to be efficiently used for viewing and responding to alerts are desirable.

SUMMARY

In accordance with some embodiments, a method is performed at an electronic device with a display. The method includes receiving an alert comprising information, and in response to receiving the alert, issuing a perceptual output. The method includes detecting a user input and determining whether the user input was detected within a predetermined time interval after the perceptual output. The method includes, in accordance with a determination that the user input was detected within the predetermined time interval, displaying a notification on the display, wherein the notification comprises a first portion of the information.

In accordance with some embodiments, a method is performed at an electronic device with a display. The method includes receiving a first alert and a second alert. The method includes, in response to receiving the first alert and the second alert, determining whether the first alert and second alert meet a grouping criteria. The method includes, in response to a determination that the first alert and the second alert meet the grouping criteria, displaying a grouped notification representing the first alert and the second alert. The method includes, in response to a determination that the first alert and the second alert do not meet the grouping criteria, displaying a first notification representing the first alert, and replacing display of the first notification with display of a second notification representing the second alert.

In accordance with some embodiments, a method is performed at an electronic device that is actively displaying content. The method includes receiving an alert comprising information. The method includes, in response to receiving the alert, displaying a notification banner across a portion of the display, wherein the notification banner comprises a first portion of the information and wherein at least a portion of the content continues to be displayed. The method includes detecting a contact on the display at a location corresponding to the notification banner, and in response to detecting the contact, displaying a second portion of the information, wherein the second portion is different from the first portion.

In accordance with some embodiments, a non-transitory computer-readable storage medium storing one or more programs comprising instructions is disclosed. The instructions, when executed by one or more processors of an electronic device with a display cause the electronic device to: receive an alert comprising information; in response to receiving the alert, issue a perceptual output; detect a user input; determine whether the user input was detected within a predetermined time interval after the perceptual output; and in accordance with a determination that the user input was detected within the predetermined time interval, display a notification on the display, wherein the notification comprises a first portion of the information.

In accordance with some embodiments, a non-transitory computer-readable storage medium storing one or more programs comprising instructions is disclosed. The instructions, when executed by one or more processors of an electronic device with a display cause the electronic device to: receive a plurality of alerts; in response to receiving the plurality of alerts, determine whether the plurality of alerts meet a grouping criteria; in accordance with a determination that the plurality of alerts meet the grouping criteria, display a grouped notification representing the plurality of alerts; and, in response to a determination that the plurality of alerts do not meet the grouping criteria, display a plurality of notifications representing the plurality of alerts.

In accordance with some embodiments, a non-transitory computer-readable storage medium storing one or more programs comprising instructions is disclosed. The instructions, when executed by one or more processors of an electronic device with a touch-sensitive display cause the electronic device to: while actively displaying content, receive an alert comprising information; in response to receiving the alert, display of a notification banner across a portion of the display, wherein the notification banner comprises a first portion of the information and wherein at least a portion of the content continues to be displayed; detect a contact on the touch-sensitive display at a location corresponding to the notification banner; and, in response to detecting the contact, display of a second portion of the information, wherein the second portion is different from the first portion.

In accordance with some embodiments, a transitory computer-readable storage medium storing one or more programs comprising instructions is disclosed. The instructions, when executed by one or more processors of an electronic device with a display cause the electronic device to: receive an alert comprising information; in response to receiving the alert, issue a perceptual output; detect a user input; determine whether the user input was detected within a predetermined time interval after the perceptual output; and in accordance with a determination that the user input was detected within the predetermined time interval, display a notification on the display, wherein the notification comprises a first portion of the information.

In accordance with some embodiments, a transitory computer-readable storage medium storing one or more programs comprising instructions is disclosed. The instructions, when executed by one or more processors of an electronic device with a display cause the electronic device to: receive a plurality of alerts; in response to receiving the plurality of alerts, determine whether the plurality of alerts meet a grouping criteria; in accordance with a determination that the plurality of alerts meet the grouping criteria, display a grouped notification representing the plurality of alerts; and, in response to a determination that the plurality of alerts do not meet the grouping criteria, display a plurality of notifications representing the plurality of alerts.

In accordance with some embodiments, a transitory computer-readable storage medium storing one or more programs comprising instructions is disclosed. The instructions, when executed by one or more processors of an electronic device with a touch-sensitive display cause the electronic device to: while actively displaying content, receive an alert comprising information; in response to receiving the alert, display of a notification banner across a portion of the display, wherein the notification banner comprises a first portion of the information and wherein at least a portion of the content continues to be displayed; detect a contact on the touch-sensitive display at a location corresponding to the notification banner; and, in response to detecting the contact, display of a second portion of the information, wherein the second portion is different from the first portion.

An electronic device, comprising: a display; one or more processors; a memory; and one or more programs, wherein the one or more programs are stored in the memory and configured to be executed by the one or more processors, the one or more programs including instructions for: receiving an alert comprising information, and in response to receiving the alert, issuing a perceptual output; detecting a user input and determining whether the user input was detected within a predetermined time interval after the perceptual output; in accordance with a determination that the user input was detected within the predetermined time interval, displaying a notification on the display, wherein the notification comprises a first portion of the information.

An electronic device, comprising: a display; one or more processors; a memory; and one or more programs, wherein the one or more programs are stored in the memory and configured to be executed by the one or more processors, the one or more programs including instructions for: receiving a first alert and a second alert and, in response to receiving the first alert and the second alert, determining whether the first alert and second alert meet a grouping criteria; in response to a determination that the first alert and the second alert meet the grouping criteria, displaying a grouped notification representing the first alert and the second alert; in response to a determination that the first alert and the second alert do not meet the grouping criteria, displaying a first notification representing the first alert, and replacing display of the first notification with display of a second notification representing the second alert.

An electronic device, comprising: a touch-sensitive display; one or more processors; a memory; and one or more programs, wherein the one or more programs are stored in the memory and configured to be executed by the one or more processors, the one or more programs including instructions for: receiving an alert comprising information and in response to receiving the alert, displaying a notification banner across a portion of the display, wherein the notification banner comprises a first portion of the information and wherein at least a portion of the content continues to be displayed; detecting a contact on the display at a location corresponding to the notification banner, and in response to detecting the contact, displaying a second portion of the information, wherein the second portion is different from the first portion.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 5C illustrates detection of contacts with intensity sensors.

FIG. 5D illustrates assigning an aggregate intensity to contacts.

FIGS. 5E-5H illustrate detection of a gesture having an intensity of contact.

FIGS. 6A-6C illustrate exemplary user interfaces.

FIG. 27 illustrates an exemplary process for managing alerts.

DESCRIPTION OF EMBODIMENTS

Figure 1A:
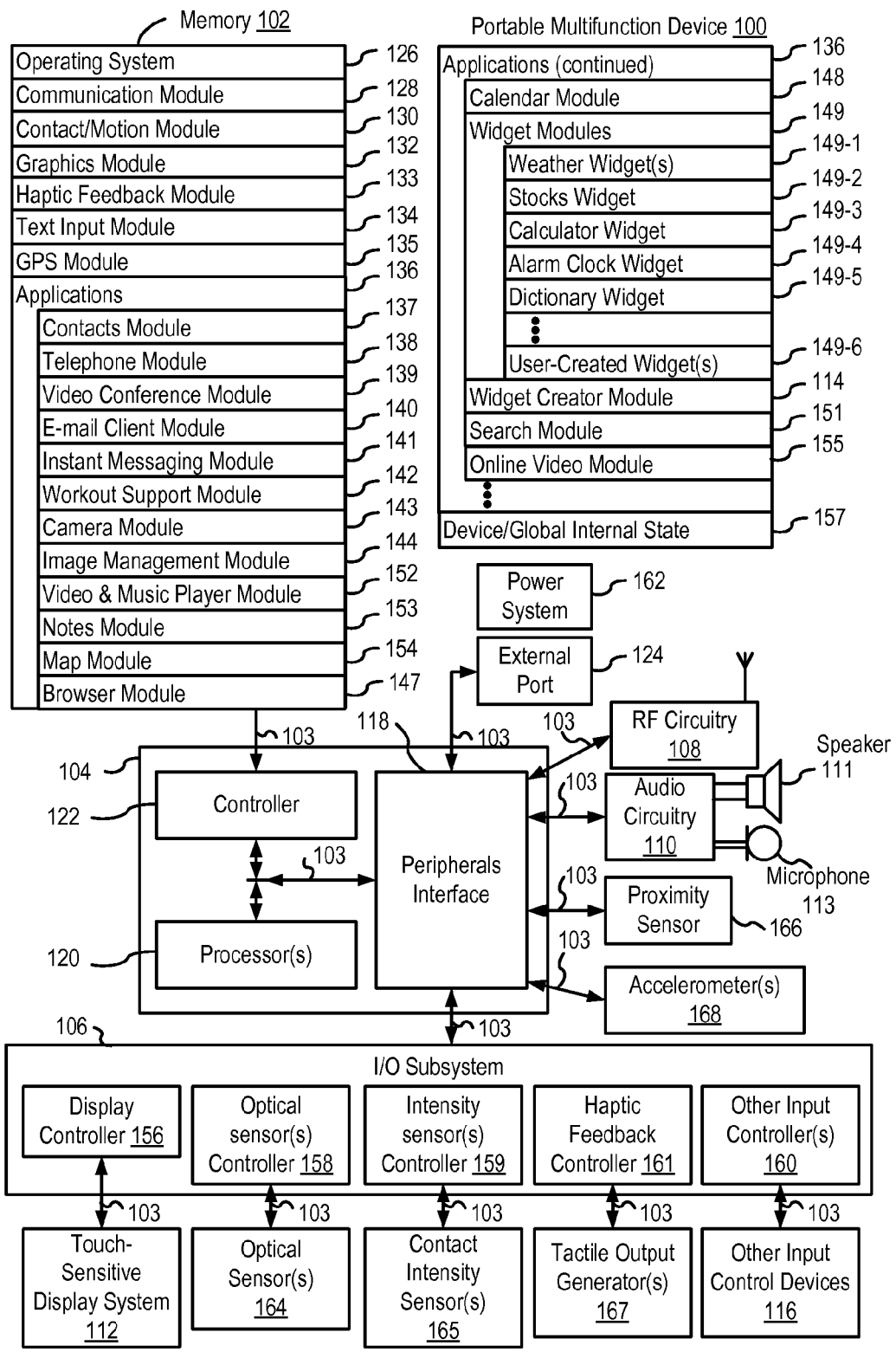
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

As discussed above, a reduced-size personal electronic device that is configured to be worn by a user can enable a user to view and respond to various alerts, such as text messages, emails, voicemails, audio messages, stock alerts, clock alarms, calendar alerts, fitness alerts, store coupons or loyalty program alerts, for example, via user interfaces. There are, however, several challenges associated with viewing and responding to alerts on a reduced-size device. For example, user interface approaches designed for larger screens may not work well on electronic devices having reduced-size screens. The smaller screen size may make it challenging to read textual content associated with an alert, for example, or to provide accurate inputs to a touchscreen. There may be insufficient screen space to display detailed device usage instructions, thus making it important that the user interfaces be intuitive to learn and use. The limited screen size may make displaying multiple tiled screens impractical; thus, replacing one screen with another, and limiting the amount of information displayed on a single screen, may be a more effective user interface strategy.

In addition to the above usability concerns, there may be privacy concerns if the reduced-size electronic device is worn externally by the user (by attaching it to a shirt, belt, bracelet, or necklace, for example) rather than carried in a pocket, case, or purse, as is common with larger electronic devices such as cellular phones or laptops. The user may be concerned that others who are nearby will be able to view the alerts, so it may be desirable that such user interfaces allow the user to control when and how much of the alert content is displayed. Furthermore, if the device is worn by the user and is thus in closer contact with the user than, for example, a cellular phone, it may be desirable that such user interfaces do not annoy the user with frequent interruptions.

Ideally, the user interface should make it quick, easy, and intuitive for a user to view and respond to alerts on a reduced-size personal electronic device. Such techniques can reduce the cognitive burden on a user who uses alerts, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing alert notifications. FIGS. 6A-24 illustrate exemplary user interfaces for managing alert notifications. The user interfaces in the figures are also used to illustrate the processes described below, including the processes in FIGS. 25-27.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience, and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 2005/0190059, "Acceleration-based Theft Detection System for Portable Electronic Devices," and U.S. Patent Publication No. 2006/0017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
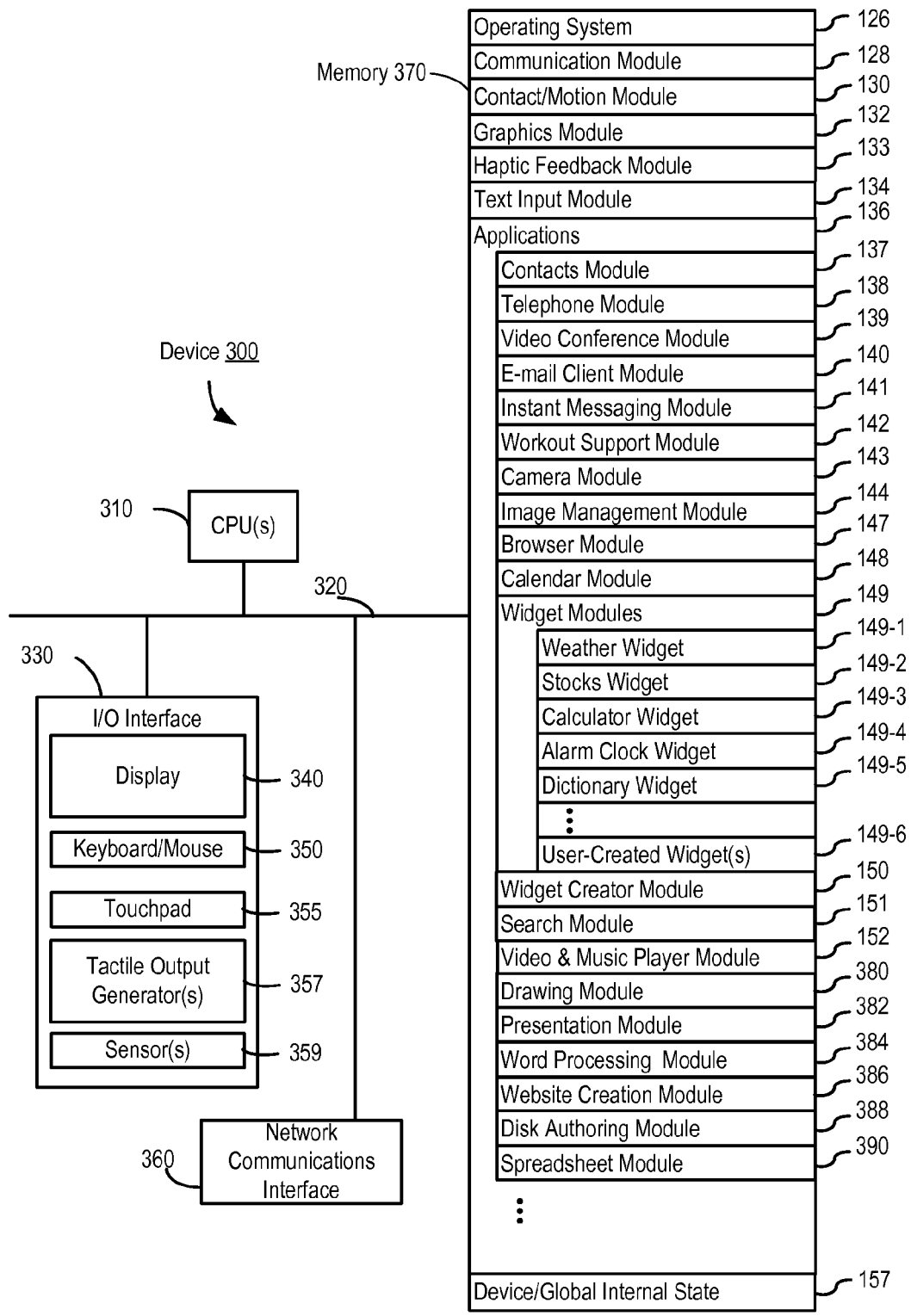
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
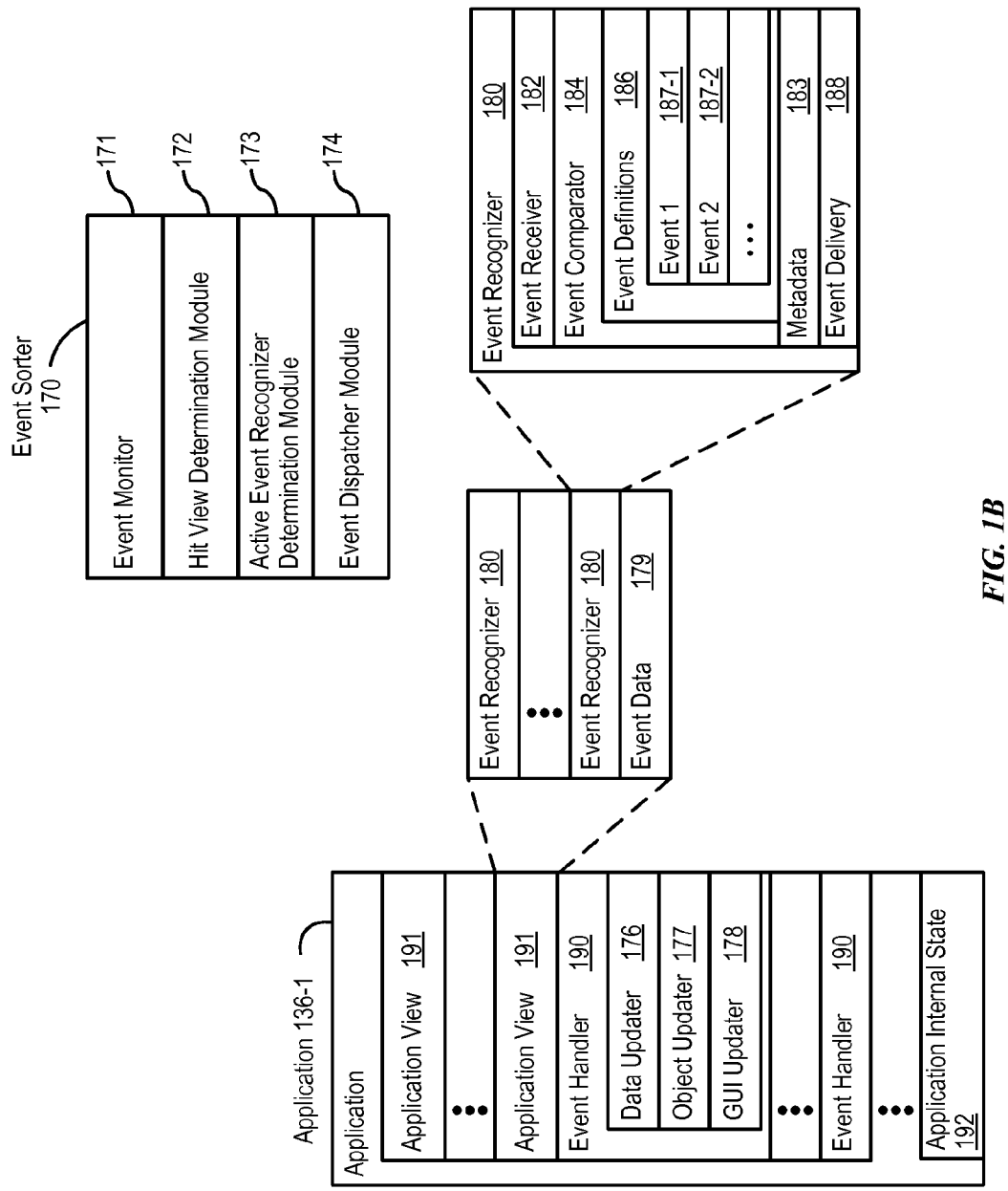
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc., on touchpads; pen stylus inputs; movement of the device; oral instructions; detected eye movements; biometric inputs; and/or any combination thereof are optionally utilized as inputs corresponding to sub-events which define an event to be recognized.

Figure 2:
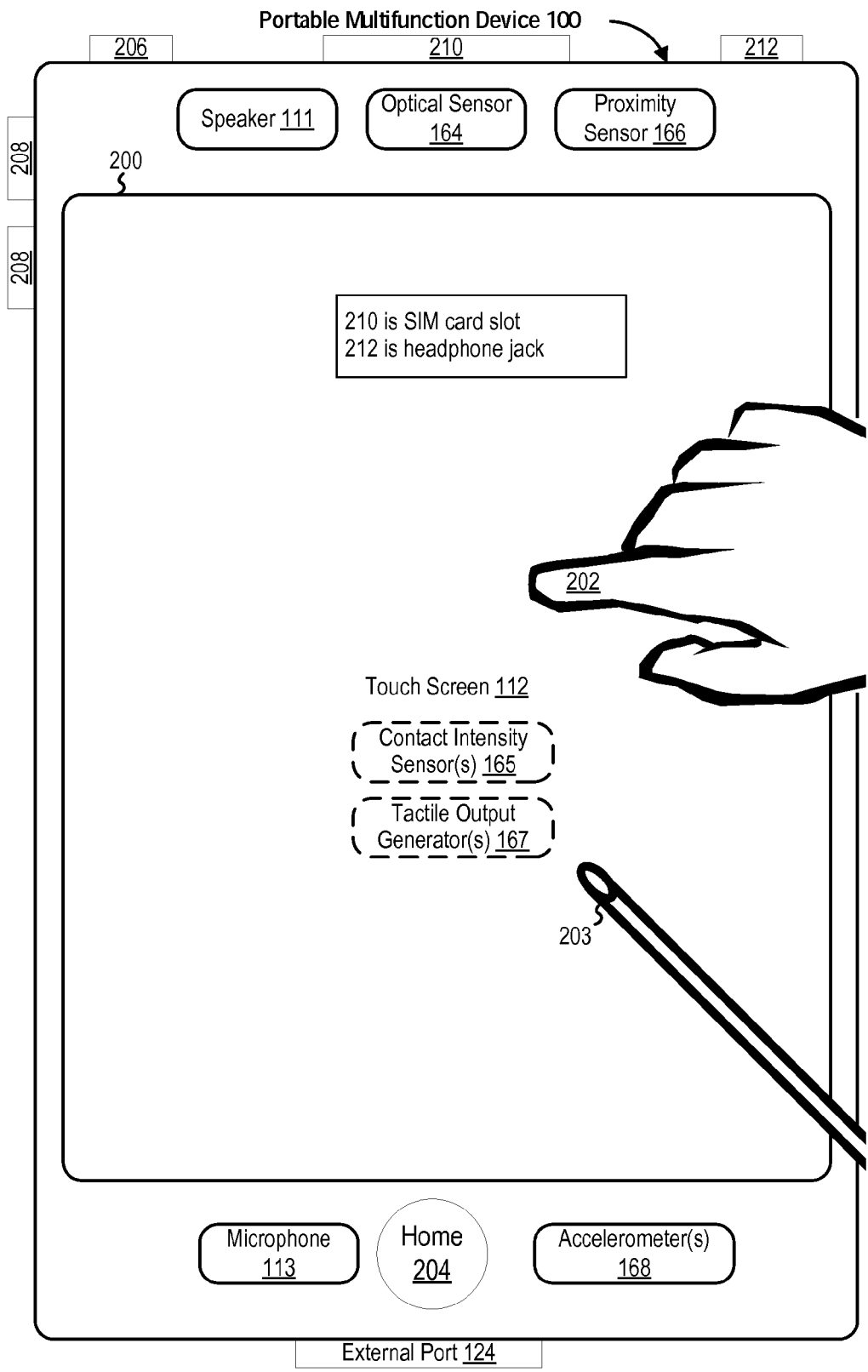
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
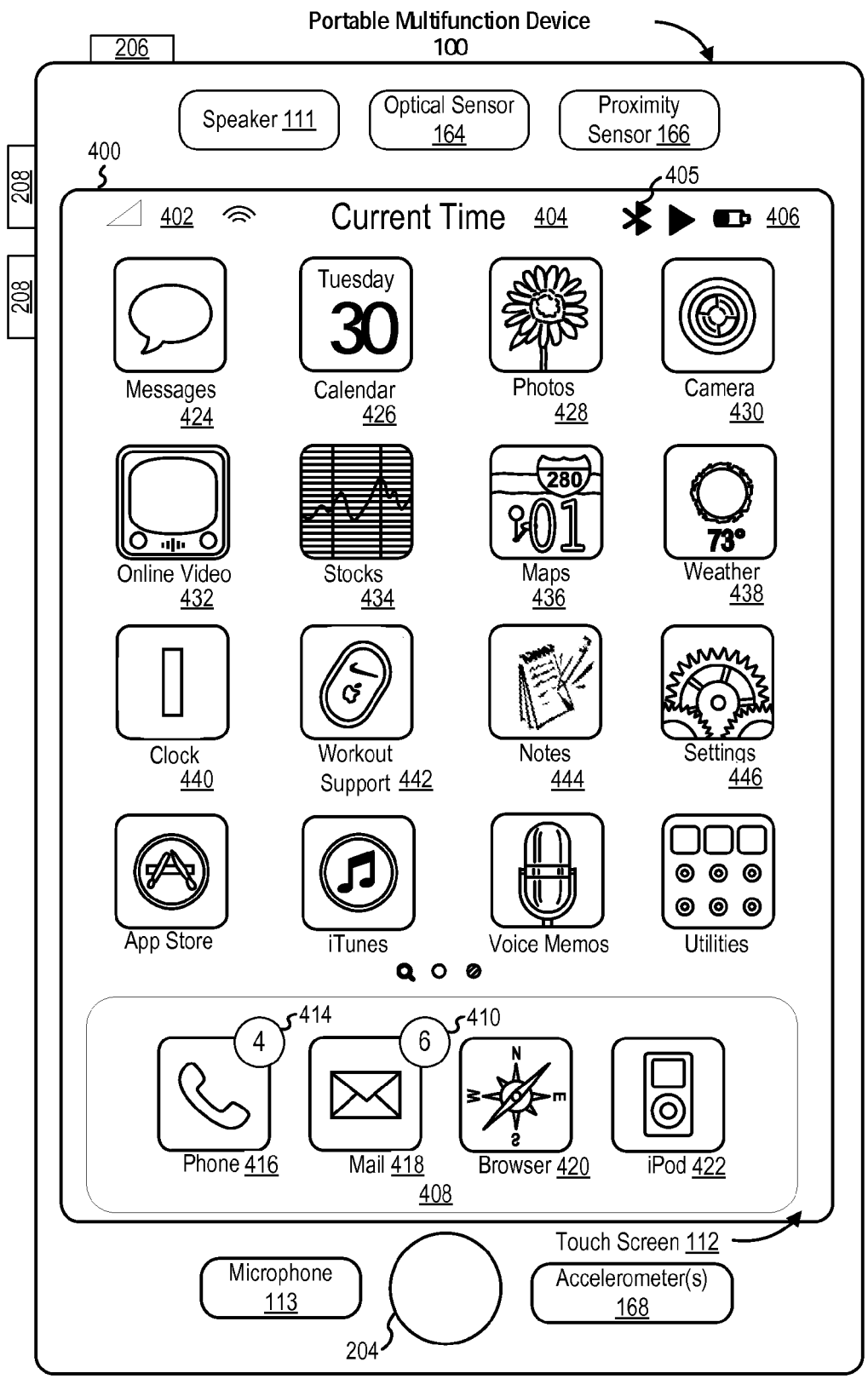
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
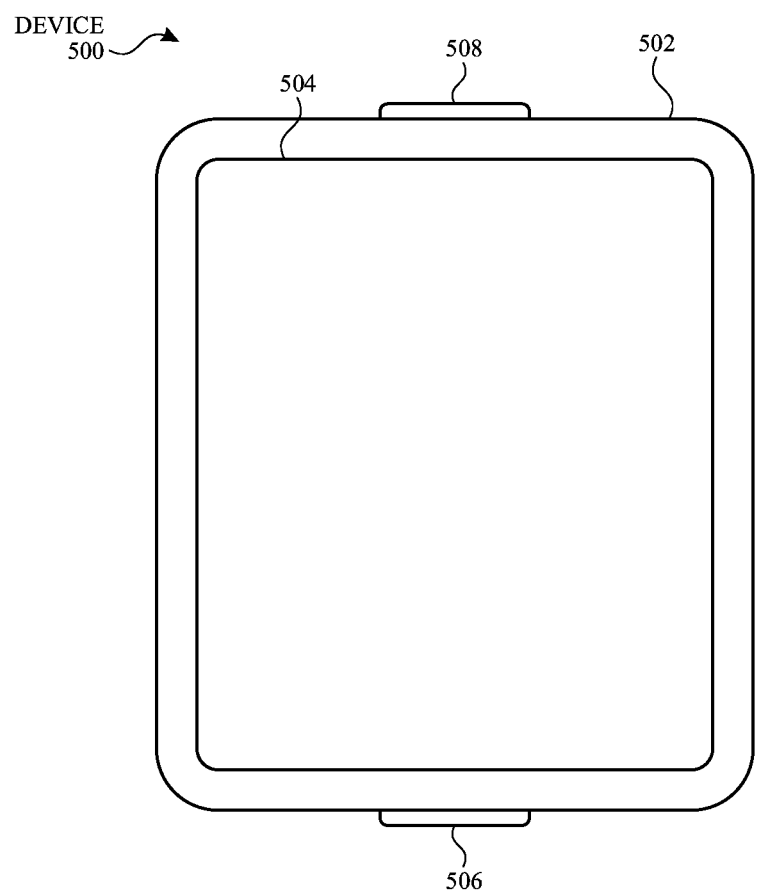
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in its entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
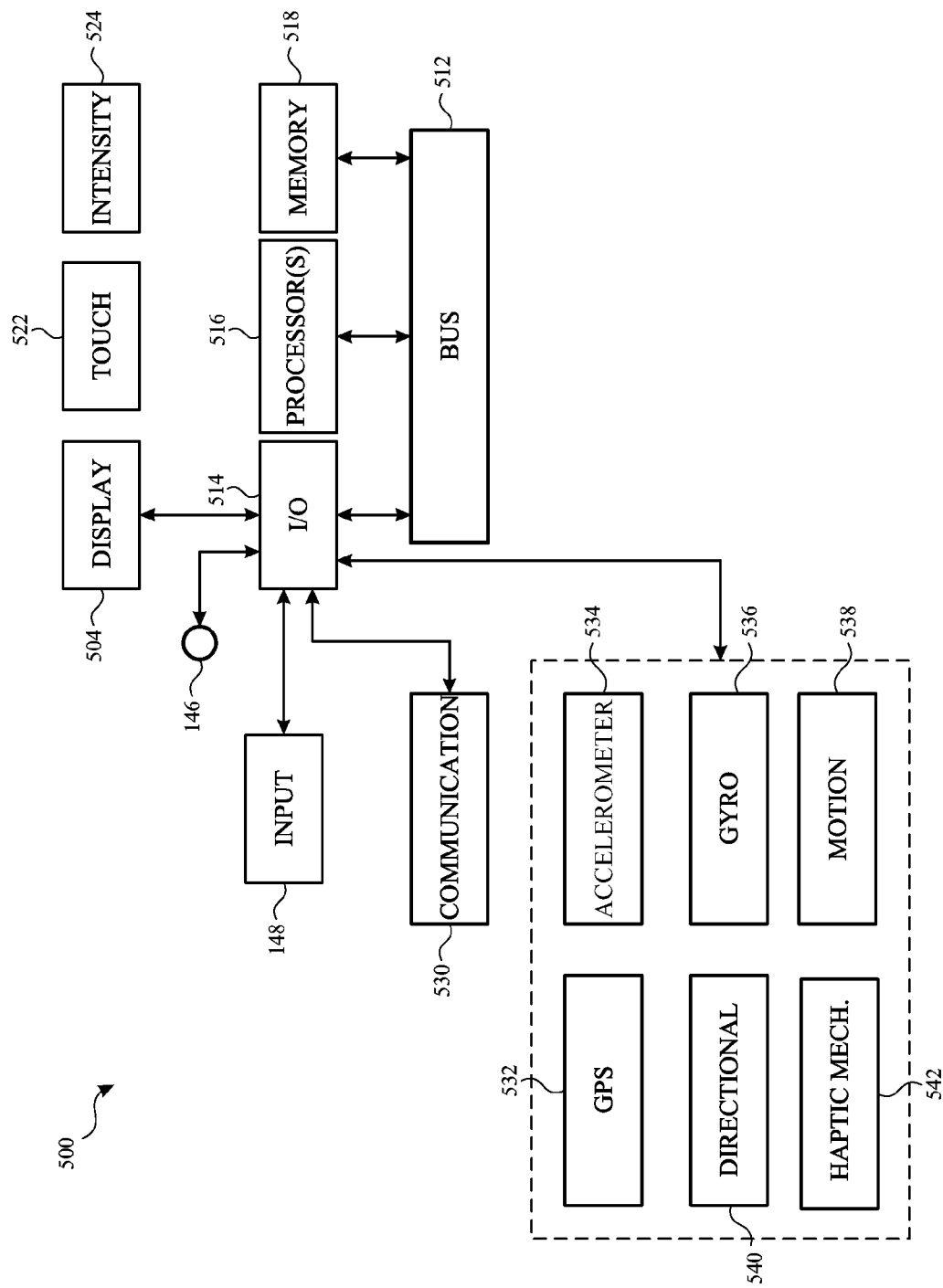
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514. Personal electronic device 500 can also include haptic mechanism 542. Haptic mechanism 542 may issue a vibration or other haptic output that can be perceived by a user. In some embodiments, haptic mechanism 542 may issue haptic outputs in a manner similar to that described for tactile output generator 167 of device 100.

Memory 518 of personal electronic device 500 can be a non-transitory computer-readable storage medium, for storing computer-executable instructions, which, when executed by one or more computer processors 516, for example, can cause the computer processors to perform the techniques described above, including processes 2500-2700 (FIGS. 25-27). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation)

rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
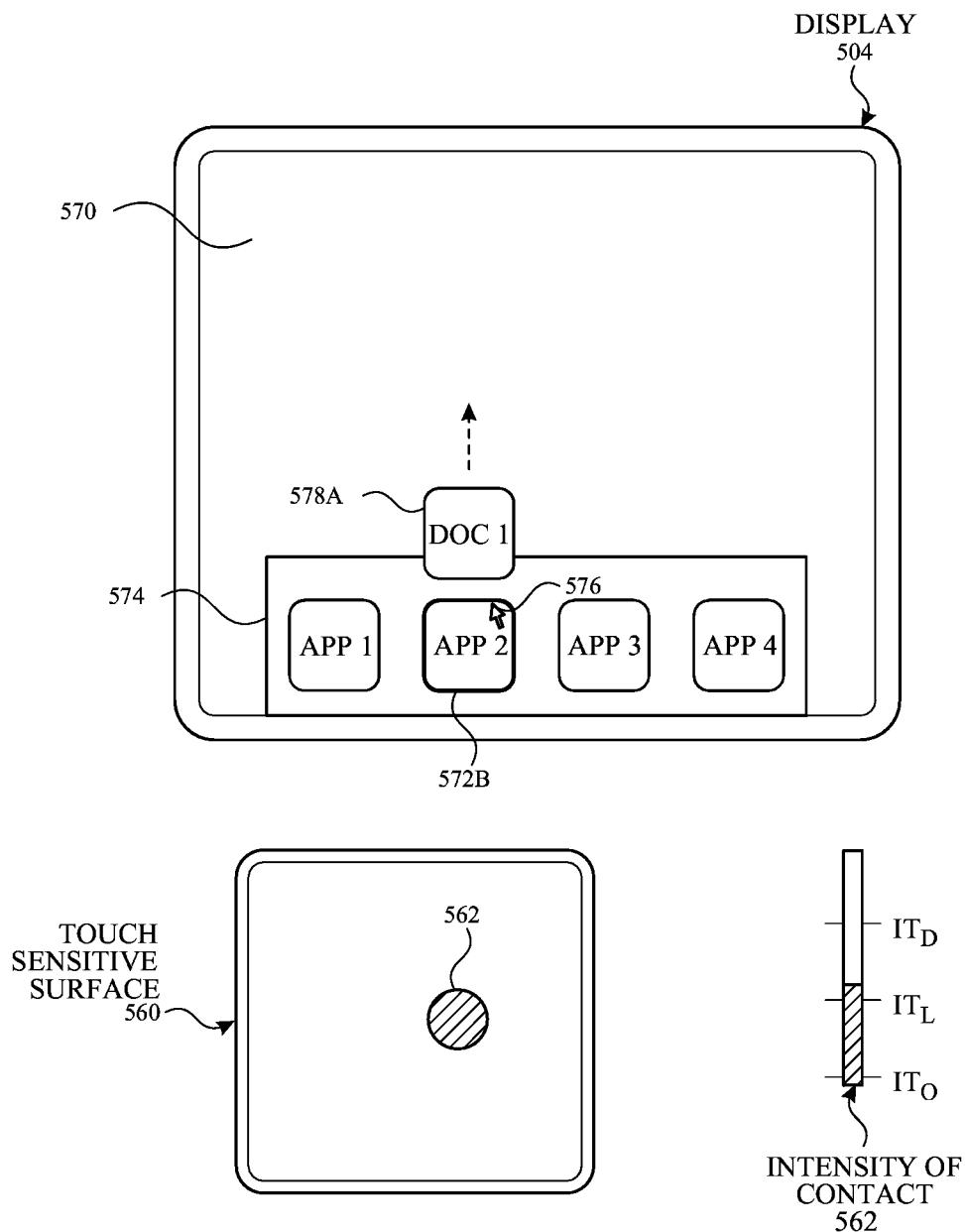
Figure 5G:
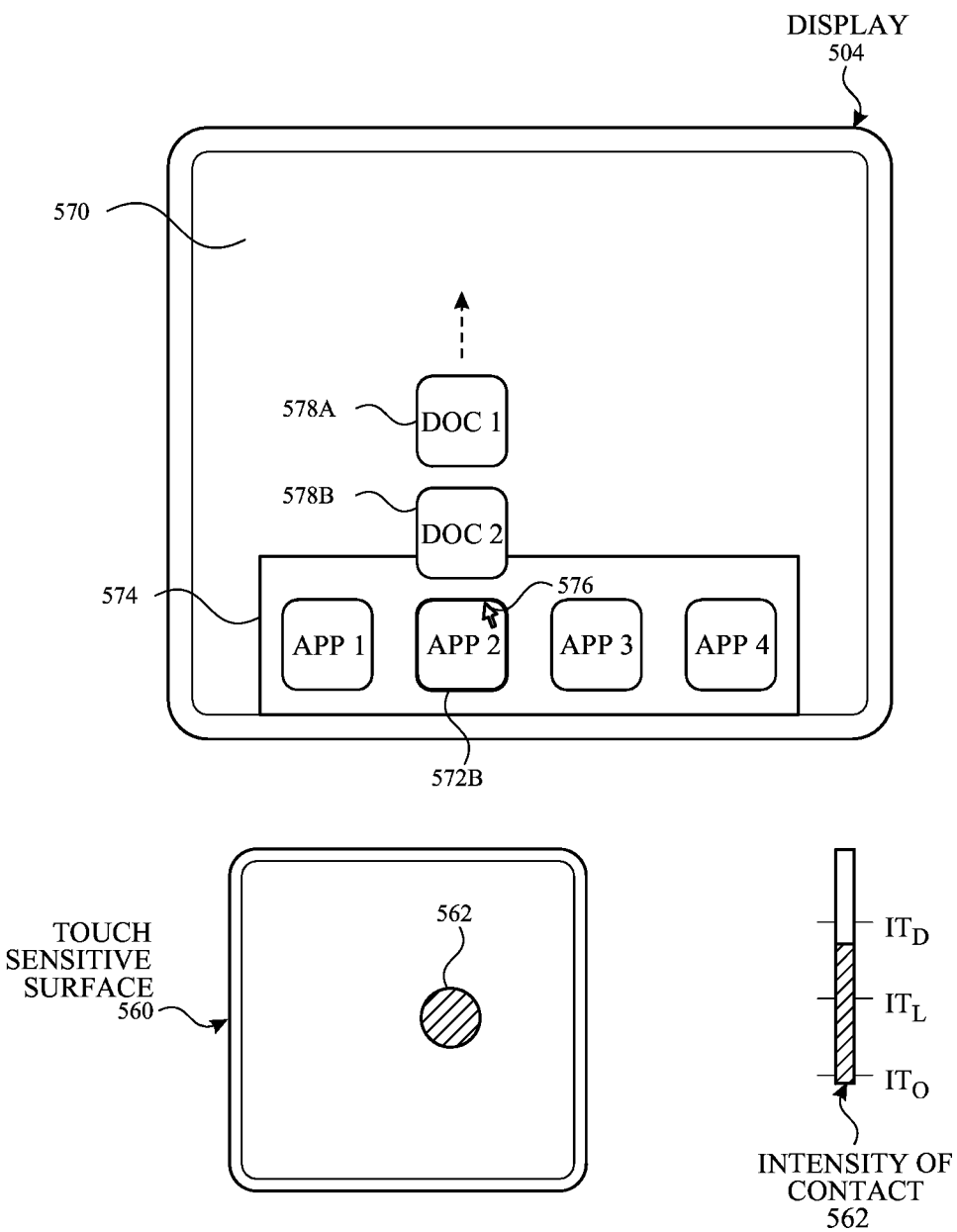

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. Attention is now directed towards embodiments of user interfaces and associated processes that may be implemented on a multifunction device with a display and a touch-sensitive surface, such as devices 100, 300, and/or 500, to improve a user's experience in managing alerts.

1. User Interfaces for Managing Alerts

The user interfaces for managing alerts described below are illustrated by exemplary sequences of screens that device 500 can display in response to receiving alerts and detecting various user inputs. In these sequences, the arrows indicate the order in which the screens may be displayed.

a. Displaying Notifications

FIGS. 6A-6B depict exemplary screens 604, 612 that device 500 can display after receiving an alert. Initially, touchscreen 504 may be turned off or inactive. In response to receiving an alert, device 500 can issue a perceptual output 602, such as an audible, visible, or haptic output, that can be perceived by a user. In some embodiments, device 500 can issue a perceptual output by causing a haptic mechanism on device 500 to issue a haptic output. In some embodiments, device 500 can issue a perceptual output by playing a sound or tone that is audible to a user. In some embodiments, device 500 can issue a perceptual output by displaying a visible output, such as a flashing light or an indicator on touchscreen 504.

In some embodiments, issuing the haptic output includes issuing a first haptic output and, after issuing the first haptic output, issuing a second haptic output, where the first haptic output is distinct from the second haptic output. In order to increase the saliency with which a user perceives a haptic output, the user may wish to receive a "pre-alert" haptic output. The first haptic output may "prime" the user for receiving a second haptic output, which in some embodiments may indicate specific information (e.g., the source of the alert) or be associated with a second perceptual output (e.g., an audible or visible output), as described below. For example, it may be difficult for the user to perceive a haptic output while moving or paying attention to something else. Therefore, a first haptic output that "primes" the user to perceive a second haptic output (and optionally, an associated second perceptual output) may be advantageous.

The user may wish to receive a haptic output based on the source of the alert. For example, the user may wish to receive a different haptic output for an email alert than for a voicemail alert. To provide distinctive haptic outputs, the device may issue a haptic output with a distinctive audible or visible output, or the device may issue a haptic output with a distinctive quality, e.g., a distinct intensity, duration, and/or pattern. Allowing the user to receive distinctive haptic outputs that distinguish the source of the alert enables the user to perceive the type of alert without having to look at the display, thus conserving battery life. In some embodiments, the second haptic output is based on the source of the alert. In some embodiments, the second haptic output is issued with an audible or visible output.

In some embodiments, the first haptic output has a greater intensity and/or duration, as compared to the second haptic output. This may be advantageous, for example, by providing a stronger haptic signal to the user, drawing their attention to device 500 in preparation for a second haptic signal (e.g., one with a distinctive aspect based on the source of the alert, or one associated with an audible or visible output). In some embodiments, device 500 may include a user interface (not shown) for configuring whether issuing the haptic output includes issuing a first, "priming" haptic output. In such embodiments, if device 500 is configured to not issue a "priming" haptic output, issuing the haptic output may include issuing only one haptic output.

As depicted in FIG. 6A, in response to detecting a subsequent user input within a predetermined time interval after the perceptual output 602, device 500 can display screen 604 with notification 606 representing the received alert. In some embodiments, the user input may be a contact on touchscreen 504, such as a swipe or tap. In some embodiments, if device 500 is worn on a user's wrist, the user input may be a signal indicative of a user moving device 500 into a viewing position by raising or rotating their wrist. As used herein, a viewing position is a position of device 500 in which the user can view touchscreen 504. In some embodiments, device 500 may detect a signal indicative of a user raising or lowering their wrist as described in U.S. Provisional Patent Application Ser. No. 62/026,532, "Raise Gesture Detection in a Device," hereby incorporated by reference in its entirety.

The received alert includes information. Such information may include a source of the alert, an application associated with the alert, and/or a time and/or date associated with the alert, along with textual, image, or audio content, for example. In some embodiments, the notification representing the received alert comprises a portion of the alert information. For example, as depicted in FIG. 6A, notification 606 comprises the source 610 of the alert (Jason Jones) and an application affordance 608 indicating an application associated with the alert—in this example, a text message application. (The dashed rectangle depicted on screen 604 indicates the content of the notification, but the dashed rectangle may not be displayed.) In some embodiments, in response to detecting a selection of application affordance 608, device 500 can launch an application associated with the alert. In some embodiments, launching an application includes displaying the application on touchscreen 504 and opening the alert for viewing, editing, or responding within the application.

As discussed above, device 500 can display screen 604 in response to detecting a user input within a predetermined time interval following the haptic output. In some embodiments, the predetermined time interval may range from 0 seconds to 3 minutes. In other embodiments, the predetermined time interval may range from 0 seconds to 1 minute. In yet other embodiments, the predetermined time interval may be set by the user, or may be determined by device 500 based on previous user behavior such as an average of previous elapsed times prior to the user providing the input.

The scenario depicted in FIG. 6A may correspond to the case when the user, having perceived the perceptual output issued by device 500 in response to receiving an alert, wishes to promptly view the notification representing the received alert and therefore moves device 500 into a position suitable for viewing touchscreen 504 (e.g., by raising their wrist) within the predetermined time interval.

As depicted in FIG. 6B, if device 500 detects the user input after the predetermined time interval, then device 500 can instead respond by displaying a clock face 612. This scenario may correspond to the case when the user does not wish to promptly view the notification, and raises their wrist sometime after the perceptual output 602 to view touchscreen 504. In some embodiments, the clock face 612 may comprise a user interface object 616 indicating the current time. In some embodiments, the clock face 612 may comprise an indication of an unread alert 614 corresponding to the received alert, because the alert content has not yet been displayed. As shown in FIG. 6B, the indication 614 may be a dot. FIG. 6C depicts another embodiment in which the indication 614 is a chevron. In some embodiments, device 500 displays, in place of a chevron, an arrow, triangle, or other graphical object that provides a directional indication. Indications of unread alerts are described in more detail below.

Figure 7:
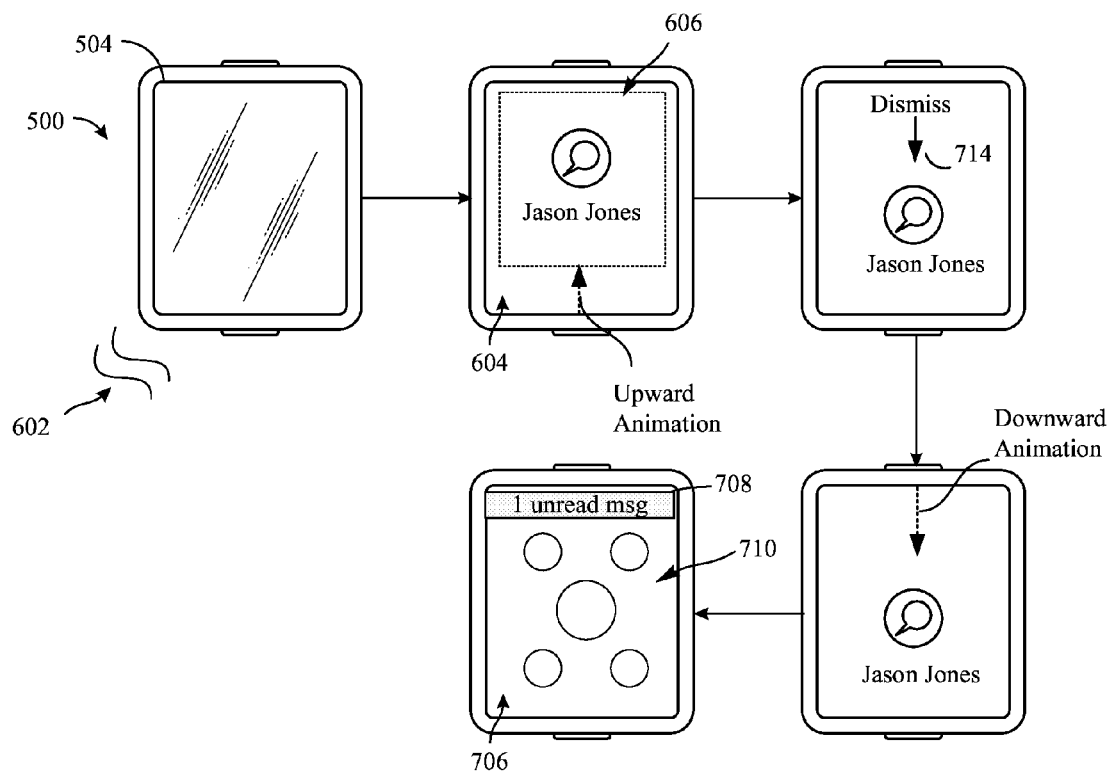
FIG. 7 illustrates an exemplary user interface.

In some embodiments, device 500 can display a home screen rather than clock face 612. An exemplary home screen 706 is depicted in FIG. 7. The home screen may include a plurality of affordances representing a plurality of applications, and may comprise an indication of an unread alert corresponding to the received alert.

If device 500 does not detect the user input within the predetermined time interval after the perceptual output, device 500 may remain in its initial dark or inactive state without displaying screen 604. This scenario may correspond to the case when the user does not wish to promptly view the notification or wishes to avoid allowing others who are nearby to view the notification, and therefore does not move device 500 into position for viewing touchscreen 504 after perceiving the perceptual output.

While notification 606 is displayed, if device 500 detects a second user input within a second predetermined time interval after displaying the notification, device 500 can return touchscreen 504 to its initial dark or inactive state. The second user input may be, for example, a signal indicative of a user moving device 500 out of a viewing position by lowering and/or rotating their wrist. In response to detecting the second user input within the second predetermined time interval, device 500 can return the display to its initial dark or inactive state. This scenario may correspond to the case where the user, having viewed the notification, does not wish to continue viewing or interacting with device 500 and therefore lowers their wrist.

In some embodiments, displaying notification 606 involves displaying an animation that slides notification 606 in a vertical direction onto touchscreen 504. For example, device 500 may display an animation that slides notification 606 up onto touchscreen 504 from the bottom of touchscreen 504. Such an animation can provide a visual cue to the user that, since the notification is "rising up" from the bottom of the screen (for example), dismissing the alert may be performed through a contact with touchscreen 504 in the opposite direction of the animation (such as a downward swipe) to "push down" the notification. The user may also infer from the animation that a contact with touchscreen 504 in the same direction as the animation (such as an upward swipe) may "pull up" (e.g., display) additional alert information, such as the body of a text message or additional text associated with a calendar alert. Thus, animations displayed by device 500 may provide visual cues to the user regarding potential inputs that the user can provide to device 500. A person of skill in the art will recognize that the animation direction for the notification need not be in the upward direction; for example, the notification may slide down onto the touchscreen from the top of the screen, in which case a user may infer that dismissing the notification may require an upward swipe. Such visual cues may improve the man-machine interface by guiding the user to apply the appropriate inputs without requiring display of detailed instructions on the reduced-size screen.

As described above, in some embodiments, device 500 can issue a perceptual output, such as by causing the haptic mechanism to issue a haptic output, in response to receiving an alert, thereby informing the user that an alert has been received. However, in some embodiments, device 500 can delay issuing the perceptual output in response to receiving an alert, in order to deliver the perceptual output at a time that is likely to be more convenient for the user. For example, device 500 may delay the perceptual output until the user is relatively inactive and thus more likely to perceive the perceptual output, or delay the perceptual output to avoid interrupting the user while the user is actively engaged in an activity or is sleeping. In some embodiments, in response to receiving an alert, device 500 may obtain data from one or more motion sensors, accelerometers, heart rate monitors, and/or other type of sensors to determine a current user activity level—such as whether the user is currently exercising, typing, or sleeping. Device 500 can delay the perceptual output until the determined user activity level meets an activity criteria. In some embodiments, the activity criteria may include that the user is relatively still (as determined by outputs from sensors on device 500), has paused from typing on a physical keyboard, has paused in speaking, or is not asleep, for example. In this manner, device 500 can issue a perceptual output to inform the user that a new alert has been received at a time that may be less likely to annoy to the user, while being more likely to be perceived by the user.

After device 500 has displayed a notification, a user may choose to dismiss the notification or to display the alert content (for example, the body of a text message, or text associated with a calendar alert), among other options.

b. Dismissing Notifications

FIG. 7 shows another exemplary sequence of screens that device 500 can display on touchscreen 504 after receiving an alert. As discussed with respect to FIG. 6A, touchscreen 504 may initially be dark or inactive. In response to receiving an alert, device 500 can issue a perceptual output. As described in FIG. 6A, in response to receiving a user input within a first predetermined time interval following the perceptual output, device 500 displays screen 604 including notification 606, which represents the received alert. In this exemplary sequence, displaying notification 606 on screen 604 involves displaying an animation that slides notification 606 upwards from the bottom of touchscreen 504.

If while displaying notification 606 device 500 detects a contact on touchscreen 504 that meets a dismissal criteria, then device 500 can dismiss notification 606. In some embodiments, dismissing notification 606 involves removing notification 606 from the display, and/or replacing display of the notification with display of a clock face (such as clock face 612 in FIG. 6B) or home screen 706.

In some embodiments, the contact meets the dismissal criteria if it is a swipe or flick on touchscreen 504. In some embodiments, the contact meets the dismissal criteria if it is a swipe or flick on touchscreen 504 in a specific direction; such as a swipe or flick in a direction opposite to the direction in which the animation slides the notification onto touchscreen 504. For example, if an animation slides the notification upwards onto touchscreen 504 from the bottom, the contact may meet the dismissal criteria if it is a swipe on touchscreen 504 in the downwards direction. In some embodiments, the contact may meet the dismissal criteria if the distance of the swipe or flick across the touchscreen exceeds a threshold distance. In some embodiments, the threshold distance may be a quarter, half, or ¾ of the length of touchscreen 504.

Returning to FIG. 7, in some embodiments, in response to detecting a movement of a contact (such as a swipe) on touchscreen 504 while displaying notification 606, device 500 can slide notification 606 on the touchscreen in the direction of the movement of the contact and display a dismissal indicator 714 adjacent to the notification. As shown in FIG. 7, in some embodiments, the dismissal indicator may be displayed above the notification, if the direction of the movement of the contact is downwards. The dismissal indicator 714 may provide the user with a visual cue that, if the movement of the contact is continued in the same direction, the notification will be dismissed. After displaying the dismissal indicator, in some embodiments, if the contact meets the threshold criteria, then in response to detecting the release of the contact, device 500 can dismiss notification 606 and remove the dismissal indicator 714 from touchscreen 504. If the contact does not meet the threshold criteria (for example, if the movement of the contact does not exceed a threshold distance), device 500 can display an animation that slides notification 606 back to its initial position on the display, and remove the dismissal indicator 714 from the display. Thus, in this example, a user must "push down" the notification far enough to exceed a threshold distance in order to dismiss the notification; otherwise, the notification rebounds to its original position. In some embodiments, as depicted in FIG. 7, dismissing notification 606 involves displaying an animation that slides notification 606 off of touchscreen 504. In some embodiments, the animation slides notification 606 off of touchscreen 504 in the direction of the swipe or flick.

As previously discussed, a user may also dismiss a notification by lowering their wrist (as detected by device 500) while the notification is displayed. In some embodiments, device 500 can respond differently when a notification is dismissed in response to detecting a contact that meets the dismissal criteria (as discussed with respect to FIG. 7) than when a notification is dismissed in response to detecting a signal indicative of lowering their wrist, as described earlier. For example, if device 500 is worn on a user's wrist and device 500 detects a signal indicative of the user lowering their wrist, device 500 may assume that the user is no longer viewing touchscreen 504, and therefore may turn off or inactivate touchscreen 504 after dismissing the notification. In contrast, if device 500 is displaying a notification and detects a contact on touchscreen 504 that meets a dismissal criteria (such as a downward swipe), device 500 may assume that the user is still actively viewing touchscreen 504, and device 500 may respond to the contact by dismissing the notification and then displaying a clock face, home screen, or some other screen, such as the screen that was being displayed prior to receiving the alert.

c. Displaying Alert Content

As previously discussed, a received alert includes information, which may include a source of the alert, an application associated with the alert, and a time of the alert, along with (possibly) alert content, such as the body of a text message or email, a voicemail message, details regarding a calendar reminder, or other types of content. A notification representing a received alert may include a first portion of this alert information, such as the alert's source, associated application, or time received.

As previously discussed with respect to FIGS. 6A, 6B, and 7, after receiving an alert device 500 can issue a perceptual output, and then display notification 606 in response to detecting a user input within a first time interval following the perceptual output. After raising their wrist to view the notification, a user may then wish to view the associated alert content.

In some embodiments, if device 500 determines that the user continues to maintain device 500 in the viewing position for a predetermined time interval after displaying the notification, device 500 can display some or all of the alert content, which may be referred to as a second portion of the information. That is, in some embodiments, device 500 can automatically transition from displaying the notification to displaying the alert content, if the user holds device 500 in a viewing position and waits.

Figure 8:
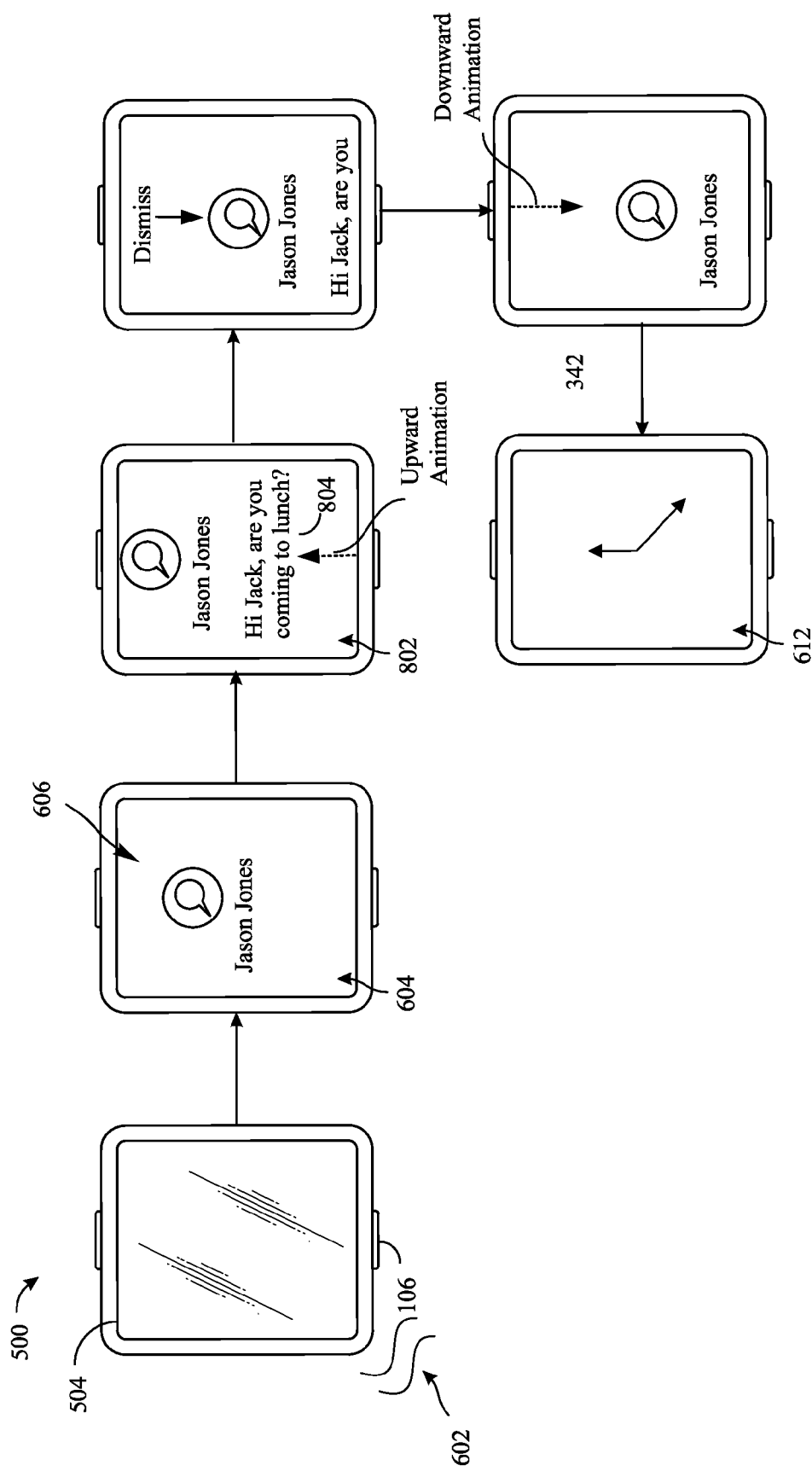
FIG. 8 illustrates an exemplary user interface.

FIG. 8 depicts an exemplary sequence of screens that device 500 can display in response to receiving an alert. Initially touchscreen 504 may be dark or inactive. In response to receiving the alert, device 500 can issue a perceptual output. In response to receiving a user input within a predetermined time period after the perceptual output (as described with respect to FIG. 6A), device 500 can display notification 606. In response to a determination that the user input continues to be received after a second predetermined time period after displaying notification 606—thus indicating that device 500 remains in a viewing position—device 500 can display screen 802, which includes notification 606 and alert content 804. In some embodiments, device 500 can display screen 802 in response to detecting a lack of a second user input within the second predetermined time period after displaying notification 606. The second user input may be a signal indicative of a user lowering their wrist, for example, and the lack of such an input indicates that the device 500 remains in the viewing position.

In this example, the alert content 804 is the body of a text message represented by notification 606. In other examples, the alert content may include the subject line and some or all of the body of a received email alert, or may be some or all of the textual content associated with a calendar alert, or a multimedia message, for example.

As indicated in FIG. 8, in some embodiments, displaying the alert content 804 involves displaying an animation that slides notification 606 upwards on touchscreen 504 while sliding the alert content 804 up from the bottom of touchscreen 504 for display, so that the notification and the alert content are displayed on the same screen. In some embodiments, device 500 can slide notification 606 into an upper corner of touchscreen 504 to provide space for displaying the alert content. In some embodiments, device 500 can shrink the display size of notification 606 to provide space for displaying the alert content.

In some embodiments, if the alert content is too long to be fully displayed on touchscreen 504, the alert content can be scrolled. In response to detecting a user input, device 500 can scroll the alert content to allow a user to view addition alert content on touchscreen 504. Such scroll inputs may include a contact (such as an upward or downward swipe or flick) on touchscreen 504, for example, or may include a rotation of a rotatable input mechanism, if present. In some embodiments, device 500 can scroll the alert content in accordance with the user input; for example, in response to an upward swipe on touchscreen 504, device 500 can move the alert content upwards on touchscreen 504.

As depicted in FIG. 8, in some embodiments, device 500 can dismiss the notification and alert content in response to detecting a contact that meets a dismissal criteria, as described previously with respect to FIG. 7. In some embodiments, dismissing notification 606 and alert content 804 involves sliding notification 606 and alert content 804 off of touchscreen 504. In some embodiments, device 500 can display a dismissal indicator and "rebound" the notification and alert content if the movement of the contact does not exceed a threshold distance, as previously described. In some embodiments, device 500 can display a clock face 612 after dismissing the notification and alert content. In some embodiments, if clock face 612 is displayed after alert content is dismissed, the clock face may be displayed without an indication of an unread alert, since the alert content has been displayed.

As previously discussed, device 500 can display alert content in response to detecting that device has been maintained in the viewing position after displaying a notification. However, in some cases, a user may not wish to wait to view the alert content by maintaining device 500 in the viewing position for the predetermined time interval. Thus, in some embodiments, device 500 can also display screen 802 in response to a detecting contact with touchscreen 504 while notification 606 is displayed. In some embodiments, the contact for invoking display of the alert content 804 may comprise a movement of the contact on touchscreen 504, such as a swipe or flick. In some embodiments, the swipe or flick must be in the same direction as the animation that slides notification 606 onto touchscreen 504, such as an upward swipe on touchscreen 504, thus conceptually "pulling up" more alert information after the notification. In some embodiments, the contact can be a touch (e.g., a finger tap) on or near notification 606.

Figure 24:
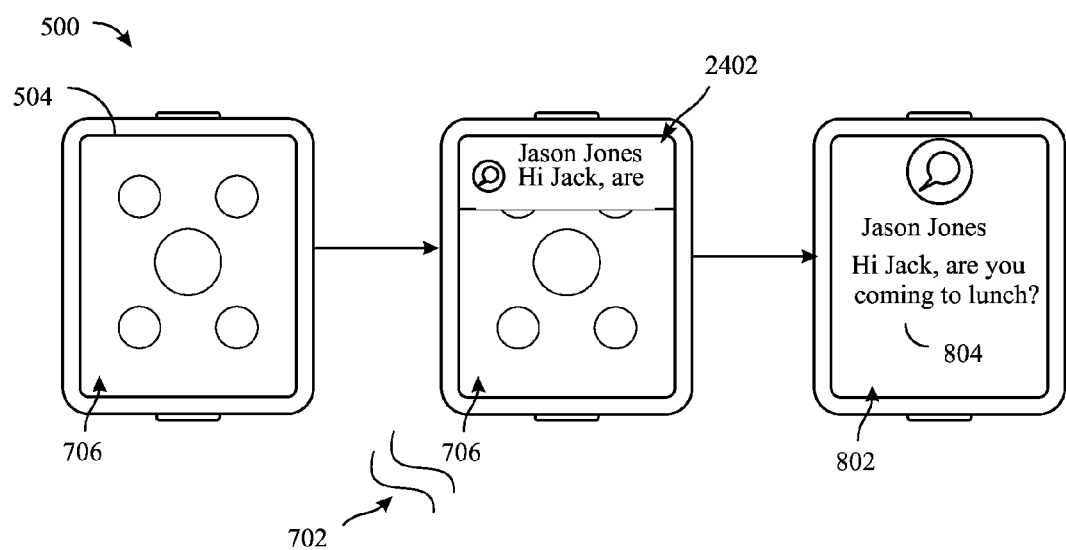
FIG. 24 illustrates an exemplary user interface.

As depicted in FIG. 24, in some embodiments, in response to receiving an alert while touchscreen 504 is actively displaying content, device 500 can display a notification banner 2402 across the top of touchscreen 504 while still displaying at least a portion of the screen content. In some embodiments, in response to receiving an alert while touchscreen 504 is actively displaying content, device 500 may also issue a perceptual output 702. In the example shown in FIG. 24, the content displayed is home screen 706. In response to detecting a contact on notification banner 2402, such as a swipe or tap, device 500 can display screen 802 with alert content 804.

Some alerts may not have any alert content. For example, a clock alarm, low-battery alert, or fitness alert may not have any alert content. Thus, in some embodiments, device 500 can continue to display a notification without transitioning to displaying the alert content.

d. Suppressing Automatic Display of Alert Content

In some cases, a user may not want device 500 to automatically display alert content as described with respect to FIG. 8, due to privacy concerns or for other reasons. Thus, in some embodiments, device 500 can provide an option for a user to suppress such automatic display of alert content by changing configuration data stored on device 500. In some embodiments, before transitioning to the display of the alert content, device 500 can obtain the configuration data to determine whether the alert content should be displayed. If the configuration data indicates that the alert content should be displayed, device 500 can display the alert content as previously described with respect to FIG. 8. If the configuration data indicates that the alert content should not be displayed, device 500 can continue to display the notification, without transitioning to the alert content.

In some embodiments, if device 500 is configured to suppress automatic display of the alert content (via the configuration data), device 100 may still display the alert content in response to detecting a contact, such as a tap or swipe, on a displayed notification.

e. Alerts Comprising Audio Content

Figure 9:
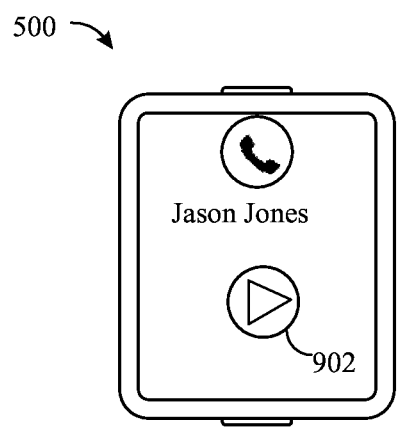
FIG. 9 illustrates an exemplary user interface.

Some received alerts may comprise audio content. Such alerts may include voicemail, audio, or "push to talk" messages. In some embodiments, as depicted in FIG. 9, the displayed alert content can include a playback affordance 902 for playing back the audio content. In response to detecting a selection of playback affordance 902, device 500 can play the audio content. In some embodiments, if the audio content is received as part of a live audio conversation (such as if the device is operating in the "push to talk" mode) and the user selects the playback affordance, device 500 can play the initial audio message in response to the selection of the affordance, and device 500 can play subsequent audio messages live, as they are received, without requiring subsequent selections of the affordance.

f. Text Message Alerts

Figure 10:
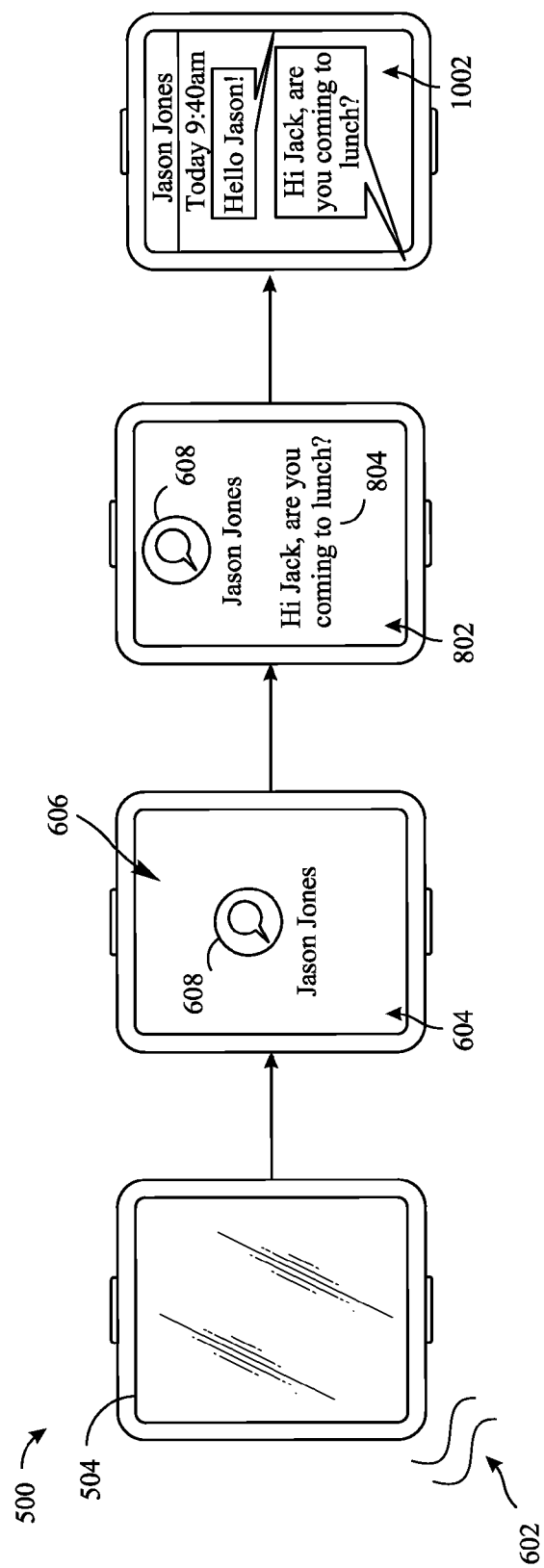
FIG. 10 illustrates an exemplary user interface.

In some embodiments, if the alert is a text message, a user may wish to view a text message conversation associated with the alert. FIG. 10 depicts a sequence of screens that device 500 can display after receiving a text message alert. This sequence is similar to the sequence shown in FIG. 8, and depicts displaying notification 606 and alert content 804 corresponding to a text message received from sender Jason Jones. However, in this example, while displaying screen 802, device 500 detects a contact on touchscreen 504. The contact may be a touch or tap on touchscreen 504 at a location corresponding to application affordance 608, for example, or a horizontal swipe on touchscreen 504. In response to detecting the contact with touchscreen 504, device 500 can display screen 1002.

Screen 1002 includes some or all of a text message conversation between the user and the source of the text message alert. In this example, the text message conversation includes text messages sent to and received from Jason Jones. In some embodiments, the text messages in the text message conversation are arranged chronologically based on the order in which they were received or sent.

g. Response Options

In some cases, upon viewing a notification or alert content, a user may wish to respond to the alert. Because device 500 is a reduced-size device with a relatively small touchscreen, user interfaces that may be used to respond to alerts on larger devices, such as cellular phones, may be ineffective and/or awkward on touchscreen 504. A user may wish to be able to respond to an alert without needing to provide a sequence of relatively accurate touchscreen inputs, which may be difficult or frustrating on a reduced-size device. Thus, in some embodiments, device 500 can provide user interfaces that enable the user to respond to alerts more quickly and easily on a reduced-size screen.

As previously described, device 500 can scroll alert content in response to detecting a contact on touchscreen 504 or, in some embodiments, in response to a rotation of a rotatable input mechanism. In some embodiments, if a user attempts to scroll beyond the bottom of the alert content (the end of the content), device 500 can respond by displaying user interface objects that are associated with actions that may be performed by an application associated with the alert.

Figure 11:
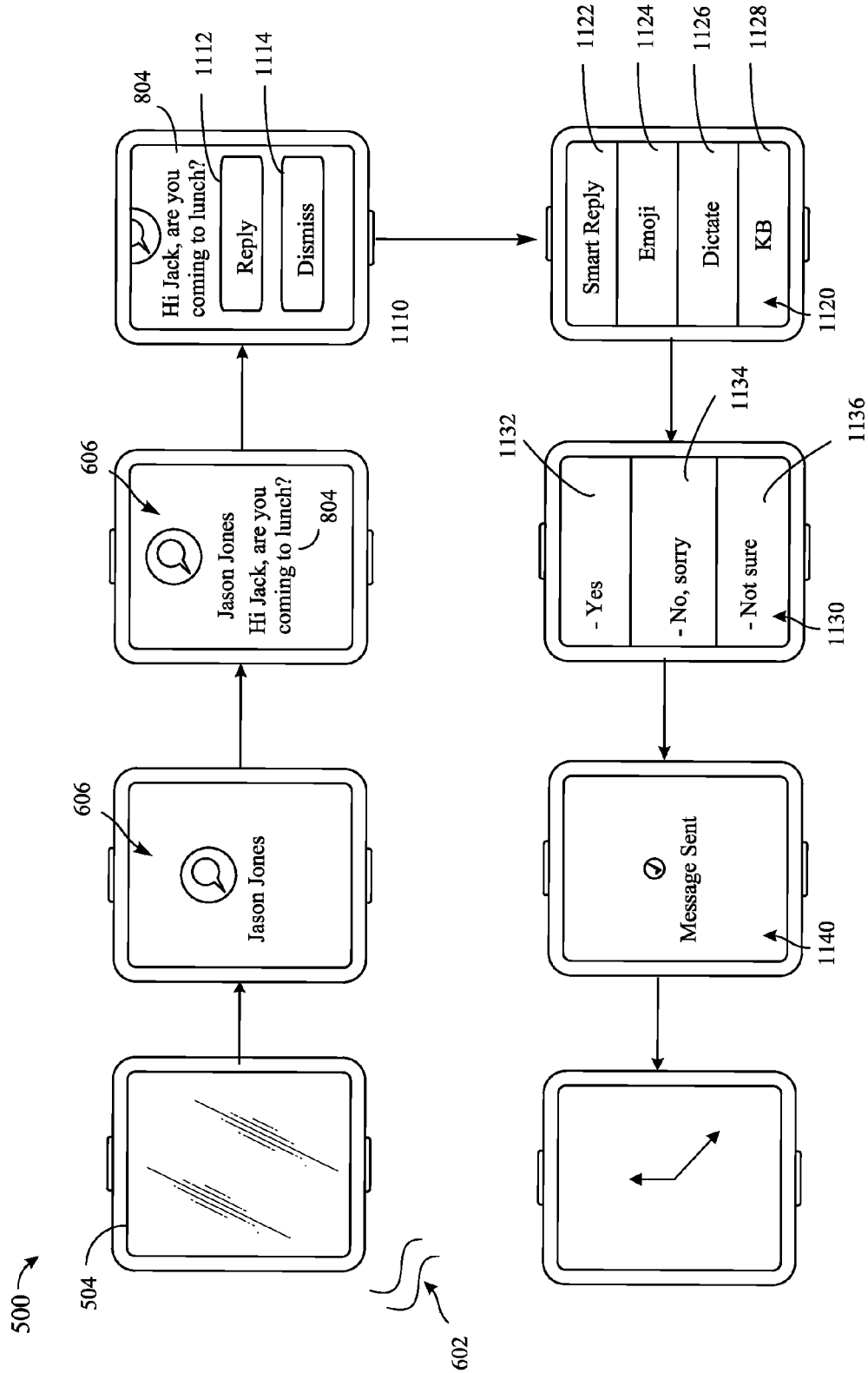
FIG. 11 illustrates an exemplary user interface.

For example, FIG. 11 depicts a sequence of screens that device 500 can display in response to receiving an alert. These screens are similar to those described with respect to FIG. 4. While displaying the bottom of the alert content 804 (in this case, the alert content is a text message), device 500 detects a user input requesting to scroll beyond the bottom of the alert content; that is, a user input requesting to move the alert content upwards to display more alert content. The user input may be an upward swipe on touchscreen 504, for example, or a rotation of a rotatable input mechanism. In response to detecting the user input, device 500 can scroll the notification 606 and alert content 804 upwards and scroll user interface objects 1112, 1114 onto touchscreen 504 below the alert content. In this example, the notification 606 is scrolled off of the top of touchscreen 504 and is no longer displayed.

In the example of FIG. 11, the alert is a text message. Thus, in this embodiment, the user interface objects 1112, 1114 scrolled onto touchscreen 504 are associated with actions corresponding to a text message application. In particular, user interface object 1112 is associated with a reply action, and user interface object 1114 is associated with a dismiss action. For other types of alerts, the user interface objects scrolled onto touchscreen 504 may be different. For example, for a calendar invitation, the actions may include accept or decline. For a voicemail alert, actions may include call back or send message. In some embodiments, there may be more than two displayed user interface objects.

In some embodiments, in response to detecting a selection of user interface object 1114, which is associated with a dismiss action, device 500 can dismiss the alert as previously described with respect to FIG. 8.

In some embodiments, in response to detecting a selection of user interface object 1112, which is associated with a reply action, device 500 can display screen 1120. Screen 1120 includes several user interface objects 1122, 1124, 1126, 1128 that correspond to options for replying to the text message. In this example, the reply options include "smart reply," "emoji," "dictate," and "KB" (keyboard). Such reply options may include functionality as described in U.S. Provisional Patent Application Ser. No. 62/044,923 "Historical Buttons for Input Methods," filed Sep. 2, 2014, and naming Nicholas Zambetti as inventor; U.S. Provisional Patent Application Ser. No. 62/127,800 "Historical Buttons for Input Methods," filed Mar. 3, 2015, and naming Nicholas Zambetti as inventor; U.S. Provisional Patent Application Ser. No. 62/129,903 "Historical Buttons for Input Methods," filed Mar. 8, 2015, and naming Nicholas Zambetti as inventor. These applications are incorporated by reference in their entirety.

In response to detecting a selection of user interface object 1122, corresponding to "Smart Reply," device 500 can display smart reply screen 1130. Smart reply screen 1130 includes a user interface for selecting a predefined response message 1132, 1134, 1136. In some embodiments, the content of the predefined response messages may be provided as a default by device 500, or may be customized by the user. In some embodiments, the content of the predefined response messages may be received by device 500 from an external device.

In response to detecting a selection of a predefined response message 1132, 1134, 1136, device 500 can send the predefined response message to the alert source, and display message-sent confirmation screen 1140. After displaying message-sent confirmation screen 1140 for a predetermined time interval, device 500 can display clock face 212 or a home screen. In this example, clock face 212 does not include an indication of an unread alert corresponding to the received alert because the alert content has been displayed.

Returning to screen 1120, if device 500 detects a selection of user interface object 1124 instead of 1122, device 500 can display a user interface for selecting an emoji (e.g., ideogram, clip art, or animation) to send as a reply to the alert source. In response to detecting a selection of an emoji, device 500 can send the selected emoji to the source of the alert and display message-sent confirmation screen 1140.

In some embodiments, instead of sending a predefined response or emoji immediately after selection, device 500 can display a confirmation affordance. In response to detecting a selection of the confirmation affordance, device 500 can send the predefined response or emoji as described above.

In some embodiments, in response to detecting a selection of user interface object 1126, device 500 can record an audio input from a microphone on device 500, and send data corresponding to the recorded audio as a reply to the source. In some embodiments, the recorded audio may be sent as audio message data. In other embodiments, the recorded audio may be transcribed by device 500 and sent as transcription data. In some embodiments, instead of immediately sending the data representing the audio recording to the source, device 500 can display an indication of the recorded audio on touchscreen 504, along with a send affordance which, when selected, causes device 100 to send the data corresponding to the audio to the source.

In some embodiments, in response to detecting a selection of user interface object 1128, device 500 can display a virtual keyboard to enable a user to type a response to the alert.

Figures 12A, 12B:
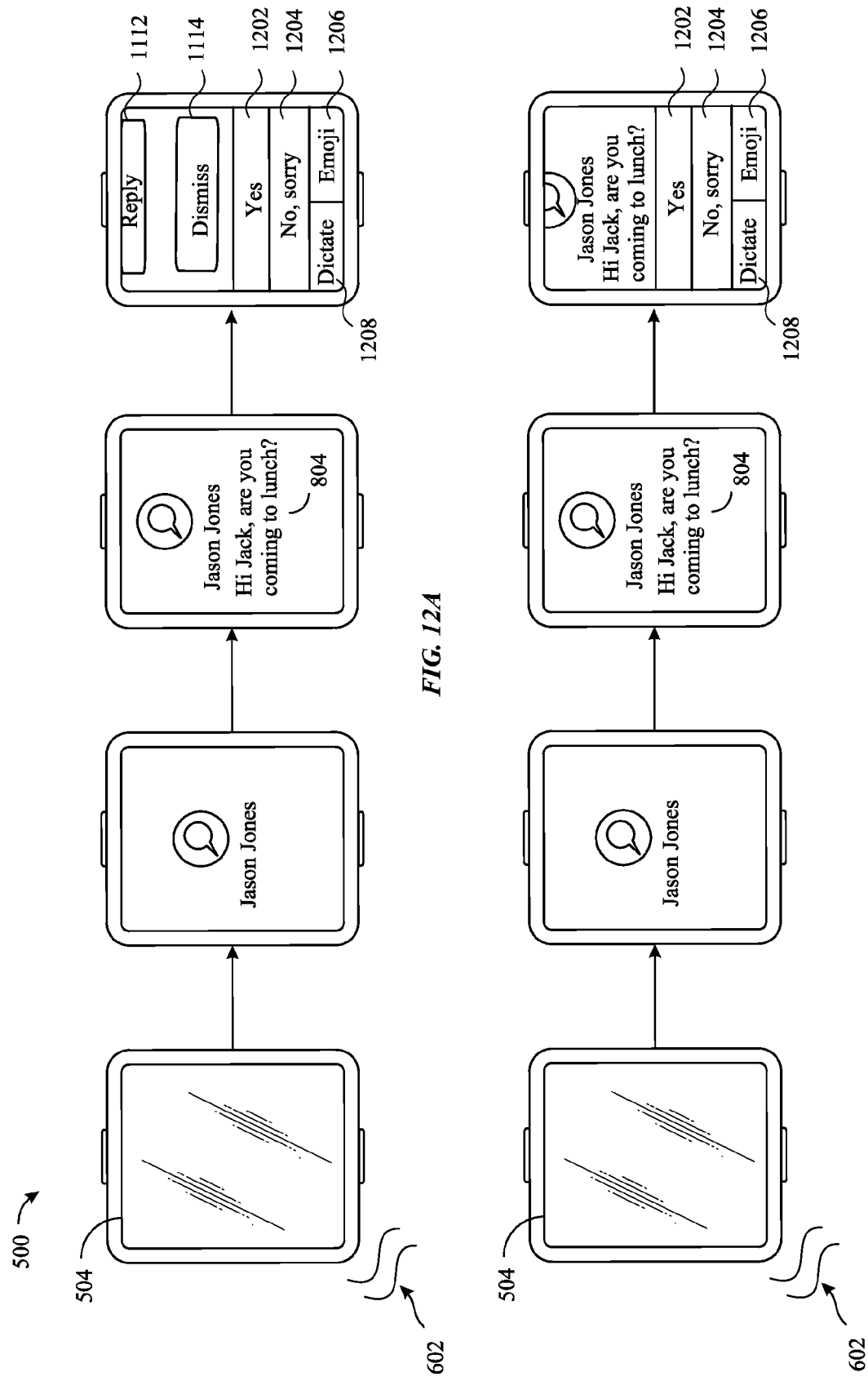
FIGS. 12A-C illustrate an exemplary user interface.

As depicted in FIG. 12A, in some embodiments, after scrolling up user interface objects 1112, 1114 onto touchscreen 504, in response to detecting a user input requesting to scroll past the bottom of user interface object 1114, device 500 can scroll user interface objects 1202, 1204, 1206, and 1208 representing reply options onto touchscreen 504 below user interface objects 1112, 1114. These reply options include two predefined response messages 1202, 1204 and the dictate 1208 and emoji 1206 options previously described with respect to FIG. 11. In response to detecting a selection of one of the reply options 1202, 1204, 1206, 1208, device 500 can respond as described with respect to FIG. 11.

As depicted in FIG. 12B, in some embodiments, instead of scrolling up user interface objects 1112, 1114 below the bottom of the alert content, device 500 can scroll user interface objects 1202, 1204, 1206, and 1208 onto the screen below the bottom of the alert content. In this example, in response to detecting a user input requesting to scroll past the bottom of the alert content 804 (such as an upward swipe), device 500 scrolls these reply options onto touchscreen 504 under the bottom of the alert content.

Figure 12C:
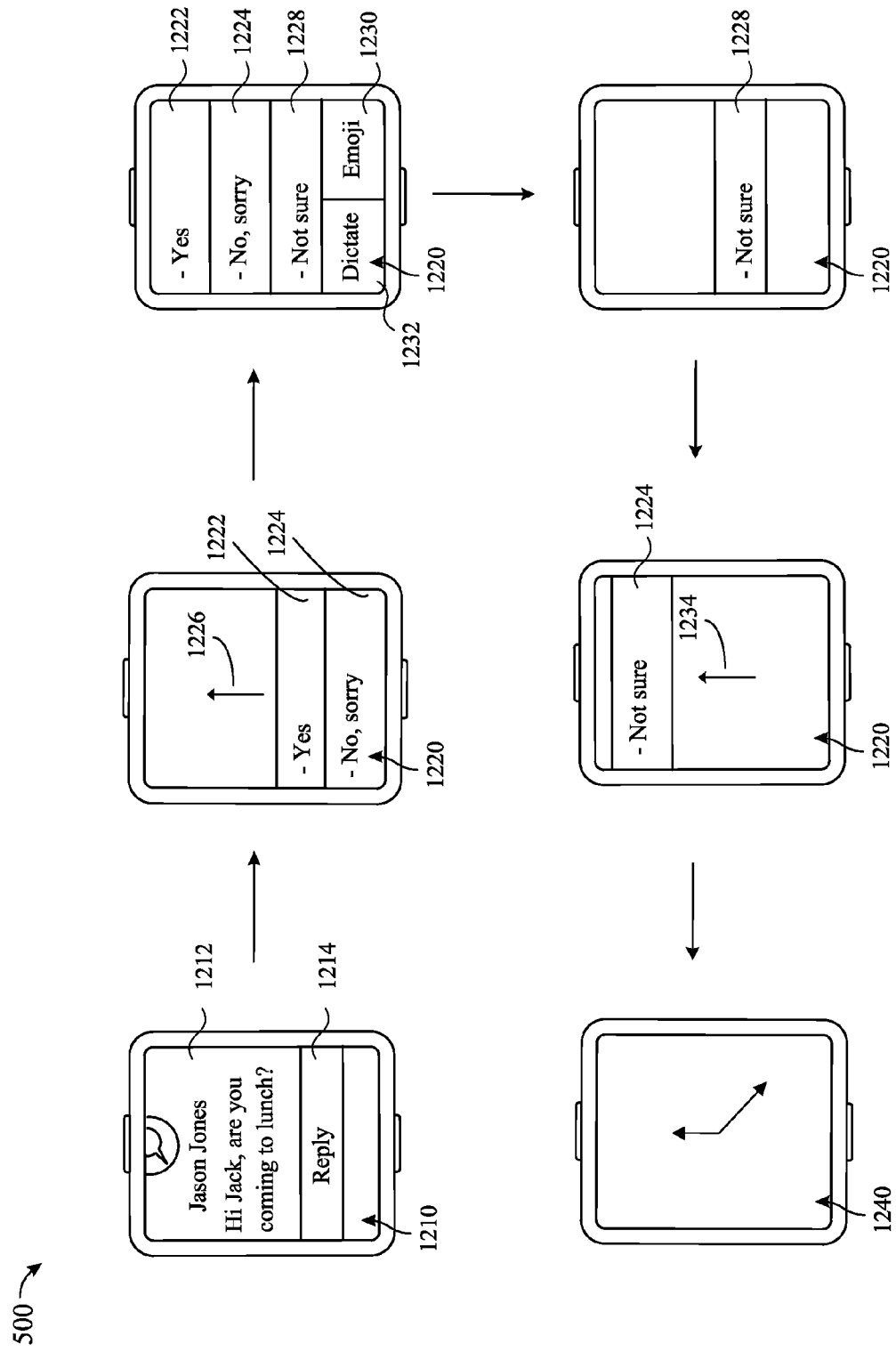

FIG. 12C illustrates an exemplary animation that may be displayed by device 500 as part of an interface for using "Smart Replies," as described above in reference to FIGS. 11-12B. On screen 1210, device 500 displays an alert (e.g., text message 1212) and user interface object 1214, which is associated with a reply action. In response to receiving user input associated with the reply action (e.g., a touch on touchscreen 504 at the location of user interface object 1214), device 500 may display an animated reveal of a plurality of predefined response messages. For example, as shown in FIG. 12C, screen 1220 initially displays user interface objects 1222 and 1224 corresponding to predefined response messages. User interface objects 1222 and 1224 are animated to appear at the bottom of screen 1220 and translate on-screen in an upward direction, as indicated by arrow 1226. Over the course of the animated reveal, user interface objects 1222 and 1224 translate to the top of screen 504 as user interface objects 1228, 1230, and 1232 appear below on screen 1220. User interface object 1228 indicates a third predefined response message, while user interface object 1230 indicates an emoji response, and user interface object 1232 indicates a dictation response.

The user may provide a user input indicating a selection of a predetermined response message or other response option (e.g., emoji or dictation). For example, the user may provide a touch on touchscreen 504 at the location of user interface object 1228. In response to detecting the user input indicating a selection of the predetermined response message or other response option, device 500 may remove the display of the other predetermined response messages and response options (e.g., those not selected by the user). As shown in FIG. 12C, in response to receiving a user input indicating a selection of the "Not sure" predetermined response message (e.g., user interface object 1228), device 500 removes the display of user interface objects 1222, 1224, 1230, and 1232. Subsequently, device 500 may animate the selected predetermined response message to pause briefly, then translate off of screen 1220 and disappear, as indicated by arrow 1234. After pause, translation, and removal of the displayed predetermined response message/other response option, device 500 may display a second user interface screen (e.g., screen 1240), such as clock face 212 or a home screen. For example, after user interface object 1224 translates off of screen 1220, device 500 may reveal screen 1240 by fading in, transitioning from out-of-focus to in-focus, and so forth. Device 500 may also send the selected predetermined response message to the alert source.

Figure 13A:
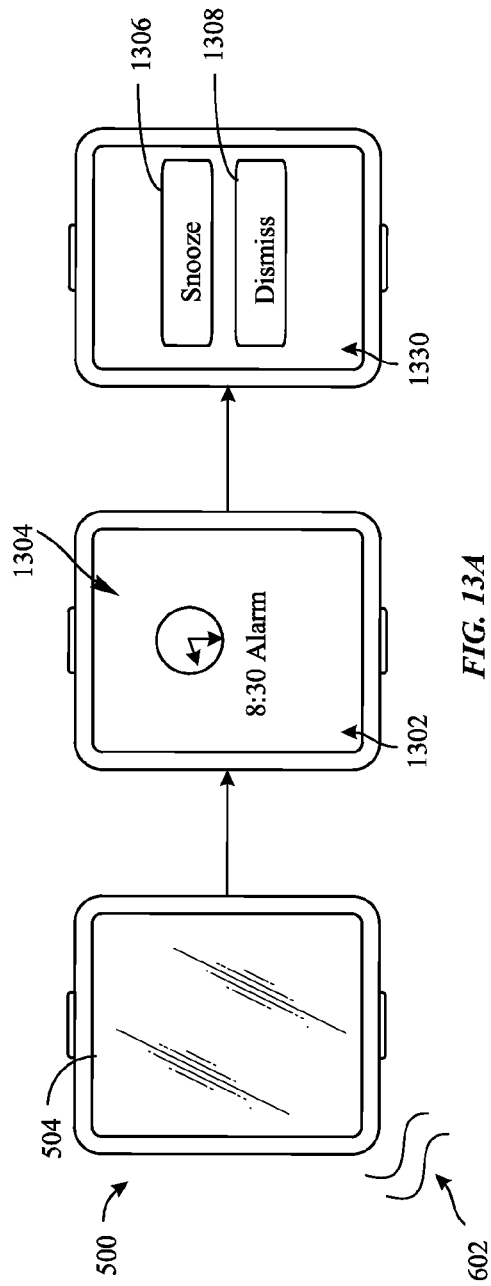
FIGS. 13A-B illustrates an exemplary user interface.
Figure 13B:
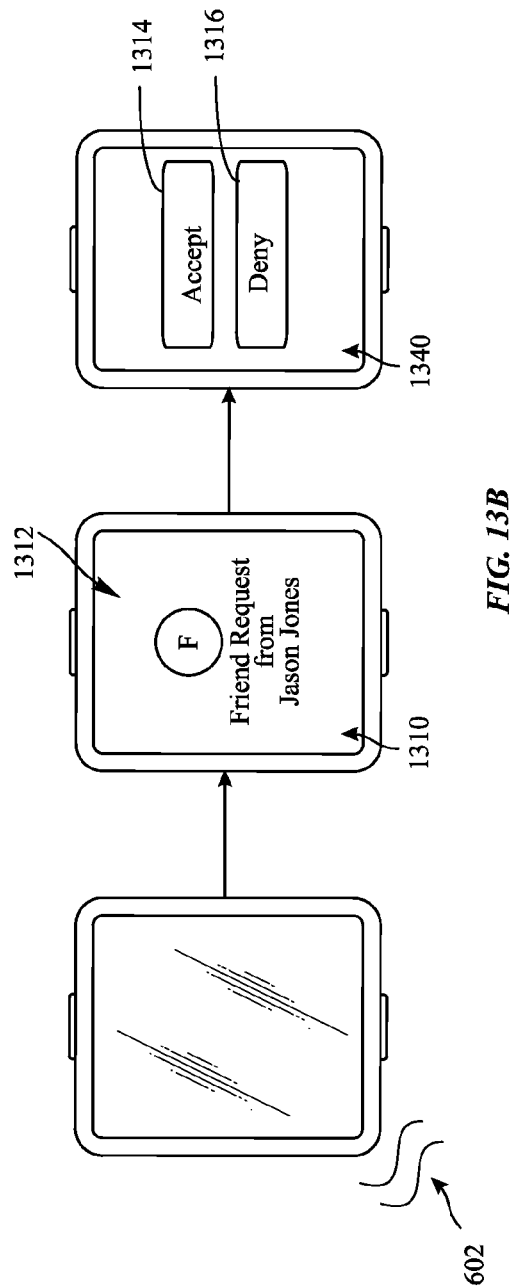

Device 500 can display other response options to enable a user to respond to other types of alerts. For example, FIGS. 13A-B show exemplary sequences of screens that device 500 can display on touchscreen 504 to enable a user to respond to a clock alarm alert or social media "friend request" alert. In the example shown in FIG. 13A, device 500 receives a clock alarm alert and issues a perceptual output. In response to detecting a user input within a predetermined time interval after the perceptual output, device 500 displays screen 1302 that includes notification 1304 corresponding to the clock alarm alert. In response to detecting a contact on notification 1304, device 500 displays response screen 1330. The contact may be an upward swipe on touchscreen 504 while notification 1304 is displayed. In response to this contact, device 500 displays screen 1330. In this case, the response options include "snooze" 1306 and "dismiss" 1308.

In the example shown in FIG. 13B, device 500 receives a "friend request" alert from a social media application and issues a perceptual output. In response to detecting a user input within a predetermined time interval after the perceptual output, device 500 displays screen 1310 that includes notification 1312 corresponding to the friend request alert. In response to detecting a contact with touchscreen 504 while displaying screen 1310, device 500 displays response screen 1340. The contact may be an upward swipe on touchscreen 504, for example. In response to detecting this contact, device 500 displays screen 1340. In this case, the alert response options include "accept" 1314 and "deny" 1316 to allow a user to accept or deny the friend request.

A person of skill in the art will recognize that many other response options are possible for other types of alerts.

It should be noted that, in the previous examples shown in FIGS. 8-11, in response to an upward swipe on touchscreen 504 while displaying a notification, device 500 displays alert content associated with the received alert. However, in the examples shown in FIGS. 13A-B, the received alerts do not have associated alert content. In some embodiments, if a received alert does not have alert content, device 500 can respond to a contact (such as an upward swipe or tap) on touchscreen 504 while displaying a notification by displaying response options rather than by displaying alert content.

As discussed earlier, in some embodiments, device 500 can detect the intensity of contacts on touchscreen 504 (e.g., using intensity sensor 524). Device 500 can then respond to contacts on touchscreen 504 based on the intensity of the contact. Returning briefly to FIG. 11, in some embodiments, while displaying alert content 804, in response to detecting a contact with touchscreen 504 that has a characteristic intensity that is above a threshold intensity, device 500 can display some or all of user interface objects 1122, 1124, 1126, and 1128.

In some embodiments, a user may access user interface objects 1122, 1124, 1126, and/or 1128 either by scrolling beyond the bottom of alert content, as described earlier, or by touching touchscreen 504 with a characteristic intensity that is above a threshold intensity (e.g., a hard press on touchscreen 504, detected by, e.g., intensity sensor 524).

Figure 14:
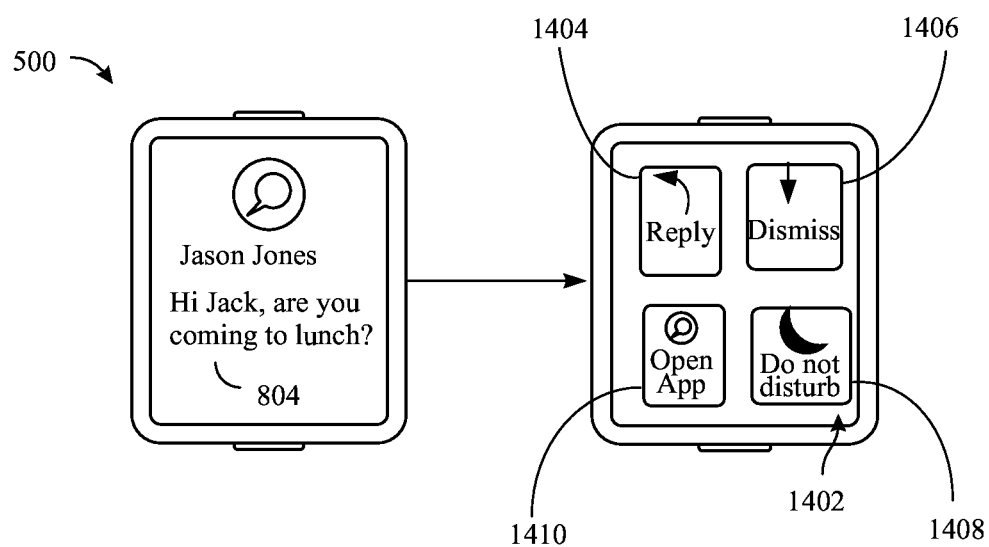
FIG. 14 illustrates an exemplary user interface.

FIG. 14 depicts another sequence of screens that may be displayed by device 500 to enable a user to respond to a received alert. In this example, while displaying the alert content 804, device 500 detects a contact with touchscreen 504 that has a characteristic intensity that is above a threshold intensity. In response to detecting the contact with a characteristic intensity above the threshold, device 500 can display response screen 1402.

Response screen 1402 includes four user interface objects 1404, 1406, 1408, 1414 corresponding to four response options. In response to detecting an input indicating selection of user interface object 1404, device 500 can display screen 1120, as shown and described with respect to FIG. 11.

In response to detecting a selection of user interface object 1406, device 500 can dismiss the alert and display a clock face or home screen.

In response to detecting a selection of user interface object 1408, device 500 can suppress subsequent alerts indefinitely or for a predetermined period of time (e.g., by not causing a perceptual output in response to receiving an alert, and/or by not displaying any new notifications).

In some embodiments, in response to detecting a selection of user interface object 1410, device 500 can launch an application associated with the received alert and view the alert in the application. Launching an application may correspond to executing the application in the foreground of device 500 and/or displaying the application on touchscreen 504. In this example, since the alert is a text message, device 500 can launch a text message application. In other examples, depending on the received alert the launched application may be an email application, a calendar application, a weather application, a social network application, or some other type of application. After launching an application, in response to detecting a depression of a hardware button or a depression of a rotatable, depressible mechanism (if either or both are present on device 500, as depicted in FIG. 5A), device can exit the application and display the home screen.

In the example shown in FIG. 14, response screen 1402 includes user interface objects 1404, 1406, 1408, 1410 that are appropriate for responding to a text message or email alert. However, as previously discussed with respect to FIGS. 12A-B, the response screen can have different user interface objects that are appropriate for responding to different types of alerts. For example, if the alert is a clock alarm, then instead of the "reply" option 1404, the response screen may provide a "snooze" option. As another example, if the alert is an audio message, the response screen may provide a "play" option to allow the user to play the audio message. In some embodiments, the response screen may provide an "open in phone" option. In response to detecting a selection of the "open in phone" option, device 500 can send data to an external electronic device that is in communication with device 500, such as a cellular phone, to cause the external electronic device to launch the application associated with the alert.

It should be noted that the response interfaces described with respect to FIGS. 13A-B and FIG. 14 are not part of the associated application, which may or may not be executing on device 500; instead, the response interfaces are part of an alert user interface. In some embodiments, a third party may supply response options for an application executing on an external electronic device that is in communication with device 500.

2. Managing Multiple Alerts

In some embodiments, device 500 may receive multiple alerts and display multiple consecutive notifications.

Figure 15:
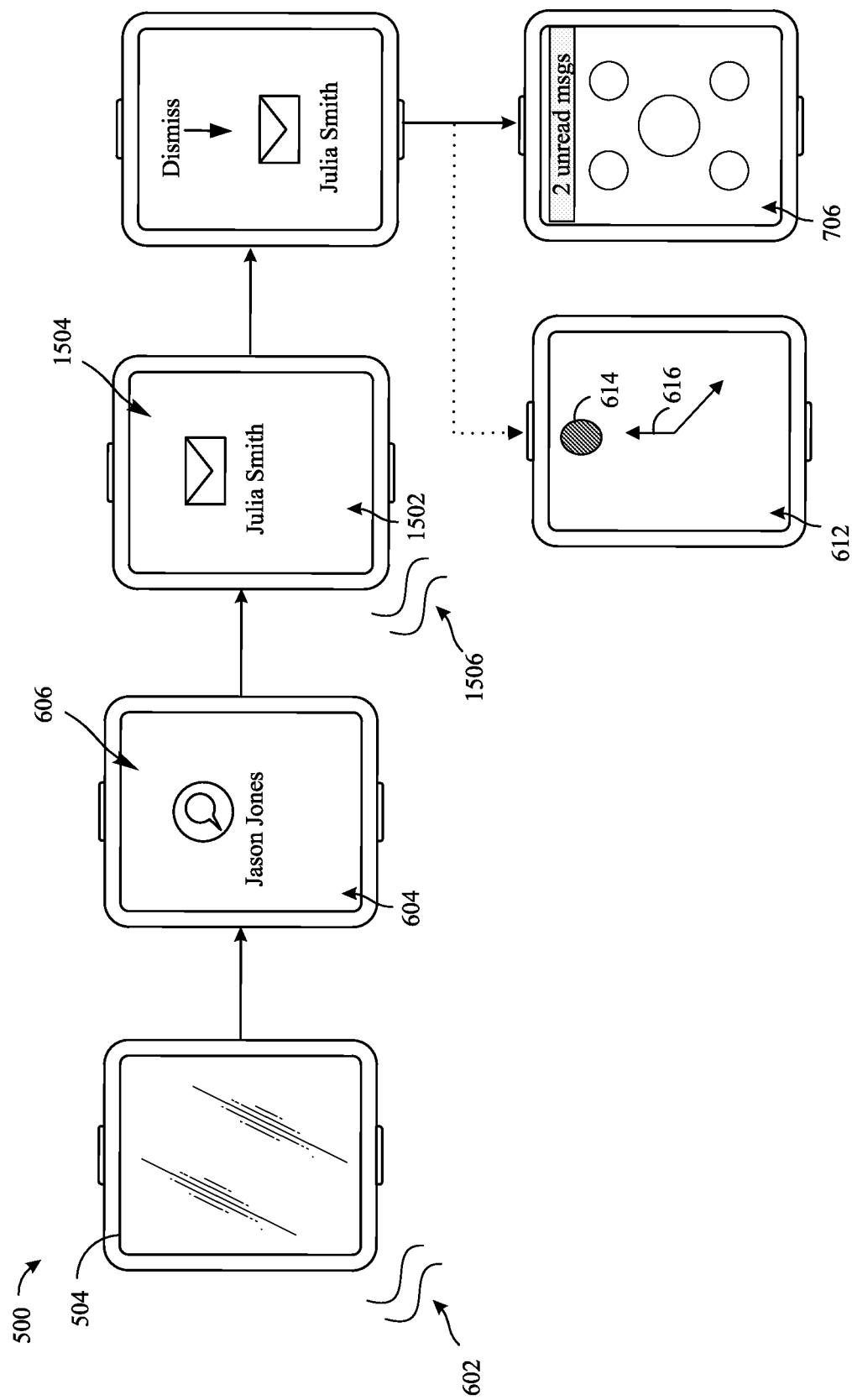
FIG. 15 illustrates an exemplary user interface.

FIG. 15 depicts a sequence of screens that may be displayed by device 500 in response to receiving multiple alerts. As in previous examples, initially, touchscreen 504 may be dark or inactive. In response to receiving a first alert, device 500 issues a first perceptual output 602. In response to receiving a user input within a first time interval following the first perceptual output 602, device 500 displays first notification 606, as previously shown and described with respect to FIG. 6A.

While displaying the first notification, device 500 receives a second alert. In response to receiving the second alert, device 500 replaces screen 604 with screen 1502. In some embodiments, in response to receiving the second alert, device 500 may also issue a second perceptual output 1506. Screen 1502 includes a second notification 1504 representing the second received alert. In this example, the second received alert is an email from sender Julia Smith. The second notification may be animated onto the screen in a manner similar to that described earlier with respect to FIG. 8.

Device 500 can dismiss second notification 1504 in response to detecting a user input meeting a dismissal criteria, as previously discussed with respect to FIG. 8. After dismissing the second notification, device 500 may display a home screen 706 or a clock face 612. As depicted in FIG. 15, the home screen or clock face may include an indication of two unread alerts corresponding to the first and second alerts. Note that the indicator of unread alerts 614 depicted on the clock face 612 in FIG. 15 is larger than the indicator of an unread alert depicted on the clock face 612 in FIG. 6B. As will be discussed in more detail below, in some embodiments, the size of the indicator may provide an indication of the number of unread alerts.

Figure 16:
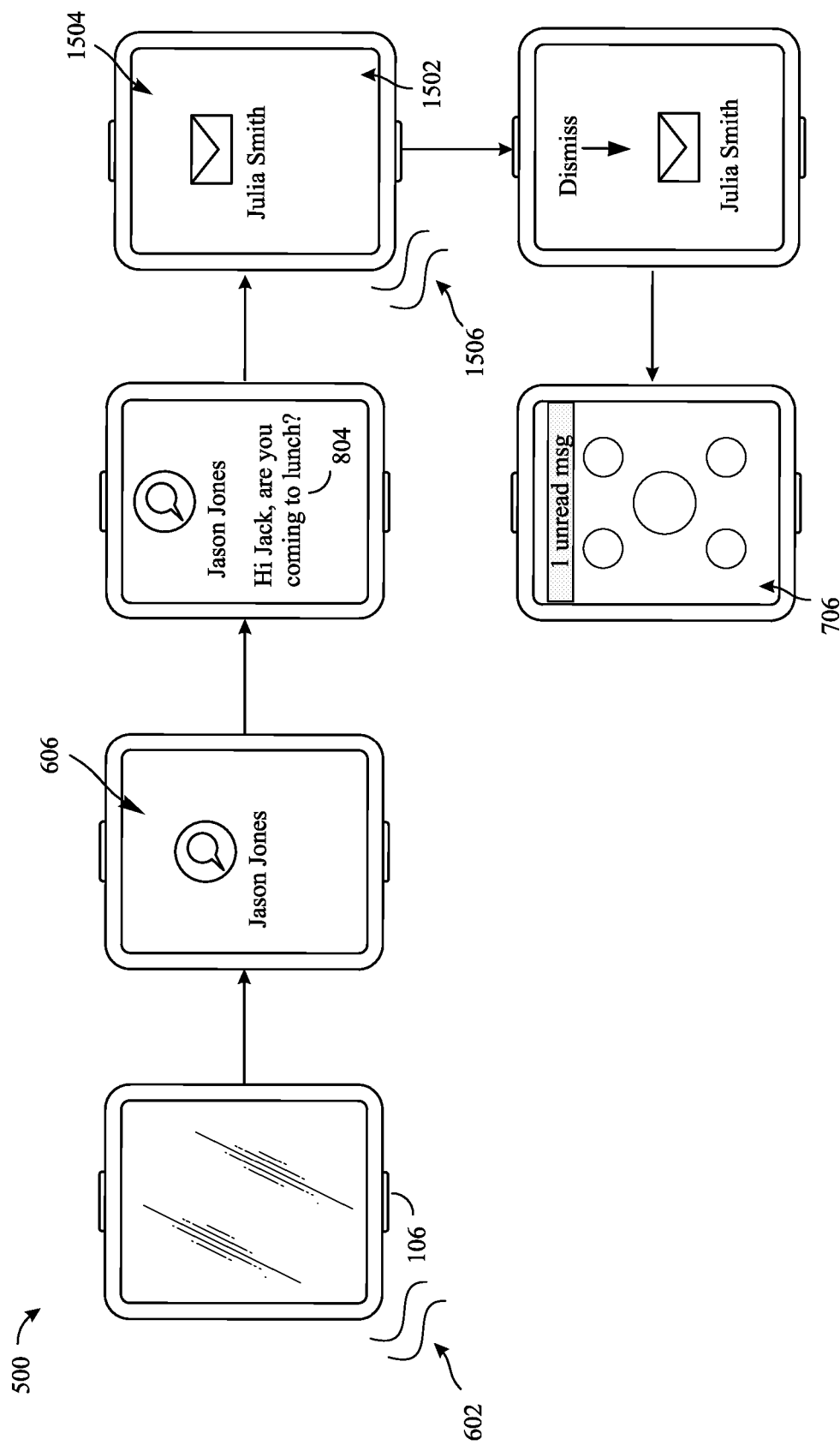
FIG. 16 illustrates an exemplary user interface.

FIG. 16 depicts another exemplary sequence of screens that can be displayed by device 500 in response to receiving multiple alerts. In this example, device 500 receives a first alert, issues a first perceptual output 602, and displays a first notification 606 and first alert content 804 in response to various user inputs, as previously described with respect to FIG. 8.

While displaying first alert content 804, device 500 then receives a second alert including information. In response to receiving the second alert, device 500 can display screen 1502 with second notification 1504 as described with respect to FIG. 15. In some embodiments, in response to receiving the second alert, device 500 may issue a second perceptual output 1506. Device 500 can dismiss second notification 1504 in response to user inputs that meet a dismissal criteria, as previously described with respect to FIG. 8. After dismissing second notification 1504, device 500 can display clock face 612 or home screen 706, as previously described with respect to FIG. 15. In some embodiments, instead of displaying clock face 612 or home screen 706, device 500 can re-display first alert content 804 after dismissing second notification 1504.

Figure 17:
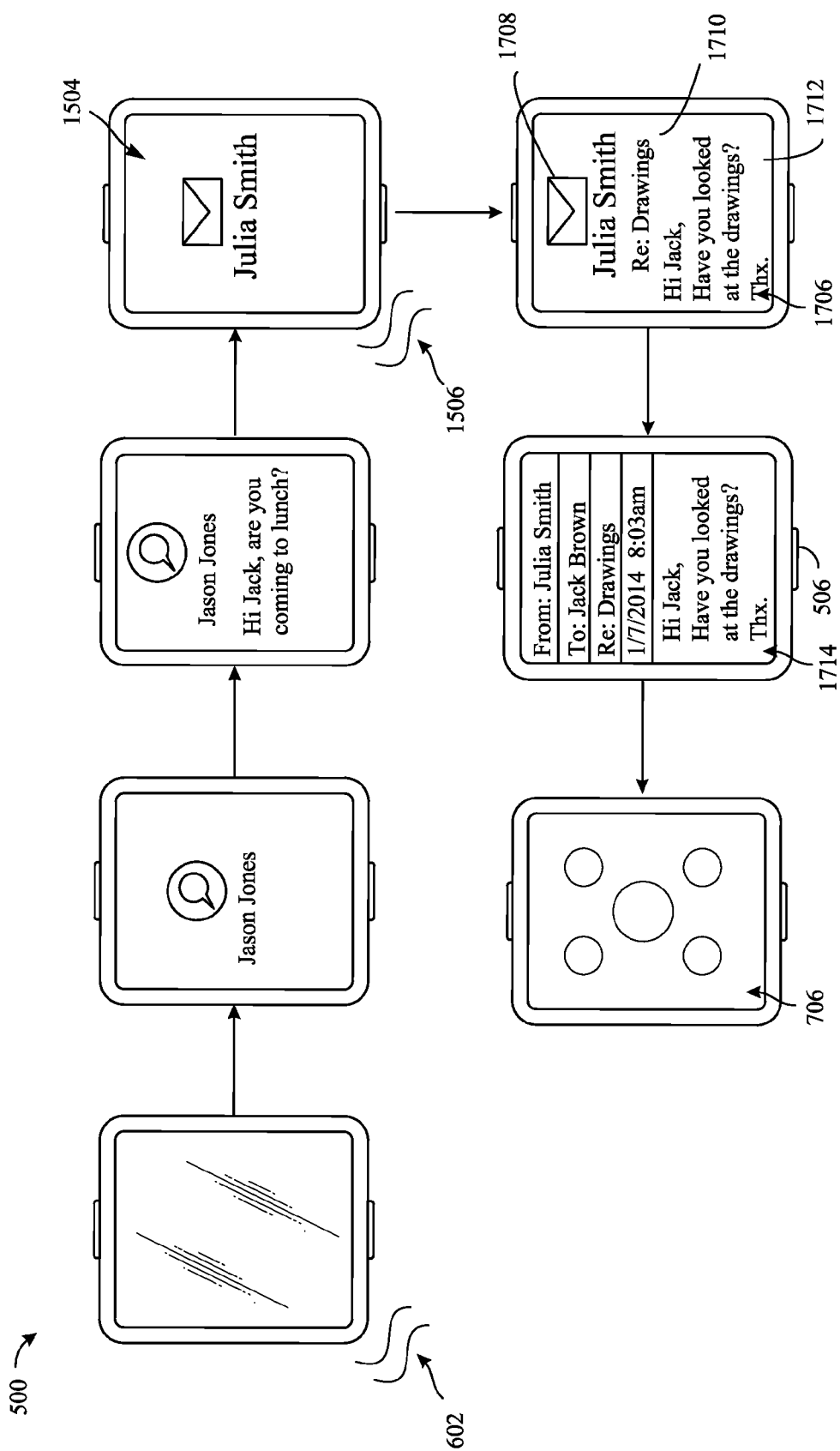
FIG. 17 illustrates an exemplary user interface.

FIG. 17 depicts another sequence of screens device 500 can display. This sequence is similar to the sequence depicted in FIG. 16, but instead of dismissing second notification 1504, the user wishes to view the second alert content. Device 500 can display the second alert content 1712 in response to detecting a user input while displaying the second notification 1504, as previously described with respect to FIG. 8. In this example, second alert content 1712 includes a subject line 1710 for the email alert. The user input may be an upward swipe or tap on the second notification, for example.

In the example depicted in FIG. 17, after viewing the second alert content 1712, the user wishes to invoke the application associated with the second alert. In some embodiments, in response to detecting a contact on touchscreen 504 at a location corresponding to the second alert content or the second alert notification, device 500 can launch an application associated with the second alert and display screen 1714. In some embodiments, in response to detecting a selection of application affordance 1708, device 500 can launch an application associated with the second alert and displays screen 1714.

In this example, the application associated with the second alert is an email application. Thus, in response to detecting a selection of application affordance 1708, device 500 can launch an email application. In some embodiments, when device 500 launches an application associated with an alert in this manner, the alert is opened within the application, as depicted in screen 1714.

After launching and viewing an application, a user may wish to return to the home screen. In response to detecting a depression of input button 506, which may be a depressible hardware button or a depressible, rotatable input mechanism, device 500 can display home screen 706. In this example, home screen 706 is displayed without an indication of unread alerts corresponding to the first alert and the second alert, because the first alert content 804 and second alert content 1712 have both been displayed.

Figure 18:
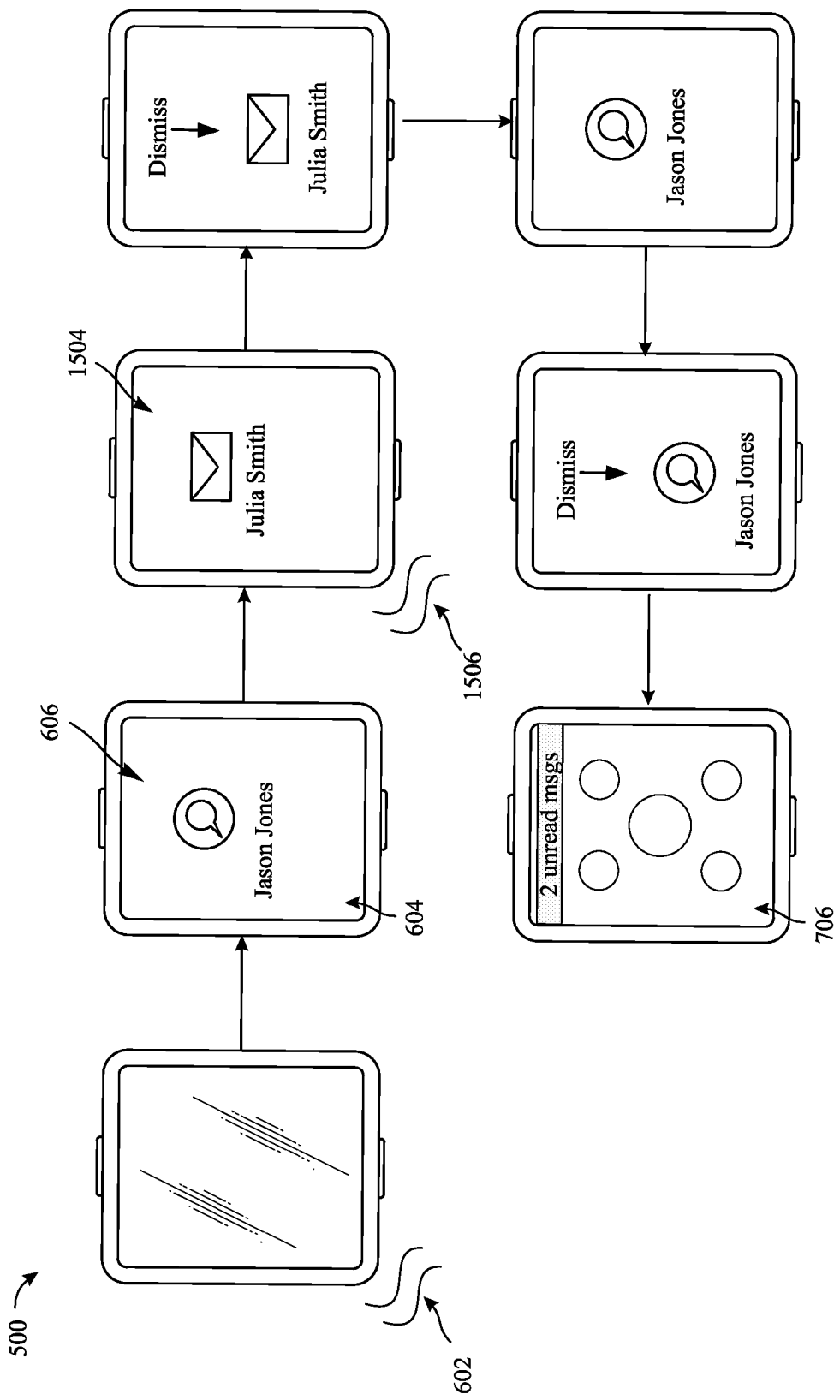
FIG. 18 illustrates an exemplary user interface.
Figure 19:
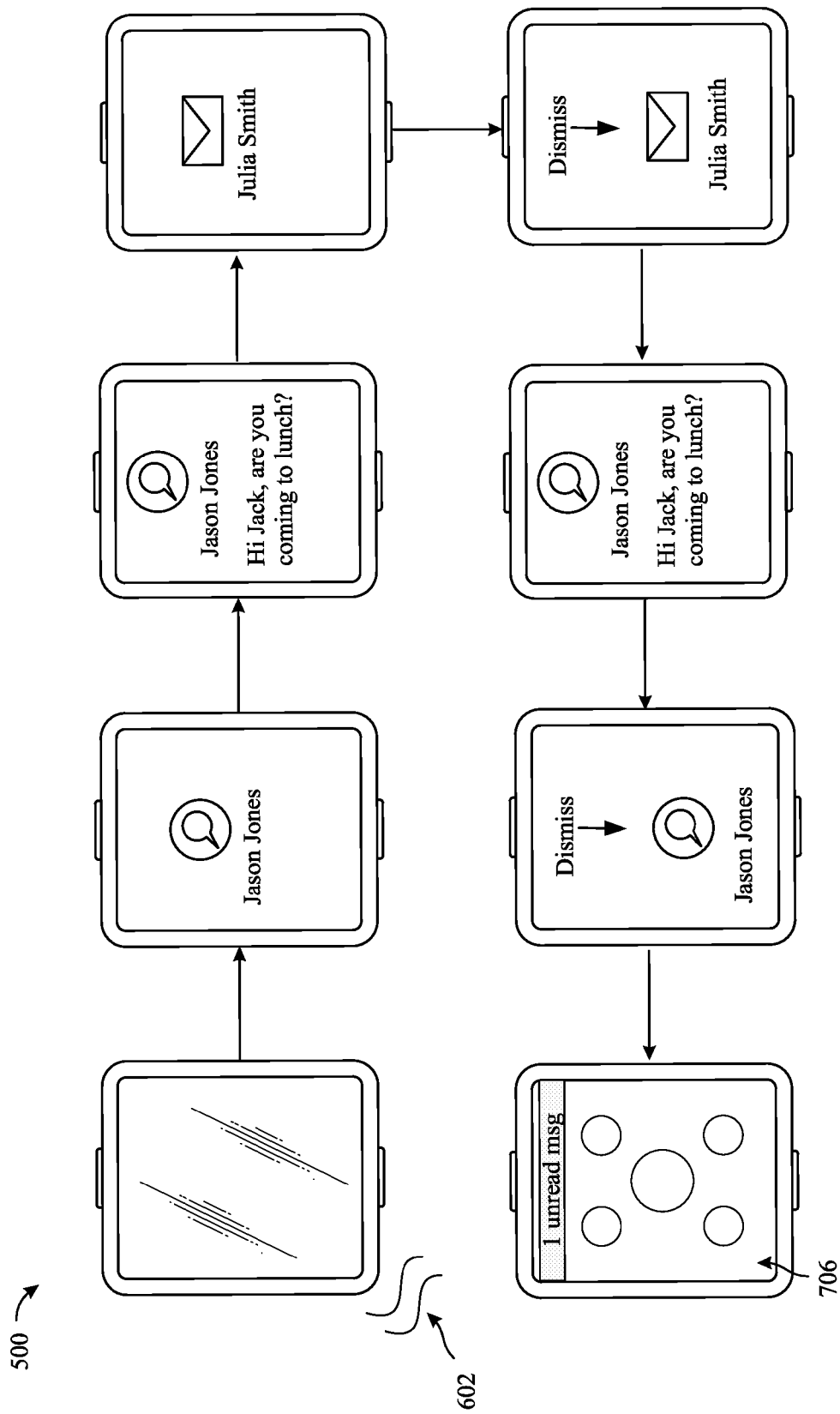
FIG. 19 illustrates an exemplary user interface.
Figure 20:
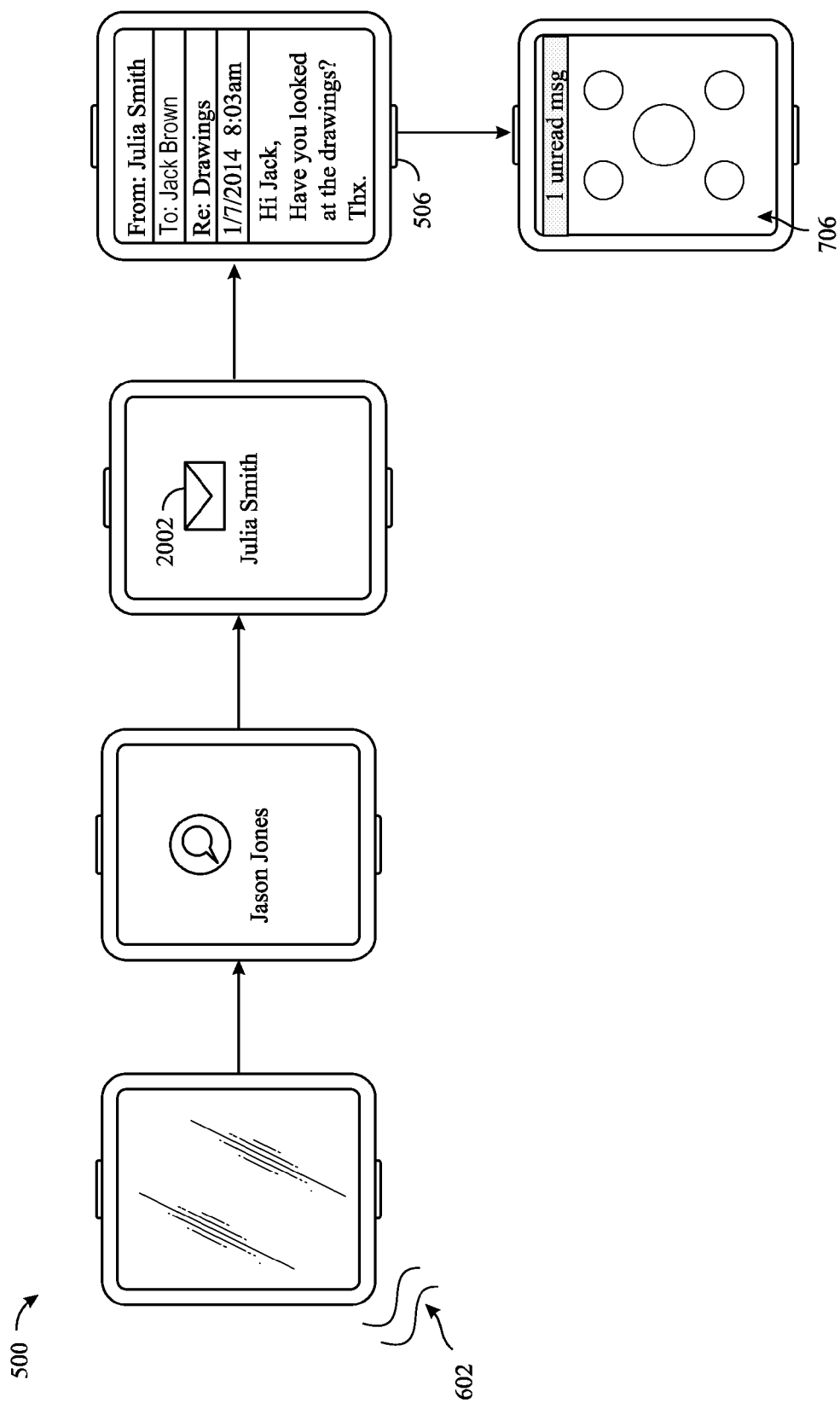
FIG. 20 illustrates an exemplary user interface.

FIGS. 18-20 depict additional screen sequences that device 500 can display in response to receiving multiple alerts and detecting inputs as previously described.

In the sequence depicted in FIG. 18, device 500 receives a first alert and displays a first notification, as shown and described with respect to FIG. 17. Device 500 receives a second alert while displaying the first notification. In response to receiving the second alert, device 500 displays a second notification. In this example, the user dismisses the second notification as previously described with respect to FIG. 16. After dismissing the second notification, device 500 re-displays the first notification. The user then dismisses the first notification, and device 500 displays a home screen. In this example, the home screen is displayed with an indication of two unread alerts corresponding to the first and second alerts.

FIG. 19 is similar to FIG. 18. However, in this example, after device 500 displays the first notification, the user holds device 500 in the viewing position, and device 500 responds by displaying the first alert content, as previously described with respect to FIG. 18. While displaying the first alert content, device 500 receives a second alert and displays a second notification. The user dismisses the second notification, and device 500 then re-displays the first alert content. The user dismisses the first alert content, and device 500 displays home screen 706. In this example, the home screen is displayed with an indication of one unread alert corresponding to the second alert.

FIG. 20 is similar to FIG. 15. However, instead of dismissing the second notification, the user taps the application affordance 2002 to launch the application associated with the second alert. In response to detecting a selection of application affordance 2002, device 500 launches the application and displays the second alert content within the application. The user then exits the application and returns to the home screen 706 by depressing the hardware button or depressible, rotatable input mechanism 506.

Figure 21:
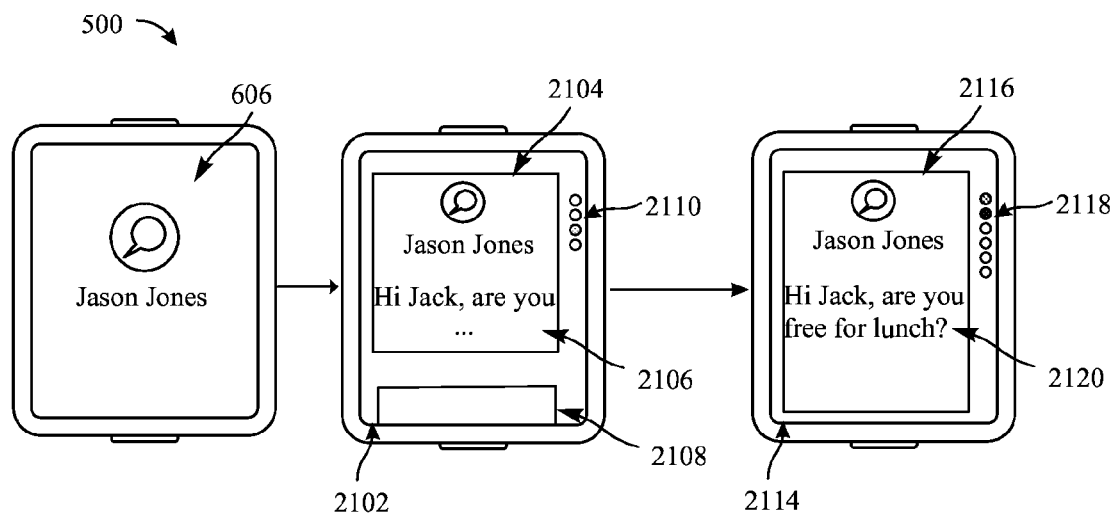
FIG. 21 illustrates an exemplary user interface.

Device 500 may display other user interfaces for viewing multiple notifications or alerts. As depicted in FIG. 21, in some embodiments, in response to detecting a contact on a notification 606 representing a first alert, device 500 can display screen 2102 comprising a first pane 2104 with a portion of the alert content 2106 associated with notification 606, and a portion of one or more additional panes 2108 indicating other alert content for other received alerts. In some embodiments, screen 2102 may include paging dots 2110 that provide the user with an indication of the number of other panes that may be displayed, and the position of the currently displayed pane. In response to detecting a flick or swipe on touchscreen 504, device 500 can scroll the panes to display alert content for other received alerts.

In some embodiments, in response to detecting a contact on a pane 2104, device 500 can display screen 2114 comprising the full alert content 2120 associated with notification 606. In some embodiments, screen 2114 further comprises paging dots 2118 that may provide the user with an indication of other messages that may be displayed, such as other messages in a text message conversation. In some embodiments, the color of the paging dots 2118 on screen 2114 may indicate a type of message. For example, the paging dot associated with pane 2116 containing the current alert content 2120 may be one color, while other messages, such as reply messages, may be indicated by paging dots of different colors.

3. Muting Notifications

Figure 22:
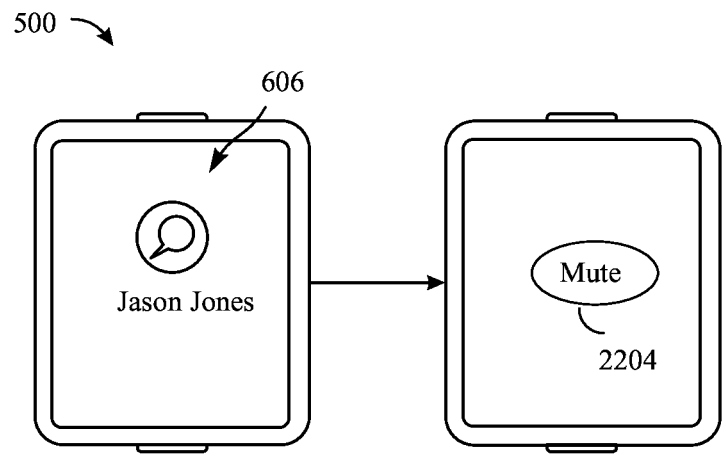
FIG. 22 illustrates an exemplary user interface.

In some cases, after receiving an alert from a source, a user may wish to suppress subsequent perceptual outputs for alerts from the same source, and/or suppress display of notifications representing alerts from the same source. That is, a user may not wish to be notified by a perceptual output if subsequent alerts are received from the same source, and/or may not wish to have the associated notification displayed on touchscreen 504. As depicted in FIG. 22, device 500 can receive an alert from a source and display a notification 606. In this example, while displaying the notification, device 500 detects a contact with touchscreen 504 that has a characteristic intensity that is above a threshold intensity. In response to detecting the contact with a characteristic intensity above the threshold intensity, device 500 can display a mute affordance 2204 for muting subsequent alerts received from the same source, or alerts that are associated with the same application. In response to detecting a selection of the mute affordance 2204, device 500 can suppress perceptual outputs and notifications for alerts received from the same source or application indefinitely or for a predetermined period of time.

4. Grouped Notifications

In some cases, device 500 may receive multiple alerts simultaneously or within a brief time period. This may happen, for example, if device 500 has been turned off for a period of time. When device 500 is subsequently turned on, it may receive all of the alerts that would otherwise have been received if device 500 had not been turned off. In this case, a user may be annoyed by having to view and dismiss multiple consecutive notifications.

Thus, in some embodiments, in response to receiving multiple alerts, device 500 may display a single grouped notification representing multiple alerts rather than displaying a single notification for each received alert. Device 500 may determine whether to display a grouped notification representing multiple alerts based on grouping criteria. For example, device 500 may group alerts for representation by a single notification based on whether they are received within a predetermined time interval, whether they are received from the same source, whether they are associated with the same application, or some combination of these criteria. In some embodiments, device 500 can exclude time-sensitive alerts from being included in grouped notifications, and instead display a single notification for each time-sensitive alert. Such time-sensitive alerts may include system alerts (such as battery alerts) or urgent calendar reminders, for example.

Figures 23A, 23B, 23C:
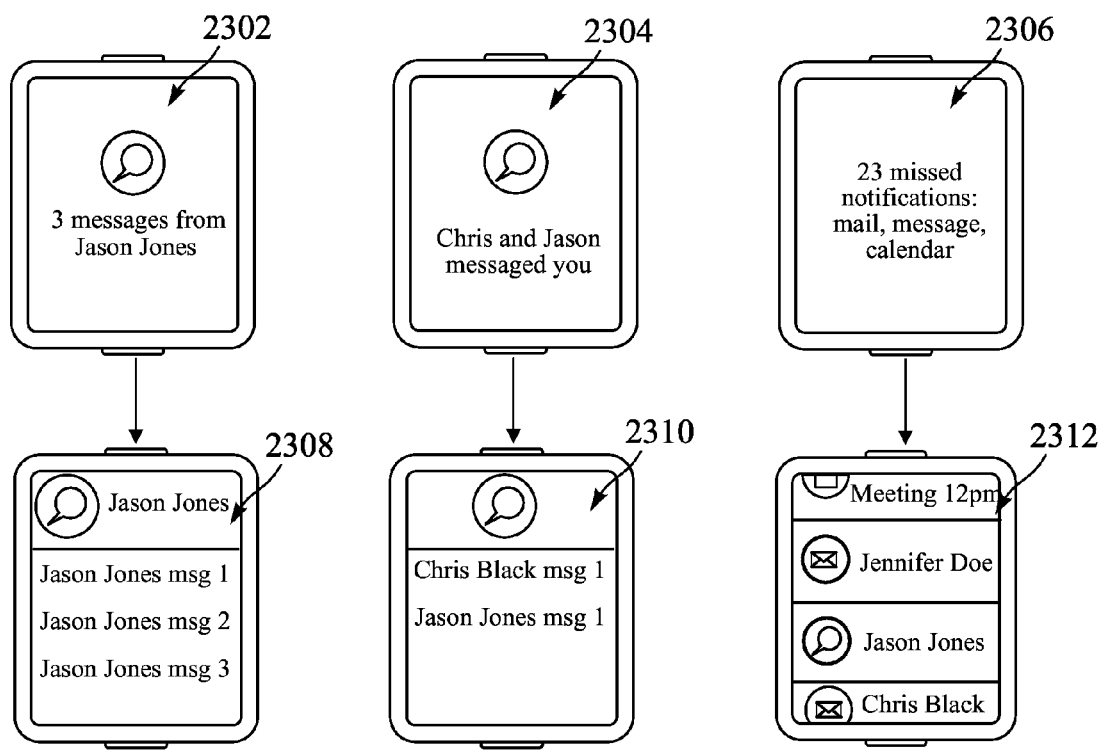
FIGS. 23A-23C illustrate exemplary user interfaces.

FIGS. 23A-C depict examples of grouped notifications 2302, 2304, 2306 that represent multiple alerts. As depicted in FIGS. 23A-C, in some embodiments, device 500 can respond differently to user inputs when displaying a grouped notification than when displaying a notification representing a single alert. For example, as previously described with respect to FIG. 8, in response to detecting a contact on a notification representing a single alert (such as an upward swipe), device 500 may display the alert content. In contrast, in response to detecting a contact on a group notification representing multiple alerts, device 500 may display an inbox for an application associated with the multiple alerts (if the alerts are all associated with a single application, and the application has an inbox), or may display a list of notifications that includes separate notifications for each of the received alerts that were represented by the grouped alert. FIGS. 23A-C depict examples of grouped notification screens and responses to user inputs.

In the exemplary screen sequence depicted in FIG. 23A, device 500 receives three text messages from the same source, Jason Jones, and displays a grouped notification 2302 representing the text messages. In response to detecting a contact on the grouped notification, device 500 can display a text message inbox 2308 for Jason Jones, with a list of the received messages. The contact may be a tap or swipe, for example. In response to detecting a selection of one of the messages in the list, device 500 can display the associated alert content.

In the exemplary screen sequence depicted in FIG. 23B, device 500 receives two alerts from two different sources, Chris Black and Jason Jones. The alerts are both associated with the same application. In this example, the application is a text message application. In response to receiving the two alerts, device 500 can display a grouped notification 2304 representing the two alerts. In response to detecting a contact on the grouped notification 2304, device 500 can display a text message inbox 2310 listing the two messages. In response to detecting a selection of one of the messages in the list, device 500 can display the associated alert content.

In still another example, as depicted in FIG. 23C, device 500 receives multiple alerts associated with multiple applications. Device 500 can display a grouped notification 2306 representing the multiple alerts. In response to detecting a contact on the grouped notification 2306, device 500 can display a list of notifications 2312 that includes separate notifications for each of the received alerts that were represented by the grouped notification. In response to detecting a selection of one of the notifications, device 500 can display the associated alert content.

In some embodiments, in response to receiving multiple alerts that meet grouping criteria, device 500 can issue multiple perceptual outputs. In some embodiments, in response to receiving multiple alerts that meet the grouping criteria, device 500 can issue a single perceptual output rather than issuing a perceptual output for each alert.

5. Indication of Unread Alerts

As previously discussed with respect to FIGS. 6B, 7, and 15, in some examples, a displayed clock face or home screen can include a user interface object that provides an indication of unread alerts. Unread alerts may correspond to alerts that have been received but not viewed by the user, or may correspond to alerts that have been marked as "unread" by the user. Device 500 may determine whether an alert has been viewed based on whether some or all of the alert content has been displayed on touchscreen 504, how long the alert content was displayed on touchscreen 504, whether any audio content associated with the alert has been played, and/or whether the alert content was displayed automatically (e.g., in response to a signal indicative of a user raising their wrist) or in response to a contact with touchscreen 504, for example. In some embodiments, if an alert does not include any alert content (e.g., a clock alarm), then device 500 may consider the alert as read if a notification representing the alert has been displayed.

In some embodiments, device 500 may receive an alert that generates a transient notification. Such a notification may only be useful to a user for a relatively brief period. For example, if a user is exercising and achieves a fitness milestone (such as being halfway through a workout), device 500 may receive such a transient alert notifying the user of the milestone. In this case, if the user raises their wrist within the predetermined time interval after device 500 issues the perceptual output for the transient alert, device 500 can display a notification representing the alert. However, if the user raises their wrist some time later, device 500 may display a clock face or home screen, and the clock face or home screen may not include an indication of an unread alert corresponding to the alert because the alert may no longer be relevant to the user.

Returning to FIG. 7, in exemplary home screen 706, user interface object 708 provides an indication of unread alerts by displaying the number of unread alerts. In other examples, a user interface object may provide an indication of unread alerts in a different manner, such as by displaying a colored banner where the color provides an indication of the number of unread alerts (e.g., a darker banner indicates more unread alerts). In some embodiments, a user interface object may provide an indication that there are unread alerts without providing any indication of the number of unread alerts.

In some embodiments, as depicted in FIGS. 6B, 6C, and 15, device 500 can provide an indication of an unread alert(s) by displaying a dot, chevron, or other shape, such as indication 614. In some embodiments, the color of the dot, chevron, or other shape may indicate the presence of unread alerts; for example, a red shape may indicate that there are unread alerts, while a green shape may indicate that there are no unread alerts. In some embodiments, the shape may blink, flash, or fluctuate in size with a frequency that is indicative of the number of unread alerts. For example, a higher blink frequency may indicate more unread alerts. In some embodiments, the size of the shape can provide an indication of the number of unread alerts. A small shape, for example, may indicate a single unread alert (as in FIG. 6B), while a larger shape may indicate more unread alerts (as in FIG. 15). A person of skill in the art will appreciate that these approaches to indicating the number of unread alerts may be combined in many different ways.

In some embodiments, the display of the shape includes an effect. For example, the shape may fade in or slide into position on touchscreen 504 (e.g., slide in from the top edge of the screen). Optionally, the effect is animated. In some embodiments, the effect is performed in response to a user input (e.g., a user raising his or her wrist).

In some embodiments, the display of the shape is removed according to removal criteria. For example, the shape may be removed after it has been displayed for a predetermined period of time or in response to a user input (e.g., the user lowering his or her wrist). In some embodiments, the removal of the shape includes an effect. For example, the shape may fade out or slide off of touchscreen 504 (e.g., slide off the top edge of the screen). Optionally, the removal of the shape is animated.

The features and/or effects associated with the indication of an unread alert described above may indicate to a user that there is an unread alert. For example, animation of the appearance or fluctuation in size of the indication may draw the user's attention to the fact that there is an unread alert.

Furthermore, some shapes may provide additional technical effects. In some embodiments, an arrow, a triangle, a chevron (e.g., 614 in FIG. 6C), or other graphical object that provides a directional indication may provide a user with a visual cue that an input will cause device 500 to perform an operation associated with an unread alert. For example, a graphical object that provides an indication of direction, such as chevron 614 depicted in FIG. 6C, may indicate to a user that a swipe, drag, or flick on touchscreen 504 in the direction that the object is indicating (e.g., downward in the case of chevron 614 in FIG. 6C) will cause device 500 to perform an action associated with the unread alert. In one embodiment, a swipe in the direction that the directional object is pointing causes device 500 to display the content of the unread alert such as, for example, alert content 804 on screen 802 in FIG. 8. In another embodiment, a swipe in the direction indicated by the object causes device 500 to display a notification of the alert such as, for example, notification 606 in FIG. 6A. In yet another embodiment, a swipe in the direction indicated by the object causes device 500 to display a list of one or more notifications, which may include a notification of the unread alert, or launch an application that corresponds to the unread alert. For example, device 500 may display multiple notifications or launch an application that corresponds to the unread alert as described in co-pending U.S. Provisional Patent Application Ser. No. 62/044,953, "Reduced-size Notification Interface," filed Sep. 2, 2014, the content of which is hereby incorporated by reference.

A person of skill in the art will appreciate that various positions and orientations of the shape or object indicating an unread alert are possible. For example, an indication at the bottom of touchscreen 504 may include an upward pointing arrow, triangle, chevron, or other graphical object that provides an upward directional indication to indicate that there is an unread alert and that an upward swipe on touchscreen 504 will cause device 500 to display the content of the unread alert, a notification of the alert, a list of notifications, or another display associated with alerts and/or notifications.

6. Interacting with a Reminder of an Event

In some embodiments, an alert is associated with an event (e.g., a party, meeting, game, etc.). The alert content may include information associated with the event, such as the date, time, and location of the event. In some embodiments, a reminder of an event is displayed based on an estimate of the amount of time it will take for the user to get to the event. The estimated amount of time optionally depends on a location of the user and a location associated with the event. The amount of time may be, for example, the estimated walking, biking, public transportation, or driving time generated by a map application, navigation application, or the like. In some embodiments, the reminder is displayed before the time of the event by the estimated amount of time it will take the user to get to the event. In some embodiments, the reminder is displayed before the time of the event by the estimated amount of time it will take the user to get to the event plus a predetermined amount of time to give the user time to prepare to leave for the event in order to arrive on time.

In some embodiments, the notification or reminder of an event includes an affordance. In response to detecting a selection of the affordance, device 500 may activate a messaging application that prepares a message addressed to a person associated with the event (e.g., the organizer of the event or the person that invited the user to the event). In this way, the user may easily provide the person associated with the event an update of the user's status (e.g., "I haven't left yet. I'll be there in 10 minutes."). In some embodiments, in response to detecting a selection of the affordance associated with a notification or reminder of an event, device 500 may activate a map application, navigation application, or the like, that provides or displays directions to the event. The directions may include directions from the current location of the user to a location associated with the event.

7. Processes for Managing Notifications and Alerts

Figure 25:
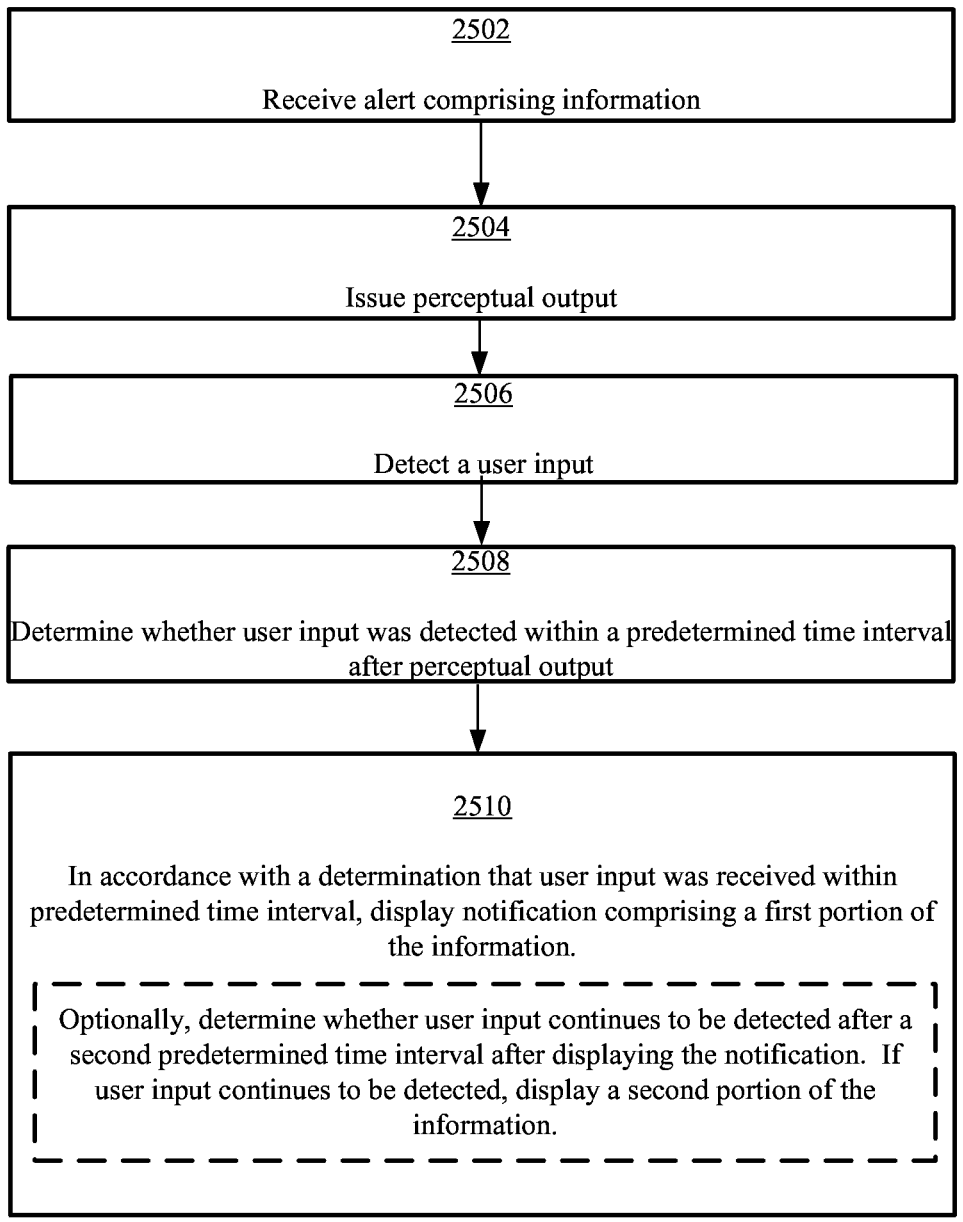
FIG. 25 illustrates an exemplary process for managing alerts.

FIG. 25 is a flow diagram illustrating process 2500 for managing notifications and alerts. Process 2500 may be performed at an electronic device with a touch-sensitive display screen, such as device 500 (FIG. 5A). At block 2502, the device receives an alert comprising information. At block 2504, in response to receiving the alert, the device issues a perceptual output (e.g., using haptic mechanism 542). At block 2506, the device detects a user input. At block 2508, in response to detecting the user input, the device determines whether the user input was detected within a predetermined time interval following the perceptual output. In accordance with a determination that the user input was received within the predetermined time interval, at block 2510, the device displays a notification comprising a first portion of the information (e.g., on. Optionally, the device determines whether the user input continues to be detected after a second predetermined time interval after displaying the notification. In accordance with a determination that the user input continues to be detected, the device displays a second portion of the information, where the second portion is different from the first portion.

Note that details of the processes described above with respect to process 2500 (e.g., FIGS. 25 and 6A-8) are also applicable in an analogous manner to the other processes described herein. For example, processes 2600 and 2700 may include one or more of the characteristics of the various processes described above with reference to process 2500. For brevity, these details are not repeated in the descriptions of the other processes. The various methods and techniques described above with reference to method 2500 may be optionally implemented as one or more hardware units, such as those described with regard to FIG. 5B.

Figure 26:
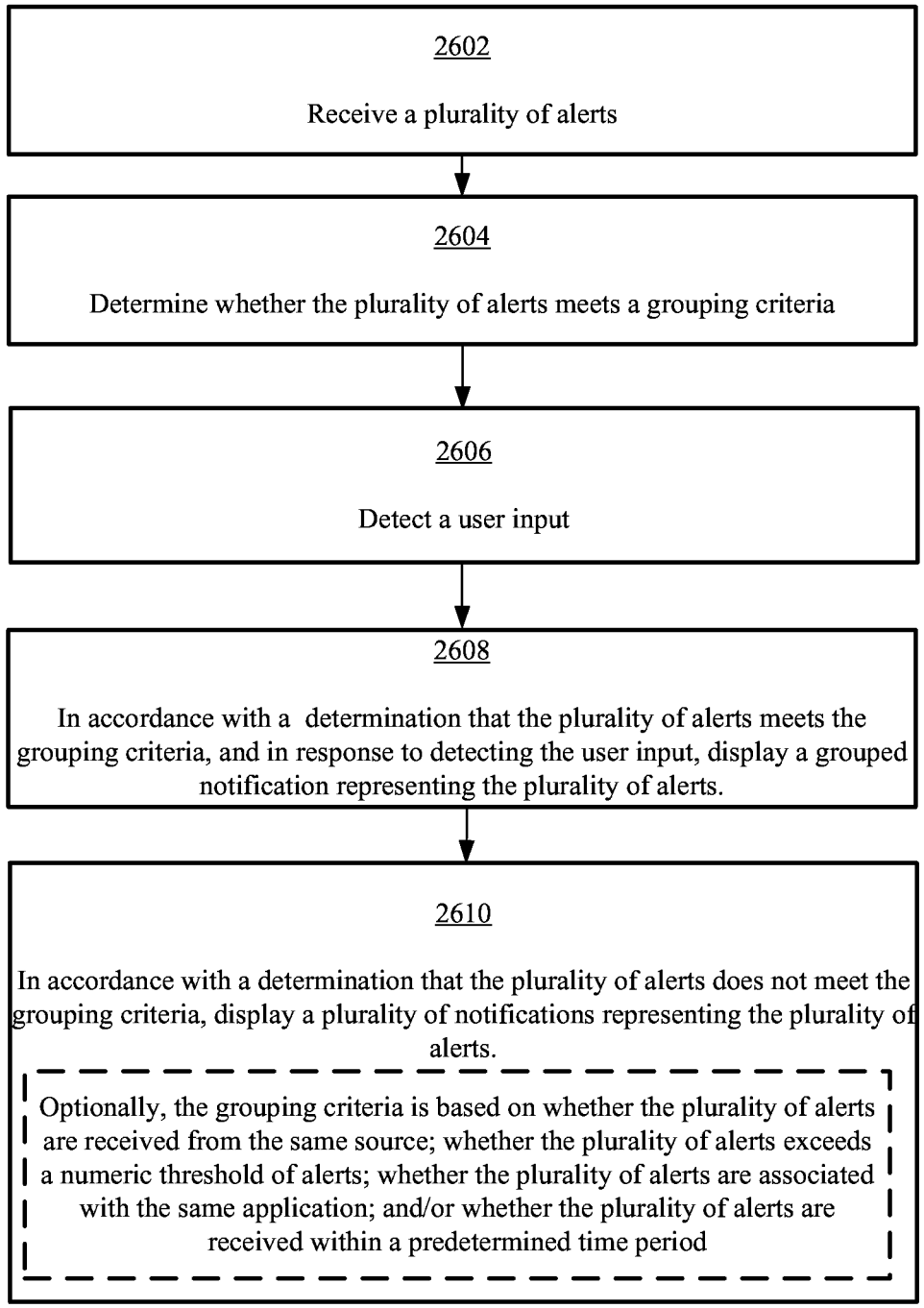
FIG. 26 illustrates an exemplary process for managing alerts.

FIG. 26 is a flow diagram illustrating process 2600 for managing notifications and alerts. Process 2600 may be performed at an electronic device with a touch-sensitive display screen, such as device 500 (FIG. 5A). At block 2602, the device receives a plurality of alerts. At block 2604, in response to receiving the alerts, device 500 determines whether the plurality of alerts meets a grouping criteria. At block 2606, the device detects a user input. At block 2608, in accordance with a determination that the plurality of alerts meets the grouping criteria, and in response to detecting the user input, the device displays a grouped notification representing the plurality of alerts. In accordance with a determination that the plurality of alerts does not meet the grouping criteria, and in response to detecting the user input, at block 2610, the device displays a plurality of notifications representing the plurality of alerts. Optionally, the grouping criteria is based on whether the plurality of alerts are received from the same source; whether the plurality of alerts exceeds a numeric threshold of alerts; whether the plurality of alerts are associated with the same application; and/or whether the plurality of alerts are received within a predetermined time interval.

Note that details of the processes described above with respect to process 2600 (e.g., FIGS. 26 and 23) are also applicable in an analogous manner to the other processes described herein. For example, processes 2500 and 2700 may include one or more of the characteristics of the various processes described above with reference to process 2600. For brevity, these details are not repeated in the descriptions of the other processes. The various methods and techniques described above with reference to method 2600 may be optionally implemented as one or more hardware units, such as those described with regard to FIG. 5B.

FIG. 27 is a flow diagram illustrating process 2700 for managing notifications and alerts. Process 2700 may be performed at an electronic device with a touch-sensitive display screen, such as device 500 (FIG. 5A). At block 2702, while displaying content, the device receives an alert comprising information. At block 2704, in response to receiving the alert, device 500 displays a notification banner across the display. The banner comprises a portion of the information. At least a portion of the content continues to be displayed on the display. At block 2706, the device detects a contact on the banner. In response to detecting the contact, at block 2708, the device displays a second portion of the information. The second portion is different from the first portion.

Note that details of the processes described above with respect to process 2700 (e.g., FIGS. 27 and 24) are also applicable in an analogous manner to the other processes described herein. For example, processes 2500 and 2600 may include one or more of the characteristics of the various processes described above with reference to process 2700. For brevity, these details are not repeated in the descriptions of the other processes. The various methods and techniques described above with reference to method 2700 may be optionally implemented as one or more hardware units, such as those described with regard to FIG. 5B.

Figure 28:
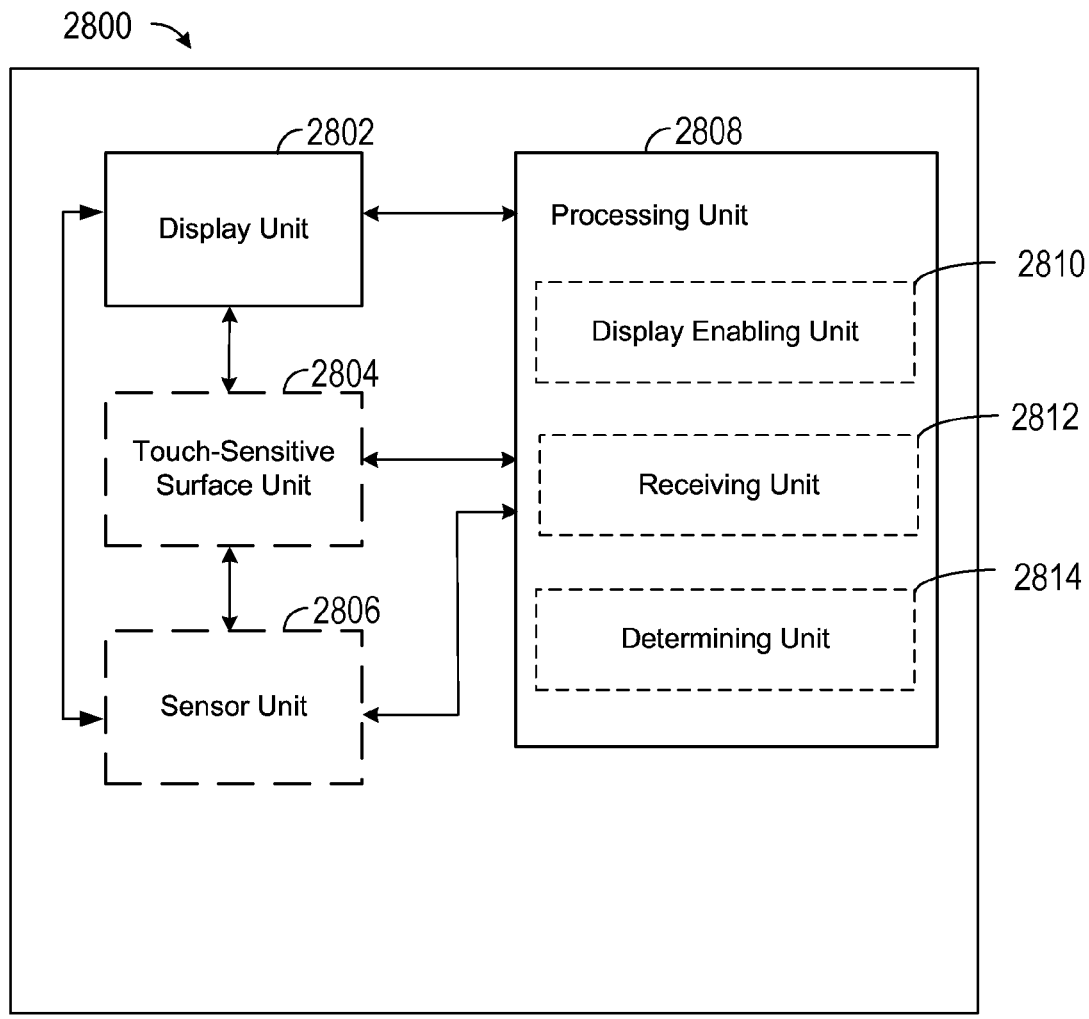
FIGS. 28-31 illustrate exemplary functional block diagrams of electronic devices in accordance with some embodiments.

The units of FIG. 28 may be used to implement the various techniques and methods described above with respect to FIGS. 25-27.

As shown in FIG. 28, an electronic device 2800 includes a display unit 2802 configured to display a user interface, and, optionally: a touch-sensitive surface unit 2804 configured to receive user contacts, one or more sensor units 2806 configured to detect intensity of touches with the touch-sensitive surface unit; and a processing unit 2808 coupled to the display unit 2802, the touch-sensitive surface unit 2804, and the sensor units 2806. In some embodiments, the processing unit 2808 includes a display enabling unit 2810, a receiving unit 2812, and a determining unit 2814.

In some embodiments, the display enabling unit 2810 is configured to cause a display of a notification, alert information, or user interface (or portions of a user interface) in conjunction with the display unit 2802. For example, the display enabling unit 2810 may be used for: displaying a notification, replacing a first notification with a second notification on the display, displaying a user interface for selecting one of a plurality of message-processing operations.

In some embodiments, the receiving unit 2812 is configured to receive alerts, data, or information. For example, the receiving unit 2812 may be used for receiving an alert comprising information.

In some embodiments, the determining unit 2814 is configured to make determinations. For example, the determining unit 2814 may be used for: determining whether a signal has been received within a predetermined time interval after a perceptual output; and determining whether the characteristic intensity of the second contact is above a threshold intensity.

Figure 29:
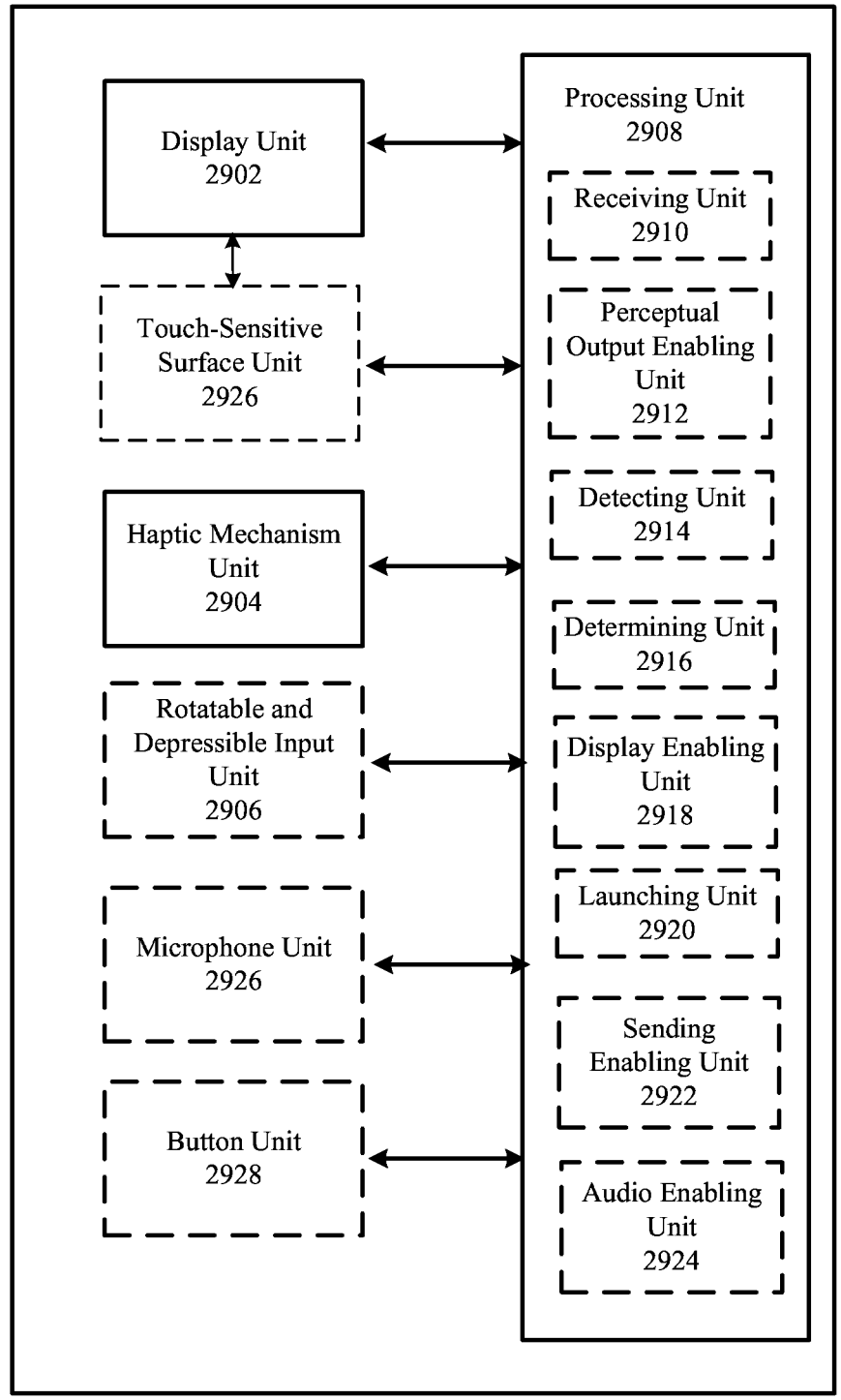

FIG. 29 shows a functional block diagram of an electronic device 2900 configured in accordance with the principles of the various described embodiments. The functional blocks of the device are, optionally, implemented by hardware, software, or a combination of hardware and software to carry out the principles of the various described embodiments. It is understood by persons of skill in the art that the function blocks described in FIG. 29 are, optionally, combined or separated into sub-blocks to implement the principles of the various described embodiments. Therefore, the description herein optionally supports any possible combination or separation or further definition of the functional blocks described herein.

As shown in FIG. 29, an electronic device 2900 includes a display unit 2902 configured to display a graphic user interface, a haptic mechanism unit 2904 configured to issue haptic outputs, and a processing unit 2908 coupled to the display unit 2902 and haptic mechanism unit 2904. In some embodiments, the electronic device optionally includes a touch-sensitive surface unit 2926 configured to receive touch inputs and coupled to the display unit 2902 and processing unit 2908. In some embodiments, the electronic device 2900 optionally includes a rotatable and depressible input unit 2906, a microphone unit 2926, and a button unit 2928. In some embodiments, the processing unit 2908 optionally includes a receiving unit 2910, a perceptual output enabling unit 2912, a detecting unit 2914, a determining unit 2916, a display enabling unit 2918, a launching unit 2920, a sending enabling unit 2922, and an audio enabling unit 2924.

Processing unit 2908 is configured to receive (e.g., with receiving unit 2910) an alert including information, and, in response to receiving the alert, enable (e.g., with perceptual output enabling unit 2912) a perceptual output. Processing unit 2908 is further configured to detect (e.g., with detection unit 2914) a user input, determine (e.g., with determining unit 2916) whether the user input was detected within a predetermined time interval after the perceptual output, and, in accordance with a determination that the user input was detected within the predetermined time interval, enable (e.g., with display enabling unit 2918) display of a notification on the display unit 2902, where the notification comprises a first portion of the information.

In some embodiments, enabling the perceptual output includes causing the haptic mechanism unit 2904 to issue a haptic output.

In some embodiments, processing unit 2908 is further configured to, in accordance with a determination that the user input was detected after the predetermined time interval after the perceptual output, enable (e.g., with display enabling unit 2918) display of a clock face, where the clock face comprises an indication that the alert is unread.

In some embodiments, processing unit 2908 is further configured to, in accordance with a determination that the user input was detected after the predetermined time interval after the perceptual output, enable (e.g., with display enabling unit 2918) display of a home screen on the display unit 2902, where the home screen comprises a plurality of user interface objects representing a plurality of applications, the user interface objects, when activated, launching the corresponding application, and where the home screen comprises an indication that the alert is unread.

In some embodiments, enabling display of the notification comprises activating the display unit 2902 from an inactive state. In some embodiments, displaying the notification comprises replacing display of a home screen with display of the notification. In some embodiments, enabling display of the notification comprises enabling display of an animation that translates the notification onto the display in a first direction.

In some embodiments, the notification comprises an application affordance for launching an application associated with the alert, and processing unit 2908 is further configured to detect (e.g., with detecting unit 2914) a selection of the application affordance, and, in response to detecting the selection, launch (e.g., with launching unit 2920) the application associated with the alert.

In some embodiments, processing unit 2908 is further configured to, in response to receiving the alert, determine (e.g., with determining unit 2916) whether a user activity level meets an activity criteria, where issuing the perceptual output is delayed until the user activity level meets the activity criteria.

In some embodiments, the electronic device is configured to detect (e.g., with detecting unit 2914) an intensity of contacts on the touch-sensitive display (e.g., on touch-sensitive surface unit 2926), and processing unit 2908 is further configured to detect (e.g., with detecting unit 2914) a contact on the touch-sensitive display while the notification is displayed on display unit 2902 and determine (e.g., with determining unit 2916) whether the characteristic intensity of the contact is above a threshold intensity. In some embodiments, processing unit 2908 is further configured to, in accordance with a determination that the characteristic intensity of the contact is above the threshold intensity, enable (e.g., with display enabling unit 2918) display of an option for suppressing one or more subsequent alerts that meet a mute criteria. In some embodiments, processing unit 2908 is further configured to, in accordance with a determination that the characteristic intensity of the contact is below the threshold intensity, and in accordance with a determination that the contact is at a location on the touch-sensitive display corresponding to the application affordance, launch (e.g., with launching unit 2920) the application associated with the alert. In some embodiments, the mute criteria is based on the source of the alert.

In some embodiments, processing unit 2908 is further configured to detect (e.g., with detecting unit 2914) a second contact on the touch-sensitive display while the notification is displayed, determine (e.g., with determining unit 2916) whether the second contact meets a dismissal criteria, and, in accordance with a determination that the second contact meets the dismissal criteria, enable (e.g., with display enabling unit 2918) removal of the notification from the display. In some embodiments, the second contact meets the dismissal criteria when the second contact comprises a swipe. In some embodiments, the second contact meets the dismissal criteria when the second contact comprises a movement of the second contact that exceeds a threshold distance.

In some embodiments, enabling display of the notification includes enabling display of an animation that translates the notification onto the display unit in a first direction, and the second contact meets the dismissal criteria when the second contact comprises a movement of the contact in a second direction opposite the first direction.

In some embodiments, the second contact includes a movement of the second contact and a release of the second contact, and processing unit 2908 is further configured to, in response to detecting the movement of the second contact: enable (e.g., with display enabling unit 2918) the sliding of the notification on the display in accordance with the movement of the second contact, and enable (e.g., with display enabling unit 2918) display of a dismissal indicator adjacent to the notification. Optionally, processing unit 2908 is further configured to, in accordance with a determination that the second contact meets the dismissal criteria and in response to detecting the release of the second contact, enable (e.g., with display enabling unit 2918) removal of the dismissal indicator and the notification from the display. Optionally, processing unit 2908 is further configured to, in accordance with a determination that the second contact does not meet the dismissal criteria and in response to detecting the release of the second contact, enable (e.g., with display enabling unit 2918) display of an animation that translates the notification back to its initial position on the display and enable removal of the dismissal indicator from the display.

In some embodiments, removing the notification includes displaying an animation that translates the notification off of the display in the second direction. In some embodiments, removing the notification from the display includes inactivating the display. In some embodiments, removing the notification from the display includes replacing display of the notification with display of a home screen, and the home screen comprises an indication that the alert is unread. In some embodiments, removing the notification from the display includes replacing display of the notification with display of a clock face, and the clock face includes an indication that the alert is unread.

In some embodiments, processing unit 2908 is further configured to: determine (e.g., with determining unit 2916) whether a second user input has been detected within a second predetermined time interval after displaying the notification; in accordance with a determination that the second user input has been detected within the second predetermined time interval, enable (e.g., with display enabling unit 2918) removal of the notification from the display; and in accordance with a determination that the second user input has not been detected within the second predetermined time interval, enable (e.g., with display enabling unit 2918) display of a second portion of the information, where the second portion is different from the first portion.

In some embodiments, processing unit 2908 is further configured to: determine (e.g., with determining unit 2916) whether the user input continues to be detected after a second predetermined time interval after displaying the notification; in accordance with a determination that the user input continues to be detected after the second predetermined time interval, enable (e.g., with display enabling unit 2918) display of a second portion of the information on the display unit, where the second portion is different from the first portion; and in accordance with a determination that the user input does not continue to be detected after the second predetermined time interval, enable (e.g., with display enabling unit 2918) removal of the notification from the display unit.

In some embodiments, processing unit 2908 is further configured to detect (e.g., with detecting unit 2914) a third contact on the touch-sensitive display (e.g., on touch-sensitive surface unit 2926) while displaying the notification, and, in response to detecting the third contact, enable (e.g., with display enabling unit 2918) display on the display unit 2902 of a second portion of the information, and the second portion is different from the first portion. In some embodiments, the second portion is displayed adjacent to the notification. In some embodiments, the third contact is a swipe in the first direction, and enabling display of the second portion of the information comprises sliding the second portion of the information onto the screen in the first direction.

In some embodiments, enabling display of the second portion of the information further includes obtaining (e.g., with receiving unit 2910) configuration data indicating whether to display the second portion of the information and enabling display of the second portion of the information in response to a determination that the configuration data indicates that the second portion of the information should be displayed.

In some embodiments, processing unit 2908 is further configured to detect (e.g., with detecting unit 2914) a selection of the application affordance while displaying the notification, and launch (e.g., with launching unit 2920) an application associated with the alert in response to detecting the fourth contact.

In some embodiments, the alert is an electronic message, and the processing unit is further configured to detect (e.g., with detecting unit 2914) a fourth contact on the touch-sensitive display while the second portion of the information is displayed, and, in response to detecting the fourth contact, enable (e.g., with display enabling unit 2918) display, on the display unit, of at least a portion of a message conversation including electronic messages sent to and received from a source of the electronic message.

In some embodiments, the alert includes audio content, displaying the second portion of the information includes displaying an option to play the audio content, and processing unit 2908 is further configured to: detect (e.g., with detecting unit 2914) a selection of the option to play the audio content; and enable (e.g., with audio enabling unit 2924) playing of the audio content in response to detecting the selection. In some embodiments, the audio content is a first audio content, and processing unit 2908 is further configured to receive (e.g., with receiving unit 2910) a second alert comprising second audio content after detecting the selection of the option to play the first audio content and enable (e.g., with audio enabling unit 2924) playing of the second audio content in response to receiving the second alert.

In some embodiments, processing unit 2908 is further configured to detect (e.g., with detecting unit 2914) a third user input while displaying the second portion of the information and, in response to detecting the third user input, enable (e.g., with display enabling unit 2918) scrolling of the second portion of the information in accordance with the third user input. In some embodiments, the third user input is a swipe on the touch-sensitive display (e.g., on touch-sensitive surface unit 2926). In some embodiments, the third user input is a rotation of the rotatable and depressible input unit 2906.

In some embodiments, the third user input is associated with a downward direction, and the processing unit 2908 is further configured to determine (e.g., with determining unit 2916) whether a beginning of the information is displayed on the display unit 2902, and in accordance with a determination that the beginning of the information is displayed and in response to detecting the third user input, enable (e.g., with display enabling unit 2918) removal of the second portion of the information from the display unit.

In some embodiments, the third user input is associated with an upward direction, and the processing unit 2908 is further configured to determine (e.g., with determining unit 2916) whether an end of the information is displayed and, in accordance with a determination that the end of the information is displayed on the display unit 2902 and in response to detecting the third user input, enable (e.g., with display enabling unit 2918) display of a first plurality of user interface objects on the display unit. Optionally, the user interface objects are associated with actions corresponding to an application associated with the alert. In some embodiments, the first plurality of user interface objects are scrolled upward onto the display below the end of the information as the information is scrolled upwards on the display unit.

In some embodiments, enabling removal of the second portion of the information from the display unit includes enabling replacement of the display, on the display unit, of the second portion of the notification with a display, on the display unit, of a home screen comprising an indication of the time, and the home screen is displayed without an indication that the alert is unread. In some embodiments, enabling removal of the second portion of the information includes enabling sliding the second portion of the information off of the display unit in the second direction.

In some embodiments, the electronic device is configured to detect an intensity of contacts on the touch-sensitive display (e.g., on touch-sensitive surface unit 2926), and processing unit 2908 is further configured to detect (e.g., with receiving unit 2914) a fifth contact on the touch-sensitive display, and determine (e.g., with determining unit 2916) whether the characteristic intensity of the fifth contact is above a threshold intensity. In some embodiments, processing unit 2908 is further configured to: in accordance with a determination that the characteristic intensity of the fifth contact is above the threshold intensity, enable (e.g., with display enabling unit 2918) display, on display unit 2902, of a first plurality of user interface objects, where the user interface objects are associated with actions corresponding to the application associated with the alert; and in accordance with a determination that the characteristic intensity of the fifth contact is below the threshold intensity, launch (e.g., with launching unit 2920) an application associated with the alert.

In some embodiments, processing unit 2908 is further configured to detect (e.g., with detecting unit 2914) a selection of a first user interface object in the first plurality of user interface objects and, in response to detecting the selection of the first user interface object, enable (e.g., with sending enabling unit 2922) sending of data to an external electronic device to cause the external electronic device to launch (e.g., with launching unit 2920) the application associated with the alert.

In some embodiments, processing unit 2908 is further configured to determine (e.g., with determining unit 2916) whether user input has been received within a third predetermined time interval while the second portion of the information is displayed and, in accordance with a determination that no user input has been received within the third predetermined time interval, inactivate (e.g., with display enabling unit 2918) the display unit 2902.

In some embodiments, the notification is displayed on display unit 2902 adjacent to the second portion of the information, the notification includes an application affordance, and processing unit 2908 is further configured to detect (e.g., with receiving unit 2914) a selection of the application affordance while the second portion of the information is displayed and, in response to detecting the selection of the application affordance, enable (e.g., with display enabling unit 2918) display of a second plurality of user interface objects on the display unit.

In some embodiments, processing unit 2908 is further configured to detect (e.g., with receiving unit 2914) a selection of a first user interface object of the second plurality of user interface objects and, in response to detecting the selection of the first user interface object, enable (e.g., with display enabling unit 2918) display of a third plurality of user interface objects on the display unit.

In some embodiments, processing unit 2908 is further configured to detect an input on the button unit 2928 and, in response to detecting the input on the button unit 2928, enable (e.g., with display enabling unit 2918) display of a third plurality of user interface objects on the display unit.

In some embodiments, processing unit 2908 is further configured to detect (e.g., with receiving unit 2914) a selection of a first user interface object of the third plurality of user interface objects and, in response to detecting the selection of the first user interface object of the third plurality of user interface objects, enable (e.g., with display enabling unit 2918) display of a user interface for selecting a predefined response message on the display unit.

In some embodiments, processing unit 2908 is further configured to detect (e.g., with receiving unit 2914) a selection of a first predefined response message and, in response to detecting the selection of the first predefined response message, enable (e.g., with sending enabling unit 2922) sending of the first predefined response message to a source of the alert.

In some embodiments, sending the first predefined response message to the source of the alert includes displaying a confirmation affordance, detecting a selection of the confirmation affordance, and, in response to detecting the selection of the confirmation affordance, enabling sending of the first predefined response message to the source of the alert.

In some embodiments, processing unit 2908 is further configured to, after enabling sending of the first predefined response message to the source, enable (e.g., with display enabling unit 2918) display of a message-sent confirmation screen on the display unit and enable replacement of the display of the message-sent confirmation screen with display of the home screen, where the home screen is displayed, on the display unit, without an indication that the alert is unread.

In some embodiments, processing unit 2908 is further configured to detect (e.g., with receiving unit 2914) a selection of a second user interface object of the third plurality of user interface objects and, in response to detecting the selection of the second user interface object of the third plurality of user interface objects, enable (e.g., with display enabling unit 2918) display of a user interface for selecting an emoji icon on the display unit.

In some embodiments, processing unit 2908 is further configured to detect (e.g., with receiving unit 2914) a selection of a first emoji icon and, in response to detecting the selection of the first emoji icon, enable (e.g., with sending enabling unit 2922) sending the first emoji icon to the source of the alert. In some embodiments, enabling sending of the emoji icon to the source of the alert includes enabling display of a confirmation affordance on the display unit 2902, detecting a selection of the confirmation affordance, and, in response to detecting the selection of the confirmation affordance, enabling sending of the emoji icon to the source of the alert.

In some embodiments, processing unit 2908 is further configured to detect (e.g., with receiving unit 2914) a selection of a second user interface object of the second plurality of user interface objects and, in response to detecting the selection of the second user interface object of the second plurality of user interface objects: determine (e.g., with determining unit 2916) whether the second portion of the information was displayed on the display unit 2902; in accordance with a determination that the second portion of the information was displayed, enable (e.g., with display enabling unit 2918) display of the home screen on the display unit, where the home screen is displayed without an indication that the alert is unread; and in accordance with a determination that the second portion of the information was not displayed, enable (e.g., with display enabling unit 2918) display of the home screen, where the home screen comprises an indication that the alert is unread.

In some embodiments, processing unit 2908 is further configured to detect (e.g., with receiving unit 2914) a selection of a second user interface object of the second plurality of user interface objects, and, in response to detecting the selection of the second user interface object of the second plurality of user interface objects: determine (e.g., with determining unit 2916) whether the second portion of the information was displayed on the display unit 2902; in accordance with a determination that the second portion of the information was displayed, enable (e.g., with display enabling unit 2918) display of the clock face, where the clock face is displayed without an indication that the alert is unread; and in accordance with a determination that the second portion of the information was not displayed, enable (e.g., with display enabling unit 2918) display of the clock face, where the clock face comprises an indication that the alert is unread.

In some embodiments, processing unit 2908 is further configured to detect (e.g., with receiving unit 2914) a selection of a third user interface object of the second plurality of user interface objects and, in response to detecting the selection of the third user interface object of the second plurality of user interface objects, enable (e.g., with display enabling unit 2918) display of a virtual keyboard on the display.

In some embodiments, processing unit 2908 is further configured to detect (e.g., with detecting unit 2914) a selection of a fourth user interface object of the second plurality of user interface objects and, in response to detecting the selection of the fourth user interface object of the second plurality of user interface objects: enable (e.g., with audio enabling unit 2924) recording of an audio input from the microphone unit and enable (e.g., with sending enabling unit 2922) sending of data corresponding to the recorded audio input to the source of the alert.

In some embodiments, enabling sending of the data corresponding to the recorded audio input includes enabling display (e.g., using display enabling unit 2918) of an indication of the recorded audio input and a send affordance on the display unit, detecting a selection of the send affordance, and, in response to detecting the selection of the send affordance, enabling sending of the data corresponding to the recorded audio input to the source of the alert.

In some embodiments, processing unit 2908 is further configured to detect (e.g., with detecting unit 2914) a depression of the rotatable and depressible input unit 2906 after launching the application, and enable (e.g., with display enabling unit 2918) display of the home screen on the display unit in response to detecting the depression.

In some embodiments, the rotatable and depressible input unit 2906 is a mechanical button that is rotatable, and the depression represents a press on the mechanical button. In some embodiments, the rotatable and depressible input unit 2906 is a capacitive button that is rotatable, and the depression represents a touch on the capacitive button.

In some embodiments, the notification is a first notification, and processing unit 2908 is further configured to receive (e.g., with receiving unit 2910) a second alert comprising second information while the first notification is displayed on the display unit 2902, and, in response to receiving the second alert, enable (e.g., with display enabling unit 2918) replacement of display of the first notification with display of a second notification on the display unit, where the second notification comprises a first portion of the second information.

In some embodiments, processing unit 2908 is further configured to enable (e.g., with perceptual output enabling unit 2912) a second perceptual output in response to receiving the second alert.

In some embodiments, processing unit 2908 is further configured to detect (e.g., with detecting unit 2914) a request to dismiss the second notification and, in response to detecting the request, enable (e.g., with display enabling unit 2918) dismissal of the second notification and enable redisplay of the first notification on the display unit 2902.

In some embodiments, processing unit 2908 is further configured to detect (e.g., with detecting unit 2914) a request to dismiss the second notification and, in response to detecting the request, enable dismissal of the second notification and enable (e.g., with display enabling unit 2918) display of the home screen on the display unit, where the home screen comprises an indication that the first alert and the second alert are unread.

In some embodiments, processing unit 2908 is further configured to detect (e.g., with detecting unit 2914) a request to dismiss the second notification and, in response to detecting the request, enable dismissal of the second notification and enable (e.g., with display enabling unit 2918) display of the clock face on the display unit 2902, where the clock face comprises an indication that the first alert and the second alert are unread.

In some embodiments, processing unit 2908 is further configured to receive (e.g., with receiving unit 2910) a second alert comprising second information while displaying the second portion of the information, and, in response to receiving the second alert, enable (e.g., with display enabling unit 2918) replacement of display of the second portion of the information with display of a second notification on the display unit 2902, where the second notification comprises a first portion of the second information.

In some embodiments, the alert is a first alert received from a source, and processing unit 2908 is further configured to receive (e.g., with receiving unit 2910) a second alert from the source while displaying the second portion of the information, and enable (e.g., with display enabling unit 2918) display of a grouped notification representing the first alert and the second alert in response to receiving the second alert. In some embodiments, the first alert and the second alert are associated with the same application.

In some embodiments, processing unit 2908 is further configured to detect (e.g., with detecting unit 2914) a sixth contact on the grouped notification and, in response to detecting the sixth contact, enable (e.g., with display enabling unit 2918) display, on the display unit, of a list of alerts received from the source, where the list of alerts is associated with the same application.

In some embodiments, the alert is a fitness alert, and processing unit 2908 is further configured to, after a second predetermined time interval, enable (e.g., with display enabling unit 2918) replacement of display on the display unit 2902 of the notification with display of a user interface object representing a fitness achievement, and, after a third predetermined time interval, enable (e.g., with display enabling unit 2918) replacement of display on the display unit of the user interface object with display of a second portion of the information, where the second portion is different from the first portion.

The operations described above with reference to FIG. 25 are, optionally, implemented by components depicted in FIGS. 1A-1B or FIG. 29. For example, receiving operation 2502, issuing operation 2504, detecting operation 2506, determining operation 2508, and displaying operation 2510 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation or other movement of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 30:
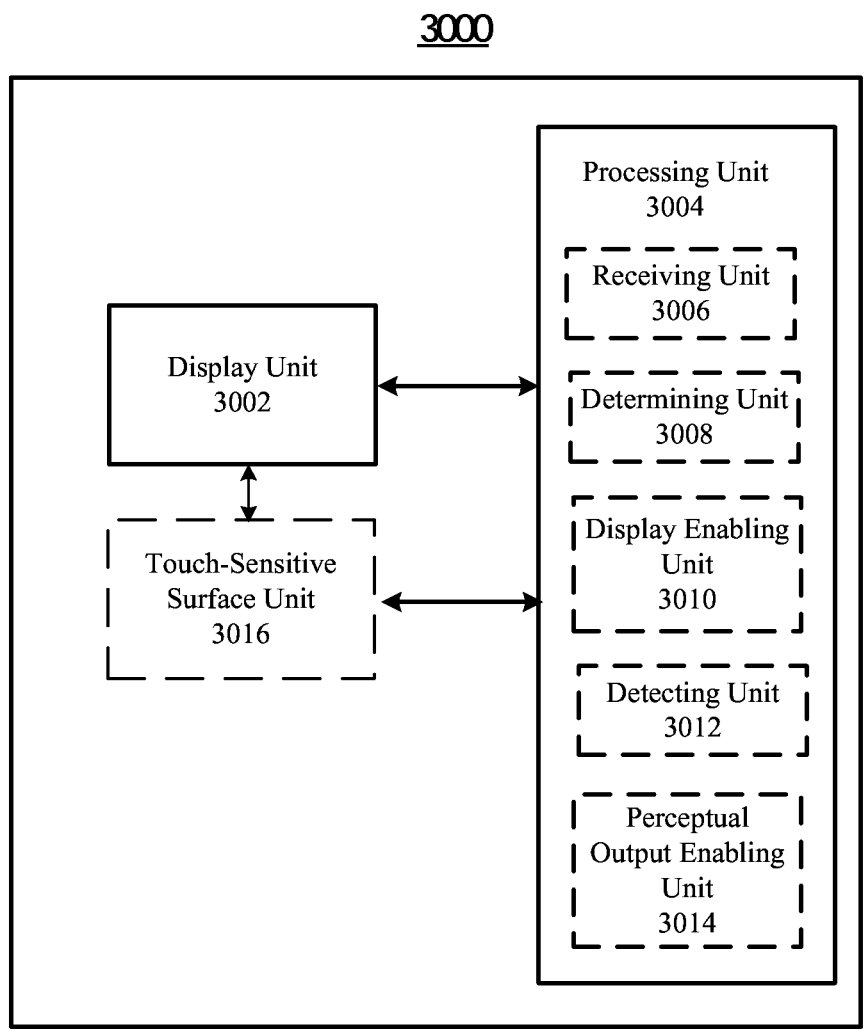

In accordance with some embodiments, FIG. 30 shows a functional block diagram of an electronic device 3000 configured in accordance with the principles of the various described embodiments. The functional blocks of the device are, optionally, implemented by hardware, software, or a combination of hardware and software to carry out the principles of the various described embodiments. It is understood by persons of skill in the art that the function blocks described in FIG. 30 are, optionally, combined or separated into sub-blocks to implement the principles of the various described embodiments. Therefore, the description herein optionally supports any possible combination or separation or further definition of the functional blocks described herein.

As shown in FIG. 30, an electronic device 3000 includes a display unit 3002 configured to display a graphic user interface and a processing unit 3004 coupled to the display unit 3002. In some embodiments, the electronic device optionally includes a touch-sensitive surface unit 3016 configured to receive touch inputs and coupled to the display unit 3002 and processing unit 3004. In some embodiments, the processing unit 3004 optionally includes a receiving unit 3006, a determining unit 3008, a display enabling unit 3010, a detecting unit 3012, and a perceptual output enabling unit 3014.

Processing unit 3004 is configured to receive (e.g., with receiving unit 3006) a plurality of alerts and, in response to receiving the plurality of alerts, determine (e.g., with determining unit 3008) whether the plurality of alerts meet a grouping criteria. Processing unit 3004 is further configured to, in accordance with a determination that the plurality of alerts meet the grouping criteria, enable (e.g., with display enabling unit 3010) display of a grouped notification representing the plurality of alerts on the display unit 3002, and, in response to a determination that the plurality of alerts do not meet the grouping criteria, enable (e.g., with display enabling unit 3010) display of a plurality of notifications representing the plurality of alerts on the display unit.

In some embodiments, the grouping criteria is based on one or more criteria selected from the group consisting of: whether the plurality of alerts are received from the same source; whether the plurality of alerts exceeds a numeric threshold of alerts; whether the plurality of alerts are associated with the same application; and whether the plurality of alerts are received within a predetermined time period.

In some embodiments, the plurality of alerts includes a first alert and a second alert that are received from the same source and are associated with the same application, the first alert and the second alert meet the grouping criteria, the first alert comprises first information and the second alert comprises second information, and the display unit is a touch-sensitive display unit. In some embodiments, processing unit 3004 is further configured to detect (e.g., with detecting unit 3012) a seventh contact on the touch-sensitive display unit (e.g., on touch-sensitive surface unit 3016) at a location corresponding to the grouped notification and, in response to detecting the seventh contact, enable (e.g., with display enabling unit 3010) display of the first information and the second information on the display unit 3002.

In some embodiments, the first alert and the second alert are received from different sources and are associated with the same application and processing unit 3004 is further configured to detect (e.g., with detecting unit 3012) an eighth contact on the touch-sensitive display unit (e.g., on touch-sensitive surface unit 3016) at a location corresponding to the grouped notification and, in response to detecting the eighth contact, enable (e.g., with display enabling unit 3010) display, on the display unit 3002, of a list of alerts associated with the application, where the list of alerts comprises the first alert and the second alert.

In some embodiments, the plurality of alerts are associated with a plurality of applications, and where the plurality of alerts meets the grouping criteria, where the display unit is a touch-sensitive display unit, and processing unit 3004 is further configured to enable (e.g., with display enabling unit 3010) display of a grouped notification representing the plurality of alerts, detect (e.g., with detecting unit 3012) a ninth contact on the touch-sensitive display at a location corresponding to the grouped notification, and, in response to detecting the ninth contact, enable (e.g., with display enabling unit 3010) display of a list of notifications representing the plurality of alerts, where the received alerts comprise the first alert and the second alert.

In some embodiments, processing unit 3004 is further configured to enable (e.g., with perceptual output enabling unit 3014) a perceptual output in further response to receiving the plurality of alerts. In some embodiments, processing unit 3004 is further configured to, further in accordance with a determination that the plurality of alerts meets the grouping criteria, enable (e.g., with perceptual output enabling unit 3014) a single perceptual output and, further in accordance with a determination that the plurality of alerts does not meet the grouping criteria, enable (e.g., with perceptual output enabling unit 3014) a plurality of perceptual outputs corresponding to the plurality of alerts.

The operations described above with reference to FIG. 26 are, optionally, implemented by components depicted in FIGS. 1A-1B or FIG. 30. For example, receiving operation 2602, determining operation 2604, detecting operation 2606, and displaying operations 2608 and 2610 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation or other movement of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 31:
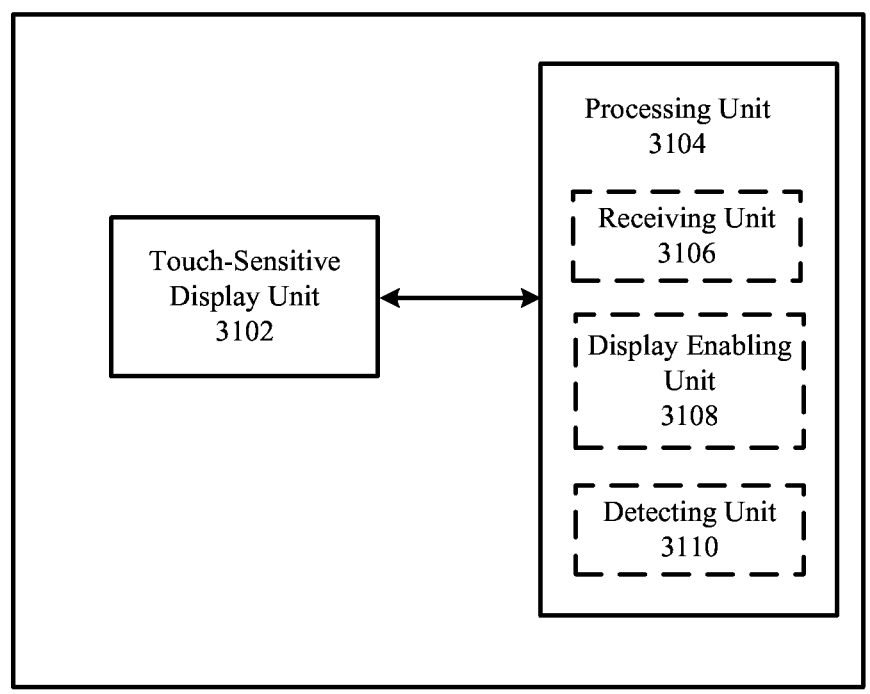

In accordance with some embodiments, FIG. 31 shows a functional block diagram of an electronic device 3100 configured in accordance with the principles of the various described embodiments. The functional blocks of the device are, optionally, implemented by hardware, software, or a combination of hardware and software to carry out the principles of the various described embodiments. It is understood by persons of skill in the art that the function blocks described in FIG. 31 are, optionally, combined or separated into sub-blocks to implement the principles of the various described embodiments. Therefore, the description herein optionally supports any possible combination or separation or further definition of the functional blocks described herein.

As shown in FIG. 31, an electronic device 3100 includes a touch-sensitive display unit 3102, configured to receive contacts and display a graphic user interface, and a processing unit 3104 coupled to the display unit 3102. In some embodiments, the processing unit 3104 optionally includes a receiving unit 3106, a display enabling unit 3108, and a detecting unit 3110.

Processing unit 3104 is configured to receive (e.g., with receiving unit 3106) an alert comprising information while the display unit is actively displaying content, and, in response to receiving the alert, enable (e.g., with display enabling unit 3108) display of a notification banner across a portion of the touch-sensitive display unit 3102, where the notification banner comprises a first portion of the information and where at least a portion of the content continues to be displayed. Processing unit 3104 is further configured to detect (e.g., with detecting unit 3110) a contact on the touch-sensitive display unit at a location corresponding to the notification banner and enable (e.g., with display enabling unit 3108) display, on the display unit, of a second portion of the information in response to detecting the contact, where the second portion is different from the first portion.

The operations described above with reference to FIG. 27 are, optionally, implemented by components depicted in FIGS. 1A-1B or FIG. 31. For example, receiving operation 2702, displaying operations 2704 and 2708, and detecting operation 2706 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation or other movement of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing descriptions, for purpose of explanation, have been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer-readable storage medium storing one or more programs, the one or more programs comprising instructions, which when executed by one or more processors of an electronic device with a display, cause the device to:

receive an alert comprising information;
in response to receiving the alert, issue a perceptual output;
detect a user input;
determine whether the user input was detected within a predetermined time interval after the perceptual output; and
in accordance with a determination that the user input was detected within the predetermined time interval, display a notification on the display, wherein the notification comprises a first portion of the information, further wherein displaying the notification comprises activating the display from an inactive state.

2. The non-transitory computer-readable storage medium according to claim 1, wherein the electronic device comprises a haptic mechanism, and wherein issuing the perceptual output comprises causing the haptic mechanism to issue a haptic output.

3. The non-transitory computer-readable storage medium according to claim 1, further comprising instructions to cause the device to:
in accordance with a determination that the user input was detected after the predetermined time interval after the perceptual output, display a clock face, wherein the clock face comprises an indication that the alert is unread.

4. The non-transitory computer-readable storage medium according to claim 1, further comprising instructions to cause the device to:
in accordance with a determination that the user input was detected after the predetermined time interval after the perceptual output, display a home screen, wherein the home screen comprises a plurality of user interface objects representing a plurality of applications, the user interface objects, when activated, launching the corresponding application, and wherein the home screen comprises an indication that the alert is unread.

5. The non-transitory computer-readable storage medium according to claim 1, wherein displaying the notification comprises replacing display of a home screen with display of the notification.

6. The non-transitory computer-readable storage medium according to claim 1, wherein displaying the notification comprises displaying an animation that translates the notification onto the display in a first direction.

7. The non-transitory computer-readable storage medium according to claim 1, wherein the notification comprises an application affordance for launching an application associated with the alert, further comprising instructions to cause the device to:
detect a selection of the application affordance; and
in response to detecting the selection, launch the application associated with the alert.

8. The non-transitory computer-readable storage medium according to claim 1, further comprising instructions to cause the device to:
in response to receiving the alert, determine whether a user activity level meets an activity criteria, wherein issuing the perceptual output is delayed until the user activity level meets the activity criteria.

9. The non-transitory computer-readable storage medium according to claim 1, wherein the display is a touch-sensitive display and the device is configured to detect an intensity of contacts on the touch-sensitive display, further comprising instructions to cause the device to:
while the notification is displayed, detect a contact on the display;
determine whether the characteristic intensity of the contact is above a threshold intensity;
in accordance with a determination that the characteristic intensity of the contact is above the threshold intensity, display an option for suppressing one or more subsequent alerts that meet a mute criteria; and
in accordance with a determination that the characteristic intensity of the contact is below the threshold intensity, and in accordance with a determination that the contact is at a location on the display corresponding to the application affordance, launch the application associated with the alert.

10. The non-transitory computer-readable storage medium according to claim 9, wherein the mute criteria is based on the source of the alert.

11. The non-transitory computer-readable storage medium according to claim 1, wherein the display is a touch-sensitive display, further comprising instructions to cause the device to:
while the notification is displayed, detect a second contact on the touch-sensitive display;
determine whether the second contact meets a dismissal criteria; and
in accordance with a determination that the second contact meets the dismissal criteria, remove the notification from the display.

12. The non-transitory computer-readable storage medium according to claim 11, wherein the second contact meets the dismissal criteria when the second contact comprises a movement of the second contact that exceeds a threshold distance.

13. The non-transitory computer-readable storage medium according to claim 11, wherein displaying the notification comprises displaying an animation that translates the notification onto the display in a first direction, and wherein the second contact meets the dismissal criteria when the second contact comprises a movement of the contact in a second direction opposite the first direction.

14. The non-transitory computer-readable storage medium according to claim 11, wherein the second contact comprises a movement of the second contact and a release of the second contact, further comprising instructions to cause the device to:
in response to detecting the movement of the second contact:
slide the notification on the display in accordance with the movement of the second contact, and
display a dismissal indicator adjacent to the notification;
in accordance with a determination that the second contact meets the dismissal criteria and in response to detecting the release of the second contact, remove the dismissal indicator and the notification from the display; and
in accordance with a determination that the second contact does not meet the dismissal criteria and in response to detecting the release of the second contact:
display an animation that translates the notification back to an initial position on the display, and
remove the dismissal indicator from the display.

15. The non-transitory computer-readable storage medium according to claim 11, wherein removing the notification from the display comprises replacing display of the notification with display of a home screen, wherein the home screen comprises an indication that the alert is unread.

16. The non-transitory computer-readable storage medium according to claim 11, wherein removing the notification from the display comprises replacing display of the notification with display of a clock face, wherein the clock face comprises an indication that the alert is unread.

17. The non-transitory computer-readable storage medium according to claim 1, further comprising instructions to cause the device to:
determine whether a second user input has been detected within a second predetermined time interval after displaying the notification;
in accordance with a determination that the second user input has been detected within the second predetermined time interval, remove the notification from the display; and
in accordance with a determination that the second user input has not been detected within the second predetermined time interval, display a second portion of the information, wherein the second portion is different from the first portion.

18. The non-transitory computer-readable storage medium according to claim 1, further comprising instructions to cause the device to:
determine whether the user input continues to be detected after a second predetermined time interval after displaying the notification;
in accordance with a determination that the user input continues to be detected after the second predetermined time interval, display a second portion of the information, wherein the second portion is different from the first portion; and
in accordance with a determination that the user input does not continue to be detected after the second predetermined time interval, remove the notification from the display.

19. The non-transitory computer-readable storage medium according to claim 1, further comprising instructions to cause the device to:
while displaying the notification, detect a third contact on the display; and
in response to detecting the third contact, display a second portion of the information, wherein the second portion is different from the first portion.

20. The non-transitory computer-readable storage medium according to claim 18, wherein the second portion is displayed adjacent to the notification.

21. The non-transitory computer-readable storage medium according to claim 19, wherein the third contact is a swipe in the first direction, and wherein displaying the second portion of the information comprises sliding the second portion of the information onto the screen in the first direction.

22. The non-transitory computer-readable storage medium according to claim 17, wherein displaying the second portion of the information further comprises:
obtaining configuration data indicating whether to display the second portion of the information; and
displaying the second portion of the information in response to a determination that the configuration data indicates that the second portion of the information should be displayed.

23. The non-transitory computer-readable storage medium according to claim 1, further comprising instructions to cause the device to:

while displaying the notification, detect a selection of the application affordance; and in response to detecting a selection of the application affordance, launching an application associated with the alert.

24. A method, comprising:

at an electronic device with a display:
receiving an alert comprising information;
in response to receiving the alert, issuing a perceptual output;
detecting a user input;
determining whether the user input was detected within a predetermined time interval after the perceptual output; and
in accordance with a determination that the user input was detected within the predetermined time interval, displaying a notification on the display, wherein the notification comprises a first portion of the information, further wherein displaying the notification comprises activating the display from an inactive state.

25. An electronic device, comprising:

a display;
one or more processors;
a memory; and
one or more programs, wherein the one or more programs are stored in the memory and configured to be executed by the one or more processors, the one or more programs including instructions for:
receiving an alert comprising information;
in response to receiving the alert, issuing a perceptual output;
detecting a user input;
determining whether the user input was detected within a predetermined time interval after the perceptual output; and
in accordance with a determination that the user input was detected within the predetermined time interval, displaying a notification on the display, wherein the notification comprises a first portion of the information, further wherein displaying the notification comprises activating the display from an inactive state.

26. The non-transitory computer-readable storage medium according to claim 1, further comprising instructions to cause the device to:
in accordance with a determination that the user input was detected after the predetermined time interval, not displaying the notification comprising the first portion of the information on the display.

27. The non-transitory computer-readable storage medium according to claim 1, further comprising instructions to cause the device to:
in accordance with a determination that the user input was detected after the predetermined time interval, displaying an indication that alert content corresponding to the alert has not yet been displayed.

28. The non-transitory computer-readable storage medium according to claim 1, further comprising instructions to cause the device to:
in accordance with a determination that the user input was detected after the predetermined time interval, displaying an indication of an unread alert corresponding to the received alert.

29. The non-transitory computer-readable storage medium according to claim 1, further comprising instructions to cause the device to:
in accordance with a determination that no user input was detected within the predetermined time interval, maintaining the device in an initial dark or inactive state without activating the display.

* * * * *